(12) United States Patent
Ozersky et al.

(10) Patent No.: US 10,590,040 B2
(45) Date of Patent: Mar. 17, 2020

(54) MACRO-CEMENT COMPOSITIONS, METHOD OF PRODUCING MACRO-CEMENT AND ENGINEERED FORMS OF MACRO-CEMENT, AND MULTI-STAGE HOMOGENIZATION PROCESS FOR PREPARING CEMENT BASED MATERIALS

(71) Applicant: MACROCEMENT INDUSTRIES LTD., Toronto (CA)

(72) Inventors: Alexander Ozersky, Richmond Hill (CA); Alexander Khomyakov, Vaughan (CA)

(73) Assignee: MACROCEMENT INDUSTRIES LTD., Toronto (CA)

(*) Notice: Subject to any disclaimer, the term of this patent is extended or adjusted under 35 U.S.C. 154(b) by 0 days.

(21) Appl. No.: 16/219,235

(22) Filed: Dec. 13, 2018

(65) Prior Publication Data

US 2019/0112228 A1 Apr. 18, 2019

Related U.S. Application Data

(63) Continuation of application No. PCT/CA2018/050207, filed on Feb. 23, 2018.
(Continued)

(51) Int. Cl.
*C04B 18/02* (2006.01)
*C04B 40/00* (2006.01)
(Continued)

(52) U.S. Cl.
CPC ............ *C04B 18/022* (2013.01); *C04B 7/02* (2013.01); *C04B 14/48* (2013.01); *C04B 18/08* (2013.01); *C04B 18/146* (2013.01); *C04B 20/006* (2013.01); *C04B 20/026* (2013.01); *C04B 20/1033* (2013.01); *C04B 20/1066* (2013.01); *C04B 28/04* (2013.01); *C04B 40/005* (2013.01); *C04B 40/0032* (2013.01);
(Continued)

(58) Field of Classification Search
CPC .................................................... C04B 18/022
USPC ........................................................ 427/212
See application file for complete search history.

(56) References Cited

U.S. PATENT DOCUMENTS

| 2,321,674 | A | * | 6/1943 | Harshberger | ........... E04D 7/005 |
| | | | | | 428/404 |
| 2003/0165357 | A1 | * | 9/2003 | Hart | ...................... C04B 18/022 |
| | | | | | 404/32 |

FOREIGN PATENT DOCUMENTS

WO    WO-2011022011 A1 *  2/2011    ............. C04B 28/24

OTHER PUBLICATIONS

Alonso, Dry mixing and coating of powders, Rev. Metal Madrid 35 (1999) 315-328 (Year: 1999).*
(Continued)

*Primary Examiner* — Tabatha L Penny
(74) *Attorney, Agent, or Firm* — Anil Bhole; Marc Lampert; Bhole IP Law

(57) ABSTRACT

A macro-cement and associated methods useful for preparing pastes, mortars, concretes and other cement-based materials having high workability, high density, and high strength are disclosed. A method of producing a macro-cement includes cement, supplemental cementitious materials (SCM's), including siliceous submicron-sized particles and nano-sized particles, and polymers in the form of liquid or dry chemical admixtures for concrete. The cement mixture may be used for making ultra-high performance concrete (UHPC).

5 Claims, 32 Drawing Sheets

Related U.S. Application Data

(60) Provisional application No. 62/464,509, filed on Feb. 28, 2017.

(51) Int. Cl.

| | | |
|---|---|---|
| *C04B 20/10* | (2006.01) | |
| *C04B 28/04* | (2006.01) | |
| *C04B 40/06* | (2006.01) | |
| *C04B 7/02* | (2006.01) | |
| *C04B 14/48* | (2006.01) | |
| *C04B 18/08* | (2006.01) | |
| *C04B 18/14* | (2006.01) | |
| *C04B 20/00* | (2006.01) | |
| *C04B 20/02* | (2006.01) | |
| *C04B 111/00* | (2006.01) | |
| *C04B 103/10* | (2006.01) | |
| *C04B 103/14* | (2006.01) | |
| *C04B 103/22* | (2006.01) | |
| *C04B 103/30* | (2006.01) | |
| *C04B 103/32* | (2006.01) | |

(52) U.S. Cl.
CPC .... *C04B 40/0616* (2013.01); *C04B 2103/105* (2013.01); *C04B 2103/14* (2013.01); *C04B 2103/22* (2013.01); *C04B 2103/302* (2013.01); *C04B 2103/32* (2013.01); *C04B 2111/00008* (2013.01); *C04B 2111/00327* (2013.01); *C04B 2201/00* (2013.01); *C04B 2201/52* (2013.01); *Y02P 40/121* (2015.11)

(56) References Cited

OTHER PUBLICATIONS

Written Opinion for PCT application No. PCT/CA2018/050207, CIPO, dated May 24, 2018.

International Search Report for PCT application No. PCT/CA2018/050207, CIPO, dated May 24, 2018.

Sanchez et al., Nanotechnology in concrete—A review, Construction and Building Materials, vol. 24, Issue 11, Nov. 2010, pp. 2060-2071.

Birgisson et al. Nanotechnology in concrete Materials A Synopsis, Transportation Research Citcular E-C170, Dec. 2012, DOI:10.17226/22672.

Flores et al. Performances of Cement Systems with Nano SiO2 particles Produced by using the Sol-Gel method, Transportation Research Record: Journal of the Transportation Research Board, No. 2142, Transportation Research Board of the National Academics, Washington, D.C., 2010, pp. 10-14.

Ozylidirim et al., Exploratory investigation of nanomaterials to Improve Strength and permeability of Concrete, Transportation research Record: Journal of the Transportation Research Board, No. 2142, Transportation Research Board of the National Academics, Washington, D.C. 2010, pp. 1-8.

\* cited by examiner (a)

(b)

Ranges of rheological properties of Macro-cement paste, Mortar and Concrete

| MATERIAL | RHEOLOGICAL PARAMETERS | |
|---|---|---|
| | Yield stress, $\tau_0$ [Pa] | Plastic viscosity, $\mu$ [Pa·s] |
| Macro-cement paste | 10 - 100 | 0.01 - 1 |
| Mortar | 100 - 500 | 1 - 10 |
| Concrete | 500 – 2,000 | 10 - 100 |

MACRO-CEMENT COMPOSITIONS, METHOD OF PRODUCING MACRO-CEMENT AND ENGINEERED FORMS OF MACRO-CEMENT, AND MULTI-STAGE HOMOGENIZATION PROCESS FOR PREPARING CEMENT BASED MATERIALS

TECHNICAL FIELD

The following relates to a macro-cement and, more specifically, the following relates to methods of producing macro-cement from micron-sized cementitious with or without pozzolanic particles loaded with submicron or nano-sized particles, or a combination thereof.

BACKGROUND

The world's most used construction materials are partially or completely constructed of cementitious materials, specifically, concrete. Concrete generally refers to a mixture of natural and/or artificial aggregates, such as sand and either a gravel or a crushed stone, which are held together by a binder of cementitious paste to form a highly durable building material. The paste is typically made up of a hydraulic cement, such as Portland cement, and water and may also contain one or more chemical admixtures as well as supplementary cementing materials, such as fly ash, ground granulated blast furnace slag, and silica fume.

In the late 1970's ultra-high performance concrete (UHPC) was seen as breakthrough in the materials industry having an increased compressive strength in excess of 120 MPa and increased durability compared to other high performance concretes known at that time. UHPC is also known as reactive powder concrete (RPC) or densely packed cementitious materials commonly also called densified systems containing homogeneously arranged ultrafine particles (DSP materials). Regardless of the variety of the names for this type of concrete and its compositions, these cementitious materials are formed by the hydration of densely packed particles of an inorganic binder in combination with ultrafine particles of a second, less reactive or non-reactive filler, as well as some additional particulate materials. It is understood by those skilled in the art that DSP materials give rise to hitherto unattainable mechanical qualities, including strength, density, and durability (examples include EP 0 010 777 B2, EP 0 269 71 5 B1, EP 0 042 935 B2, U.S. Pat. No. 4,979,992).

Inorganic binders are materials produced by mechanical comminution of coarser intermediates such as clinker and granulated blast furnace slag, and generally comprise particles ranging in sizes between 1 μm to 100 μm. Even when such particles are packed to a theoretical maximum degree, empty spaces remain that cannot be filled with inorganic binder particles in this size range. The binder most commonly utilized in producing UHPC's is Portland cement. Upon mixing with water, the empty spaces between the inorganic binders become filled with liquid. However, it is known in the art that the amount of water is reduced when the empty spaces between the inorganic binders are filled with a second material having smaller particle sizes than the inorganic binders. For example, U.S. Pat. No. 5,522,926 discloses the use of silica fume, specifically microsilica, an ultrafine material most commonly used to fill the voids between the inorganic binders. Such cementitious systems having two particle sizes exhibit a higher degree of packing, a lower porosity, a higher strength and lower permeability than conventional concrete.

The optimization of the granular mixture for the enhancement of compacted density, efficient micro-reinforcement, and more recently nano-reinforcement, as well as the optimal usage of superplasticizer, are among the most important factors defining strength and workability of UHPC. The uniform distribution of the cement-silica fume particles is critical in the production of a dense strong concrete matrix. Concretes have been designed having remarkable compressive strength and fracture energy based on the principle of optimizing mortar composition with the purpose of maximizing the matrix density of concrete (U.S. Pat. Nos. 5,522,926; 6,080,234; 7,901,504; 8,303,708). Furthermore, others have focused on maximizing the mortar packing density (U.S. Pat. Nos. 7,744,690 and 8,016,938).

Taking into account the critical importance of increased particle packing for making a strong concrete, many mathematical models have been developed, for example by Shakhmenko et al. Concrete Mix Design and Optimization, $2^{nd}$ Int. PhD Symposium in Civil Engineering 1998 Budapest, 1-8 and by Yu et al., Mix design and properties assessment of Ultra-High Performance Fibre Reinforced Concrete (UHPFRC), Cement and Concrete Research 56 (2014) 29-39 for calculating concrete compositions having maximum particle packing density, and numerous software programs, based on these mathematical models have been created for calculating such optimum compositions.

The mathematical models which attempt to calculate ideal concrete compositions having maximum particle packing density are based on the theory that the powders are "ideal", meaning that powders are loose and do not have interconnected agglomerated particles. According to this "ideal" powder concept, upon mixing silica fume powders with larger inorganic binders, the ultrafine microsilica particles are uniformly arranged in the voids between coarser cement particles, together creating a densely packed matrix. However, in actual practice, silica fume particles have a tendency to aggregate. The smaller the particle size, the more aggregation. In current systems, ultrafine silica fume materials aggregate and nano-particles severely aggregate. Both ranges of particle size aggregate, creating densely packed clumps, which reduces the benefits associated with silica fume having small particle sizes. Particle aggregation prevents uniform distribution of the silica fume particles from being achieved, and the density, as well as other properties of the concrete matrix is jeopardized in various ways, including but not limited to resulting in higher porosity, lower strength and durability and higher permeability. Although there are numerous modern multi-component particle packing models, which take into account the interaction between different components, the basic mathematical equations of almost all particle packing models are the same and purely based on the geometry of the particles. However, these models do not suggest methods for overcoming the problem of particles agglomerations.

As an example, EP 0 042 935 B2 describes, and thus it is known in the art, that if silica fume particles are aggregated, some sort of dispersing action, such as grinding, may be applied. Accordingly, for silica fume to be utilized as an effective ultrafine material mixed with inorganic binders such as Portland cement, there are two issues that should be addressed. Firstly, the agglomerations should be broken down, and secondly, the silica fume should be distributed uniformly throughout the concrete.

In attempts to address the problem of silica fume particle aggregation, many modern cement manufacturers have experimented with dry blending silica fume with cement using various mills and blenders. The experience of these manufacturers and also numerous experiments of authors on mixing dry cementitious composition on various types of intensive blenders demonstrated inability of these blenders to de-agglomerate silica fume to a sufficient degree, and thus provide maximum packing density of the multi-component cementitious mixture. Breaking down silica fume with cement in the process of cement milling has proved beneficial; however cement milling is generally performed in a factory utilizing a process of clinker milling which produces large batches for commercial use. One disadvantage of dry mixing of silica fume in the process of cement manufacturing is a lack of production flexibility. Specifically, it is impractical to produce relatively small and diverse batches of blended hydraulic cement according to requirements of dissimilar customers. Another drawback is that a limited amount of silica fume can be added into cement in the process of its manufacturing. Silica fume is normally added at a range between 3 and 10% by weight, and almost certainly under maximum 15% defined by many national standards, and particularly by National Standard of Canada CAN/CSA-A3000-13. This quantity of silica fume is generally below its optimum amount (up to 25% in many UHPC compositions and higher in some) required for making blended cement compositions with maximum packing density. Besides, the milling cannot be used for optimum packing of multi-component mixtures, containing in addition to silica fume, other supplementary cementitious material like fly ash, slag, etc., and non-cementitious fillers like quartz powder, sand, etc. Another reason the milling cannot be used for optimum packing of multi-component cementitious mixtures is that it is considered impossible to calculate optimum ratio of the components based on their original sizes because of comminution of different components to varying and unpredictable degrees in the process of milling.

Recently, nano-sized additives including, for example: nanosilica, nano-clay, nano-$TiO_2$, nano-$Fe_2O_3$, carbon nanotubes and fibers, are being utilized in the production of cementitious materials. However, it is known in the art that powder cohesion increases with decreasing size of the particles, and accordingly de-agglomeration of the nano-particles and their uniform distribution in the cementitious matrix is an even more challenging problem than in the case of the ultrafine micro-particles. The nano-sized additives may be supplied in the form of suspension like nanosilica, or as a powder such as nano-$TiO_2$, carbon nano-tubes, and nano-fibers. In the case of powdered nano-tubes, the nano-tubes are dispersed before adding them into a cementitious mixture. Dispersion of the nano-tubes is carried out by methods that utilize high dispersing energy, including ultra-centrifugation and sonication (U.S. Pat. No. 8,865,107; US 20090229494). The dispersed nano-tubes, according to U.S. Pat. No. 8,865,107 and US 20090229494 may be subsequently mixed with cementitious materials using a standard mixer. However, such standard mixers, having low dispersion energy, are unable to provide complete uniform distribution of nano-sized particles or fibers in the cementitious matrix.

The optimal usage of a superplasticizer along with optimization of the dry binder mix, are among the most important factors defining strength and workability of UHPC. Superplasticizers, which are also known as high range water reducers, are chemical admixtures used where well-dispersed particle suspension is required. The addition of superplasticizers to mortar or concrete allows for the reduction of the water to cement ratio, without affecting the workability of the mixture and thus improves the performance of the fresh paste and the hardened concrete object. One efficient usage of superplasticizer is provided by Super-High-Strength High Performance Concrete, Pu Xincheng, 2013 by Taylor & Francis Group, LLC, wherein the superplasticizer is adsorbed onto the surface of the cement particles, avoiding the adsorption of a large part of superplasticizer by the aggregates, thus reducing the plasticizing effect. Furthermore, EP0010777 discloses introduction of the superplasticizer as a dry powder to the dry mix before adding water as a more efficient way of utilizing superplasticizer.

A number of prior art references disclose methods of improving dispersion by introducing superplasticizer into cement dry mix. For example, EP0696262 discloses a method for producing cement comprising mechano-chemical treatment of a mineral-polymeric or a mineral mixture of Portland cement and a $SiO_2$-containing microfiller, such as silica fume and/or powdery water reducing agents of melamine or naphthalene type in milling equipment. RU 2577340 discloses combining powdered superplasticizer with cement and WO 2009084984 and RU2371402 disclose merging dry superplasticizer with cement. Furthermore, it has been taught by Sobolev et al. in Nanomaterials and Nanotechnology for High-Performance Cement Composites, Proceedings of ACI Session on "Nanotechnology of Concrete: Recent Developments and Future Perspectives" Nov. 7, 2006, Denver, USA, pp. 91-118 that combining superplasticizer with cement by intergrinding cement and dry modifiers in a high-energy mill serves the purpose of attaching the superplasticizer organic functional groups to the surface of inorganic Portland cement and forms organomineral nano-layers on the surface of cement. Specifically, WO 2014148944 coined the term "nano-cement" to refer to the formation of a nano-layer having a thickness from 20 to 100 nm of melted dry superplasticizer around the cement grain.

All of above-mentioned references are directed towards the superplasticizer being either melamine or naphthalene; the state of the superplasticizer matter being solid or powdered; the equipment being mills, specifically ball mills; and the processing stage being directed towards cement milling. These limitations lead to a number of disadvantages. Firstly, the use of melamine or naphthalene superplasticizers has been universally replaced by polycarboxylate type water reducers. The requirement for these superplasticizers to be powdered further aggravates the problem, since most of the superplasticizers on the market are liquids. Another drawback of the direct addition of the melamine or naphthalene superplasticizers on the cement grains is the observed chemical effects perturbing the action of superplasticizers. Specifically, an organo-mineral phase can form around cement particles at the early stages of hydration consuming superplasticizers in an unproductive way. It is known in the art that part of the added superplasticizer can be intercalated in diverse hydration products and this fraction is no longer available for dispersing cement agglomerates (Flatt, R. J., Houst, Y. F., A simplified view on chemical effects perturbing the action of superplasticizers, Cement and Concrete Research 31 (2001) 1169-1176). However, yet another issue is the fact that methods of applying a superplasticizer in the process of cement manufacturing is limited by use of only one kind of chemical additive, namely polymer water reducing agents, and excludes use of other chemical additives such as hydration stabilizers, accelerators and others that come in liquid form.

U.S. Pat. Nos. 5,709,743 and 7,041,167 utilize finely ground calcium silicate hydrate (C-S-H) as a setting and hardening accelerant and strength enhancing additive for cementitious products. More recent research by Land G and Stephan D, Nanoparticles as accelerators for cement hydration, Ultra-High Performance Concrete and Nanotechnology in Construction, Proceedings of Hipermat, Kassel, Mar. 7-9, 2012, pp. 112-118 discloses influence of nanoparticles on the kinetics of cement hydration and their potential to substitute conventional setting and hardening accelerators, as well as their undesirable side effects. It is taught that nano-particles, and above all nano-C-S-H seeds, added into fresh cement paste, stimulate the nucleation process during early cement hydration, accelerate setting and hardening, and result in enhanced mechanical properties of the hardened cement paste. However, the manufacturing of submicron and especially nano-sized C-S-H seeds is costly and involves complex processing, which results in extremely high prices of such hardening accelerating admixture for concrete (such as that produced by BASF™ as Master X-Seed™ 100) in comparison with known accelerating additives. Another drawback of using C-S-H as an accelerant is that it must be added as an aqueous slurry. This is a disadvantage for UHPC mixes, since the addition of water contained in the C-S-H slurry can impact the required low water to binder ratio. Recent research by Moghaddam, Sakineh E. et al. propose the synthesis of C-S-H in small scale lab conditions, not on pilot or production scale, via an in situ generated seed-mediated growth that is much more expensive than the Master X-Seed™ 100 and is presently in early stages of research (Moghaddam, Sakineh E., Vahid Hejazi, Sung Hoon Hwang, Sreeprasad Sreenivasan, Joseph Miller, Benhang Shi, Shuo Zhao et al. "Morphogenesis of cement hydrate." *Journal of Materials Chemistry A* (2017). Doi: 10.1039/C6TA09389B).

With all the diversity of known mortar and concrete compositions and methods of their making, the processes for preparing shaped concrete elements and structures from these compositions can be roughly described by a basic process with some slight variations, namely mixing dry cement compositions with sand, aggregates, water and chemical additives, casting shaped elements and structures and hardening the subjects. The workability of the paste and fresh concrete, and quality of the hardened cementitious subjects, is determined by the quality of mixing process, and more specifically by the extent to which the blending process can provide uniformity of distribution of the mixture components and deliver water and chemicals to each cement grain. Specifically, it is known in the art that the mixture performance is a quantity of homogeneity and thus a "quality criteria". Indeed, Dehn, F. in Influence of Mixing Technology on Fresh Concrete Properties of HPFRCC, Proceedings of Int'l RILEM workshop on HPFRCC in structural applications, Honolulu, USA, published by RILEM SARL, 2006 teaches that mixing processes have an emphatic influence on the obtainable concrete properties in the fresh state and that the efficiency of a mixer is determined by the homogeneity of the concrete produced.

There has been extensive research on processing cementitious pastes in various types of mixers, including drum mixers, pan mixers, plaster/mortar mixers, planetary mixers and intensive Eirich mixers, to study the workability of pastes and various properties of hardened concrete such as density, strength, degree of homogenization of various components in the concrete, cement hydration dynamics, and others. It is known in the art that properties of concrete are improved by increasing the intensity of the mixing process. However, there are intrinsic limitations with such existing mixing technologies. Specifically, existing mixing technologies do not achieve the highest possible potential strength of the hardened cementitious subject. Increasing intensity in the existing mixing technology improves components homogenization and delivery of water and chemical additives to these components to a certain limited mixing intensity, after which, further increases in mixing intensity leads to de-mixing and component separation, which in turn results in decreased concrete strength.

Mixture of cementitious material is heterogeneous, containing different materials with a wide range of particle sizes, densities, shapes, etc. Considering a continuum of cementitious material comprising three major product groups: cement paste (cement-water system), mortar (cement-water-sand system), and concrete (cement-water-sand-aggregates system), it may be noticed that the rheological properties of these groups are significantly different. Accordingly, each of these group of materials requires its optimum energy for providing the best homogenization. Existing mixing technologies deliver generally the same energy to all different components, thus are unable, regardless of the mixer type, to supply the specific required energy to a particular group of the components, and accordingly cannot provide the best possible mixture homogenization. Another drawback of the existing mortar/concrete mixing technology is a common workflow with water addition to dry mix, which causes liquid enriched lumps or agglomerates at the moment of water contacting powder, and subsequent highly energetic mechanical treatment with plenty (sometimes extra amounts) of water addition is required for the lumps to be homogenized, and for water to be delivered to the majority of cement particles. Finally, the problems with existing mortar/concrete process mixing technologies are magnified by the fact that though the designers of mixers appear to recognize that there may be distinctive differences in rheology between cement, mortar and concrete mixtures, there is no explicit mathematical model which determines the rheology of each of these mixtures and defines the optimal mixing parameters on the basis of such a model.

In addition to problems related to wet mixtures, there are recognized problems pertaining to dry cementitious mixtures containing Portland cement and other fine and highly hygroscopic components such as silica fume. These problems include but are not limited to: reduced and limited shelf life, excess dusting which can be hazardous, and the segregation of the components in the process of transportation and handling of the mixtures. An important property of cement is shelf life which is dependent on the ability to maintain its chemical activity during prolonged storage. Cement is a hygroscopic material, and in the presence of moisture it undergoes hydration. Absorption of moisture from the air causes the irreversible chemical interaction of cement with water. As the result, under the influence of moisture and carbon dioxide present in the atmosphere, cements lose activity in storage.

Portland cement is designed to react chemically with water and any exposure to the surrounding moisture will cause it to set and harden. Depending on the storage conditions of the cement the possible loss of its activity amounts to about 15% per month. The universal recognition of the inevitable deterioration of cement during transportation and storage explains its limited guaranteed shelf life being generally not more than 6 months, and in many cases cement only remains useful for a period of 3 months or less from delivery. Dry cementitious mixtures containing, in addition to Portland cement, other highly hygroscopic materials such as silica fume, are even more problematic in terms of limited shelf life, such materials include known UHPC's dry mixtures. As such, existing recommendations for storage of Portland cement and its dry mixtures suggests the isolation from surrounding atmosphere by using airtight multilayer plastic bags, dehumidified storage rooms with minimized air circulation, and stacking cement away from walls, etc.

A number of prior art references have attempted to improve the shelf life of cements by utilizing alternative packaging techniques. For example, CN101428992A and CN102485687A describe a dry powder mortar packaged in grouping manner and a two-component packaged cement, where the mortar components with different shelf lives are packed separately so that the component with the shortest shelf life (generally Portland cement) would not negatively affect the shelf life of the whole mixture. This solution may preserve the activity of some cement components until mixed, e.g. sand from deterioration, however these solutions do not extend the shelf life of cement. Once the components are mixed, the shelf life of the cement mixture is limited by the component with the shortest shelf life. CN 103420648A teaches a method for postponing cement solidification and prolonging expiration date, where the cement and dried sand are evenly mixed with a weight ratio of 1 to 4 and then the mixture is packaged in two layers. The method requires that part of the ambient moisture be absorbed by dry sand, thereby protecting cement from premature hydration. However, the fact is that cement is more hygroscopic that sand, and as such the method is ineffective and cannot be universally applied to various mixtures of cement and sand. Besides, such cement to sand ratio is not used in UHPC mix design.

Other prior art references have attempted to improve the shelf life of cements by pelletization. For example, U.S. Pat. No. 2,221,175 describes pelletizing Portland cement to improve the cement for storage purposes and to eliminate a dust nuisance with use of water soluble binders or/and water insoluble binders. There are several problems with this pelletization method. In the case of the water insoluble binder, the granules/pellets should be re-grinded before mixing with water to the size of the original cement grains, since cement should be in the state of a fine powder in order to act as a hydraulic binder when mixed with water. Furthermore, the hardened water insoluble binder would reduce activity of the cement by covering part of the cement grains and creating obstacles for making a hardened monolithic smooth cement matrix. In the case of the water soluble binder, the water in the binder would cause hydration of the cement and create hydrated cement granules, which would reduce the cement activity and require re-grinding of the cement containing hydrated agglomerates. U.S. Pat. No. 8,992,679 describes dry construction pellets comprising uncured cement powder and a non-reacting binder which may be a small amount of water not sufficient to totally cure the cement. However, the pellets according to U.S. Pat. No. 8,992,679 have essentially the same problems as the above mentioned U.S. Pat. No. 2,221,175. Furthermore, the small amount of water described in U.S. Pat. No. 8,992,679 is not sufficient to fully cure the cement. Rather, the amount of water disclosed would cure the cement partially, thereby reducing partial activity of the cement. Another shortfall of the dry pellets according to the U.S. Pat. No. 8,992,679 is that while comprising cement, sand and gravel, the dry pellets lack any essential UHPC supplemental cementitious materials (SCM) like silica fume, fly ash, etc. Additionally, neither U.S. Pat. No. 2,221,175 nor U.S. Pat. No. 8,992,679 disclose that the cementitious materials contain reinforcing micro-fibers.

It is known it the art that the efficiency of reinforcing fibers is defined by the strength of the fibers themselves and by the bonding strength between the fibers and the concrete matrix. Generally, smooth metal fibers have poor bonding to cementitious matrix. There are two known methods in the art of improving this bonding slip performance, the first by utilizing fibers having some special shape (U.S. Pat. Nos. 4,960,649 and 5,981,630), and the second method involves either treating the surface of the fibers with chemical treatments such as strong acids which etch the surface or by the deposition of mineral compounds on the fibers (U.S. Pat. Nos. 6,955,844; 6,478,867).

Finally, U.S. Pat. No. 4,031,184 relates to a process of reclaiming cement kiln dust and U.S. Pat. No. 4,341,562 teaches kiln dust pellets or cement kiln dust and fly ash pellets for making a lightweight concrete. These patents propose pelletizing cement for making non-dissolvable aggregates.

It is an object of the following to obviate or mitigate at least one of the foregoing disadvantages.

SUMMARY

In one aspect, a multicomponent macro-cement composition is provided, the composition comprising: cementitious materials comprising micron-sized particles; and supplemental cementitious materials (SCM's) of submicron or nano-sized particles or a combination thereof coated or loaded on the cementitious materials.

In embodiments, the cementitious materials may further comprise pozzolanic materials of micron-sized particles.

In embodiments, the composition may further comprise aggregates.

In embodiments, the composition may further comprise reinforcement fibres.

In embodiments, the composition may further comprise a binder.

In embodiments, the composition may be produced in the form of granules, pellets, briquettes or tables.

In embodiments, the cementitious materials may be Portland cement, fly ash (class C as received), or slag (ground granulated blast furnace).

In embodiments, the pozzolanic materials may be fly ash (class F as received), coarse metakaolin, or calcinated clay.

In embodiments, the SCM's may be siliceous-$SiO_2$-containing particles.

In embodiments, the siliceous-$SiO_2$-containing particles may be silica fume, quartz (fine ground), precipitated silica, fly ash (fine ground), fine metakaolin, or rice husk ash.

In embodiments, the SCM's may be nanosilica, carbon nano-tubes and nano-fibers, nano-$TiO_2$, or nano-$Fe_2O_3$ nano-clay.

In embodiments, the binder may be a polymer in the form of liquid or powdered chemical additives.

In embodiments, the additives may be superplasticizer/high range water reducers, plasticizer/mid and normal range water reducers, and/or retarding or accelerating admixtures for concrete.

In embodiments, the SCM's may be affixed to the cementitious materials by dry coating without use of a binder.

In embodiments, the aggregates may be fine aggregates.

In embodiments, the fine aggregates may be natural or manufactured sand, quartz or bauxite.

In embodiments, the composition may further comprise coarse aggregates.

In embodiments, the coarse aggregates may be gravel, crushed stone, recycled concrete or geosynthetic aggregates.

In embodiments, the crushed stone may be limestone, basalt, granite, or bauxite.

In embodiments, the reinforcement fibers may be metal fibers, glass fibers, synthetic fibers, or natural fibers, including but not limited to cellulose and hemp fibers.

In embodiments, the metal fibers may comprise any of steel, stainless steel, titanium, copper or brass coated steel.

In embodiments, the synthetic fibers may comprise polypropylene, carbon fibers or aramid fibers.

In embodiments, the reinforcement fibers during the process of dry coating and/or loading of macro-cement may be dented by aggregates to provide a scratched surface thereon, and wherein the scratched surface accommodates particles of the composition.

In embodiments, the composition may be produced in the form of granules, pellets, briquettes or tablets by mechanical activation during the process of coating and/or loading of the cementitious materials.

In embodiments, the activation may comprise pressure and shear forces causing activation of the cementitious materials.

In another aspect, a method of producing a multi-component macro-cement is provided, the method comprising coating or loading micron-sized particles of cementitious materials with supplemental cementitious materials (SCM's) of submicron or nano-sized particles or a combination thereof.

In embodiments, the method may further comprise adding pozzolanic materials of micron-sized particles to the cementitious materials prior to the coating or loading.

In embodiments, the method may further comprise adding aggregates in the macro-cement prior to the coating or loading.

In embodiments, the method may further comprise adding reinforcement fibres in the macro-cement prior to the coating or loading.

In embodiments, the method may further comprise utilizing a binder.

In embodiments, the method may further comprise engineering the multi-component macro-cement by preparing it as granules, pellets, briquettes or tables.

In embodiments, the cementitious materials may be Portland cement with Blaine fineness in the range from about 250 $m^2$/kg to about 750 $m^2$/kg, approximately corresponding to particles sizes in the range from about 10% diameter d10=0.7 μm to about 90% diameter d90=70 μm.

In embodiments, the Portland cement may have Blaine fineness in the range from about 350 $m^2$/kg to about 550 $m^2$/kg, approximately corresponding to particles sizes in the range from about d10=1 μm to about d90=50 μm.

In embodiments, the cementitious materials may be calcium-aluminate cements.

In embodiments, the cementitious materials may be fly ash (class C) with an approximate fineness retained on 45 μm sieve residue from about 5% to 45%, approximately corresponding to particles sizes from about d10=1 μm to about d90=50 μm.

In embodiments, the cementitious materials may be slag (ground granulated blast furnace) with Blaine fineness in the range from about 250 $m^2$/kg to about 600 $m^2$/kg, approximately corresponding to particles sizes in the range from about 10% diameter d10=1 μm to about 90% diameter d90=70 μm.

In embodiments, the pozzolanic materials may be fly ash (class F), siliceous particles with an approximate fineness retained on 45 μm sieve residue from about 5% to 45%, approximately corresponding to particles sizes from about d10=1 μm to about d90=50 μm.

In embodiments, the SCM's of submicron particles may be silica fume (micro-silica) with specific surface in the range from 5,000 $m^2$/kg to 200,000 $m^2$/kg.

In embodiments, the silica fume may more specifically have specific surface in the range from 15,000 $m^2$/kg to 30,000 $m^2$/kg, or typically from about 10 nm (nanometers) to 1 μm.

In embodiments, the amount of the SCM's may be in the range of 5-50% of the weight of cementitious materials.

In embodiments, the amount of the SCM's may be in the range of 20-40% of the weight of cementitious particles.

In embodiments, the SCM particles may be in the size range 1-100 nm.

In embodiments, the SCM particles may comprise nano-silica, carbon nano-tubes and fibers, nano-clay, nano-TiO2, nano-Fe2O3 or other nano-sized SCM particles.

In embodiments, the amount of the nanosilica may be in the range of 0.25-10% of the weight of macro-cement.

In embodiments, the amount of the nanosilica may be in the range of 1-5% of the weight of macro-cement.

In embodiments, the amount of the nanosilica may be in the range of 2-3% of the weight of macro-cement.

In embodiments, the amount of carbon nano-tubes and fibers may be in the range of 0.003-1% of the weight of macro-cement.

In embodiments, the amount of carbon nano-tubes and fibers may be in the range of 0.01-0.5% of the weight of macro-cement.

In embodiments, the amount of carbon nano-tubes and fibers may be in the range of 0.05-0.1% of the weight of macro-cement.

In embodiments, the amount of nano-TiO2 may be in the range of 0.01-10% of the weight of macro-cement.

In embodiments, the amount of nano-TiO2 may be in the range of 1-5% of the weight of macro-cement.

In embodiments, the amount of nano-Fe2O3 may be in the range of 0.01-10% of the weight of macro-cement.

In embodiments, the amount of nano-Fe2O3 may be in the range of 3-5% of the weight of macro-cement.

In embodiments, the binder may be a polymer in the form of liquid or powdered chemical additives.

In embodiments, the binder may be a polymer in the form of liquid chemical admixtures for concrete.

In embodiments, the polymer may comprise water-reducing, set-retarding, bonding and other admixtures used for concrete.

In embodiments, the water-reducing polymer may be a superplasticizer.

In embodiments, the superplasticizer may be melamine-based or naphthalene-based or polycarboxylate-based.

In embodiments, the amount of superplasticizer may be in the range of 0.1-10% by weight of the macro-cement.

In embodiments, the amount of superplasticizer may be in the range of 0.5-5% of the weight of macro-cement.

In embodiments, the amount of superplasticizer may be in the range of 1-2.5% of the weight of macro-cement.

In embodiments, the retarding admixtures may comprise any of: lignin, borax, sugars, organophosphates, tartaric acid and salts, sodium gluconate and glucoheptonate, sodium phosphates and zinc salts.

In embodiments, the amount of retarding admixture may be in the range of 0.05-0.5% of the weight of macro-cement.

In embodiments, the bonding admixtures may comprise any of: polyvinyl chloride, polyvinyl acetate, acrylics, and butadiene-styrene copolymers.

In embodiments, the coating may be performed by dry coating without binder under conditions of strong mechanical forces.

In embodiments, the loading may be performed by dry coating with binder under conditions of strong mechanical forces.

In embodiments, the strong mechanical forces may comprise impact, compression and shear force exerted on the particles, resulting in mutual collisions of the particles with repeated compression/shear deformation of the particles continuum.

In embodiments, the aggregates may be fine aggregates.

In embodiments, the fine aggregates may be natural or manufactured, quartz or bauxite sand.

In embodiments, the method may further comprise coarse aggregates.

In embodiments, the coarse aggregates may be gravel, crushed stone, recycled concrete or geosynthetic aggregates.

In embodiments, the crushed stone may be limestone, basalt, granite, or bauxite.

In embodiments, the reinforcement fibers may be metal fibers, glass fibers, synthetic fibers, or natural fibers, including but not limited to cellulose and hemp fibers.

In embodiments, the metal fibers may comprise any of steel, stainless steel, titanium, copper or brass coated steel.

In embodiments, the synthetic fibers may comprise polypropylene, carbon fibers or aramid fibers.

In embodiments, the reinforcement fibers during the process of dry coating and/or loading of macro-cement may be dented by aggregates to provide a scratched surface thereon, and wherein the scratched surface accommodates particles of the composition.

In embodiments, the macro-cement may be produced in the form of granules, pellets, briquettes or tablets by mechanical activation during the process of coating and/or loading of the cementitious materials.

In embodiments, the activation may comprise pressure and shear forces causing physicochemical activation of the cementitious materials.

In embodiments, the granules may be produced directly in the process of coating and/or loading of the cementitious materials in equipment that performs the coating and/or loading process, the granules having a somewhat round or somewhat round and flattened shape and equivalent spherical diameter from about 1 to about 20 mm.

In embodiments, the granules may be produced in tumbling drums and pans, fluidized beds, and mixer granulators following the coating and/or loading process of the cementitious materials, the granules having a somewhat round or somewhat round and flattened shape and equivalent spherical diameter from about 1 to about 5 mm.

In embodiments, the granules may be produced in tumbling drums and pans, fluidized beds, and mixer granulators following the coating and/or loading process of the cementitious materials, the granules having a somewhat round or somewhat round and oblong shape and equivalent spherical diameter from about 2 to about 10 mm.

In embodiments, the pellets may be produced by extrusion in extruders or pelletizers following the coating and/or loading process of the cementitious materials, the pellets having a cylindrical shape and equivalent spherical diameter from about 5 to about 40 mm.

In embodiments, the briquettes or tablets may be produced by compression from rollers with shaped voids following the coating and/or loading process of the cementitious materials, the briquettes or tablets having a somewhat round or somewhat rectangular shape and equivalent spherical diameter from about 10 to about 50 mm.

In embodiments, the briquettes may be produced by compression from smooth rollers following the coating and/or loading process of the cementitious materials, the briquettes having a broken-up ribbon irregularly shape and equivalent spherical diameter from about 3 to about 30 mm.

In yet another aspect, a method for producing cement-based materials using multi-stage homogenization is provided, the method comprising: producing a multi-component macro-cement by coating or loading micron-sized particles of cementitious materials with supplemental cementitious materials (SCM's) of submicron or nano-sized particles or a combination thereof; injecting the macro-cement into an intense moving energized water stream; producing a first mixture by homogenizing the water stream with the macro-cement in an intensive homogenizer with an energy density sufficient to overcome cohesiveness of the macro-cement to substantially complete dispersion and homogenization without separation of multi-component macro-cement and water; directing the first mixture into a second mixer with lower energy density than the intensive homogenizer; adding larger size particles into the second mixer; producing a second mixture by mixing the first mixture and the larger size particles in the second mixer to sufficiently match conditions of substantially complete homogenization of the second mixture without separation of multi-component macro-cement, water, and larger size particles; directing the second mixture into a third mixer with lower energy density than the second mixer; adding larger aggregates into the third mixer; producing a third mixture by mixing the second mixture and the larger aggregates in the third mixer to sufficiently match conditions of substantially complete homogenization of the third mixture without separation of multi-component macro-cement, water, larger size particles and larger aggregates.

In embodiments, the multi-component macro-cement may be a powdered macro-cement.

In embodiments, the multi-component macro-cement may be engineered forms of macro-cement.

In embodiments, the reinforcing fibers may also be added to the third mixer, and the third mixer is operated to sufficiently match conditions of substantially complete homogenization of the third mixture without separation of multi-component macro-cement, water, larger size particles, larger aggregates and reinforcing fibers.

In embodiments, the first mixture may comprise a cement paste and the homogenizing of the cement paste with plastic viscosity $\mu$ Macro-Cement takes place with shear rate $\gamma$ Macro-Cement providing shear stress $\tau_{Macro\text{-}cement}$ in the cement paste in the range from dynamic yield stress $\tau_{o\ Macro\text{-}cement}$ corresponding to minimum shear stress to maintain paste flow to ultimate dynamic stress $\tau_{d\ Macro\text{-}cement}$ corresponding to fully destroyed structure of the cement paste, wherein the ultimate dynamic stress $\tau_d$ is approximately ten times the dynamic yield stress $\tau_{o\ Macrocement}$ so that $\tau_{0\ Macrocement} < \tau < 10\ \tau_{o\ Macrocement}$.

In embodiments, the ultimate dynamic stress $\tau_d$ may be approximately four times the dynamic yield stress $\tau_{o\ Macrocement}$ so that $\tau_{0\ Macrocement} < \tau < 4\ \tau_{o\ Macrocement}$.

In embodiments, the plastic viscosity $\mu$ Macro-Cement may be in the range from about 0.01 to about 1 Pa·s, and the yield stress $\tau_{o\ Macro\text{-}cement}$ is in the range from about 10 to about 100 Pa.

In embodiments, the second mixture may comprise a mortar paste and the homogenizing of the mortar paste with plastic viscosity μ mortar takes place with shear rate γ mortar providing shear stress $\tau_{mortar}$ in the mortar paste in the range from dynamic yield stress $\tau_{0\ mortar}$ corresponding to minimum shear stress to maintain paste flow to ultimate dynamic stress $\tau_{d\ mortar}$ corresponding to fully destroyed structure of the mortar paste, wherein the ultimate dynamic stress $\tau_{d\ mortar}$ is approximately ten times the dynamic yield stress $\tau_{0\ mortar}$ so that $\tau_{0\ mortar} < \tau_{mortar} < 10 \cdot \tau_{0\ mortar}$.

In embodiments, the ultimate dynamic stress $\tau_{d\ mortar}$ may be approximately four times the dynamic yield stress $\tau_{0\ mortar}$ so that $\tau_{0\ mortar} < \tau_{mortar} < 4 \cdot \tau_{0\ mortar}$.

In embodiments, the plastic viscosity μ mortar may be in the range from about 1 to about 10 Pa·s, and the yield stress $\tau_{0\ mortar}$ is in the range from about 100 to about 500 Pa.

In embodiments, the third mixture may comprise a concrete paste and the homogenizing of the concrete paste with plastic viscosity μ concrete takes place with shear rate γ concrete providing shear stress $\tau_{concrete}$ in the concrete paste in the range from dynamic yield stress $\tau_{0\ concrete}$ corresponding to minimum shear stress to maintain paste flow to ultimate dynamic stress $\tau_{d\ concrete}$ corresponding to fully destroyed structure of the concrete paste, wherein the ultimate dynamic stress $\tau_{d\ concrete}$ is approximately ten times the dynamic yield stress $\tau_{0\ concrete}$ so that $\tau_{0\ concrete} < \tau_{concrete} < 10 \cdot \tau_{0\ concrete}$.

In embodiments, the ultimate dynamic stress $\tau_{d\ concrete}$ may be approximately four times the dynamic yield stress $\tau_{0\ concrete}$ so that $\tau_{0\ concrete} < \tau_{concrete} < 4 \cdot \tau_{0\ concrete}$.

In embodiments, the plastic viscosity μ concrete may be in the range from about 10 to about 100 Pa·s, and the yield stress $\tau_{0\ concrete}$ is in the range from about 500 to about 2000 Pa.

In embodiments, the intense moving energized water stream may be provided with input energy by any of high-pressure nozzles, rotor-stator mixers, Venturi system or ultrasonic processors, the input energy being transformed into frictions, turbulences, micro-turbulences, waves, microwaves and cavitation promoting uniform and substantially complete macro-cement homogenization.

In embodiments, the intensive homogenizer may be a concrete mixer.

DESCRIPTION OF THE DRAWINGS

The foregoing and other features, aspects and advantages of the following are described in detail below with reference to the Figures of various embodiments, which are intended to illustrate and not to limit the invention. A greater understanding of the embodiments will be had with reference to the Figures, in which:

FIG. 21 shows a table outlining a range of rheological parameters of macro-cement paste, mortar, and concrete.

DETAILED DESCRIPTION

Figure 1:
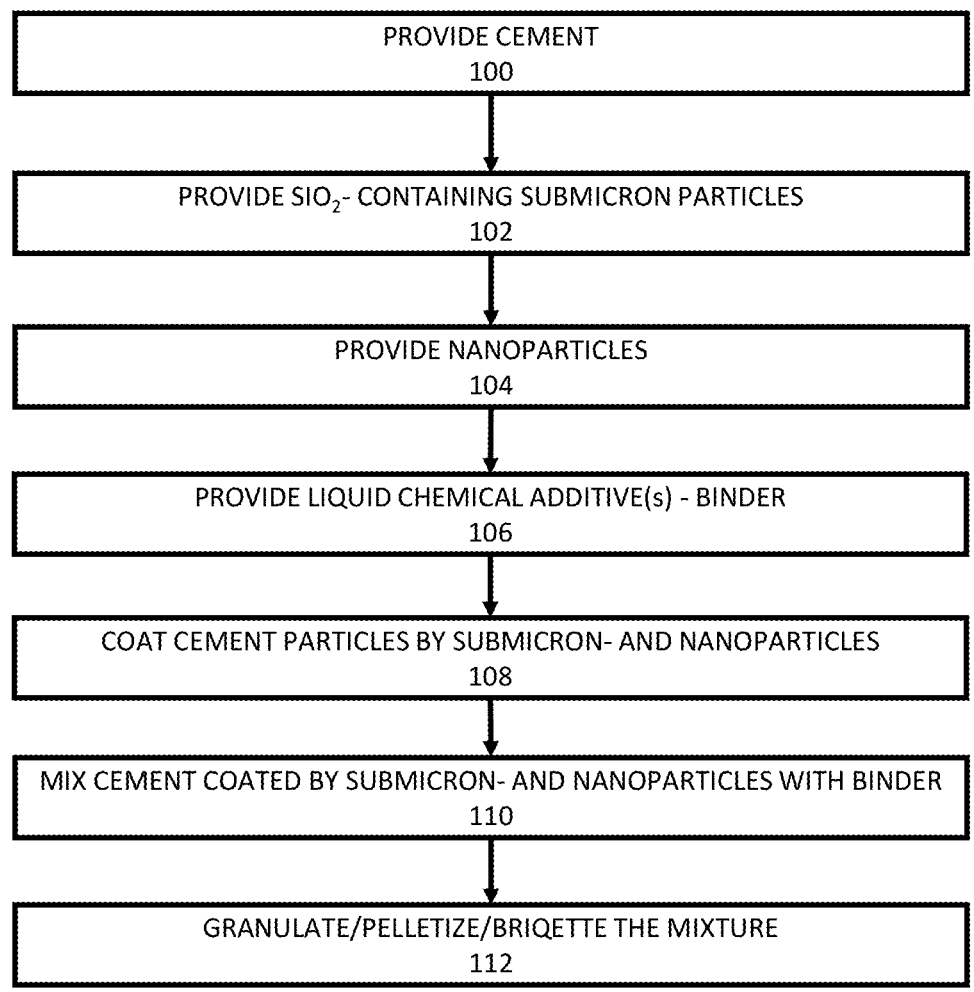
FIG. 1 is a flow chart of a method of producing macro-cement according to an embodiment.

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative", "exemplifying" or "serving as an example, instance, or illustration," and not necessarily as "preferred" over other embodiments; the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components; the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure. Further definitions for terms may be set out herein; these may apply to prior and subsequent instances of those terms, as will be understood from a reading of the present description.

The following pertains to a macro-cement and associated methods useful for preparing pastes, mortars, concretes and other cement-based materials having high workability, high density, and high strength. More particularly, the following pertains to a method of producing a macro-cement comprising cement, supplemental cementitious materials (SCM's), including siliceous submicron-sized particles and nano-sized particles, and polymers in the form of liquid or dry chemical admixtures for concrete. The cement mixture may be used for making ultra-high performance concrete (UHPC).

The particles are affixed with chemical admixtures and/or by dry coating, homogenized in water at high energy levels, in subsequent process steps homogenized as a mixture at lower energy levels in water with sand and/or other aggregates of greater dimensions, and finally the mixture can be cast into shaped elements and hardened. Optionally, after the particles are affixed with chemical admixtures or by dry coating, the macro-cement mixture can be engineered into solid formations such as granules, pellets, briquettes or tablets. The methods produce low or dust-free macro-cement and engineered cement, wherein the cements may be used for making ultra-high performance concrete (UHPC).

The term "macro-cement" refers herein to both the dry macro-cement produced from the combination of these ingredients and the mixture of the ingredients themselves. In embodiments, the following provides a method of producing "engineered forms of macro-cement" such as granulated, pelletized, briquetted, tabletted engineered dust-free macro-cement forms with extended shelf life and high workability useful for preparing pastes, mortars, concretes and other cement-based materials with high density and strength, increased early and final strengths, and accelerated reaction rate in cementitious mixtures. Furthermore, processes of homogenizing said macro-cement compositions or engineered forms of macro-cement at various energy levels in water and at later stages adding sand and aggregates, as well as optionally set accelerating admixtures which may be loaded onto the sand and/or aggregates, is provided.

An exemplary embodiment of the following includes a method of making macro-cement and a multi-stage homogenization process for preparing macro-cement based materials. The method may comprise mechanical processing of micron-sized cementitious such as Portland cement, fly ash (class C as received), slag (ground granulated blast furnace), or pozzolanic particles such as fly ash (class F as received), coarse metakaolin, calcinated clay, etc., submicron-sized SCM particles such as silica fume, fly ash (fine ground), quartz (fine ground), precipitated silica, fine metakaolin, rice husk ash, etc., nano-sized SCM particles such as nanosilica, carbon nano-tubes and nano-fibers, nano-$TiO_2$, nano-clay etc., a binding agent being polymers in the form of liquid or powdered chemical additives such as superplasticizer/high range water reducers, and/or plasticizer/mid and normal range water reducers and/or retarding, accelerating such as set or early strength or other chemical admixtures for concrete. The method comprises homogenizing the macro-cement composition at high energy levels in water to form a paste, and in subsequent process steps homogenizing the paste at lower energy levels with sand and/or aggregates of greater dimensions and the mixture is cast into a shaped element and hardened.

Another exemplary embodiment of the following includes a method of making granulated, pelletized, briquetted or tabletted engineered macro-cement wherein the said macro-cement is granulated, pelletized, briquetted or tabletted before wet homogenization.

Generally, the method of making macro-cement comprises a mechanical multi-stage method. At the first stage, submicron-sized $SiO_2$-containing particles may be first coated onto larger micron-sized cementitious particles with or without pozzolanic particles (both which may also be referred to as "carriers") and subsequently nano-sized SCM particles may be loaded onto the carriers coated with $SiO_2$-containing particles. Alternatively, the larger micron-sized carriers may be first coated with nano-sized SCM particles, followed by loading with the submicron-sized $SiO_2$-containing particles; coated with only either the submicron-sized $SiO_2$-containing particles or nano-sized SCM particles; or simultaneously loaded with a mixture of submicron-sized $SiO_2$-containing particles and nano-sized SCM particles. At the second stage, the loaded larger micron-sized cementitious and if present pozzolanic particles may be coated with powdered or liquid chemical additives such as plasticizers, superplasticizers, retarders or accelerators (set and/or early strength), or other chemical admixtures for concrete.

Another embodiment of the following includes cementitious or pozzolanic carriers enveloped or "loaded" by a hygroscopic layer of $SiO_2$-containing micro-particles. The $SiO_2$-containing micro-particles may also be coated or loaded with nano-sized materials or simultaneously introduced with a suspension of nano-sized particles in water or other liquids, or optionally with dry nano-particles. The loaded cementitious or pozzolanic carriers may be exposed to chemical additives such as plasticizers, superplasticizers, retarders, accelerators or other chemical admixtures for concrete. The liquid chemical admixtures, in addition to serving its primary function as a modifier of fresh and hardened concrete properties, serves as a binder between the carrier and load particles, and between the load particles, fastening the load particles on the carrier particles.

According to the embodiments of the following, the amount of the siliceous microfiller is calculated with the purpose of creating maximum packing density of the pastes, mortars, concretes and other cement-based materials. The amount of nano-sized particles, which may include for example nanosilica, carbon nano-tubes and fibers, nano-clay, nano-$TiO_2$, or nano-$Fe_2O_3$, is calculated with the purpose of maximizing the performance of hardened cementitious products. The amount of the liquid or dry chemical admixtures is calculated with the purpose of reliable affixing of the SCM particles loaded onto the cementitious or pozzolanic carriers, and to provide high workability of these cement-based materials at low water content. Set accelerating and/or early strength accelerating admixtures such as, but not limited to, calcium chloride, triethanolamine, sodium thiocyanate, sodium/calcium formate, sodium/calcium nitrite, calcium nitrate, aluminates, and silicates, may be utilized. The dosage range of the set accelerating and/or early strength accelerating admixtures can vary from about 0.1% to about 20% by weight of cementitious material, and in most applications the preferable range is from about 0.5% to about 10% by weight of cementitious material.

Another embodiment of the following includes a method of producing engineered granulated, pelletized, briquetted or tabletted macro-cement. Cementitious or pozzolanic carriers are coated with SCM particles by dry coating and optionally a functional chemical additive may be introduced and the same sized or small SCM particles may also loaded prior to engineered formation. Specifically, liquid chemical admixtures may be first deposited onto the surface of $SiO_2$-containing particles which form a hygroscopic micro-layer encapsulating the larger cement and pozzolans particles, or liquid chemical admixtures may be deposited onto the surface of nano-sized materials encapsulating the cement particles coated by $SiO_2$-containing micro-layer, or liquid chemical admixtures may be deposited onto the surface layer comprising a mixture of submicron-sized $SiO_2$-containing particles and nano-sized SCM particles. The shape, size and density of the engineered forms of macro-cement, the amount of SCM particle loading and amount of liquid chemical admixtures are determined with the purpose of maximizing the shelf life of the engineered macro-cement, minimizing its dusting and segregation of the powdered components.

Yet other embodiments of the following includes homogenizing said macro-cement compositions or engineered forms of macro-cement at various energy levels in water and at later stages adding sand and aggregates, and optionally set accelerating admixtures which may be loaded onto the sand and/or aggregates. The wet mixing procedure utilizes multi-stage homogenization of macro-cement powder or engineered formed macro-cement differentiated at each stage of energy density, characterized in that at the first stage the powdered form of macro-cement or engineered forms of macro-cement is injected into an intense moving energized liquid stream and homogenized with an energy density required to overcome cohesiveness of the macro-cement for substantially complete dispersion and homogenization without the separation of the mix constituents, and subsequent steps involving unloading the homogenized mixture from the intensive homogenizer with high energy density and directing the mixture into a less intensive mixer with lower energy density and the addition of larger size particles such as sand and aggregates into this less intensive mixer at each step and mixing with lowering energy densities matching the conditions of substantially complete homogenization of the mix at particular steps without the separation of the mix constituents.

For purposes of the foregoing, certain aspects, advantages, and novel features of the following are described herein. It is to be understood that not necessarily all such advantages may be achieved in accordance with any particular embodiment of the following. Thus, for example, those skilled in the art will recognize that the following may be embodied or carried out in a manner that achieves one advantage or group of advantages as taught herein without necessarily achieving other advantages as may be taught or suggested herein. While numerous changes may be made by those skilled in the art, such changes are within the spirit of the invention.

Figure 2:
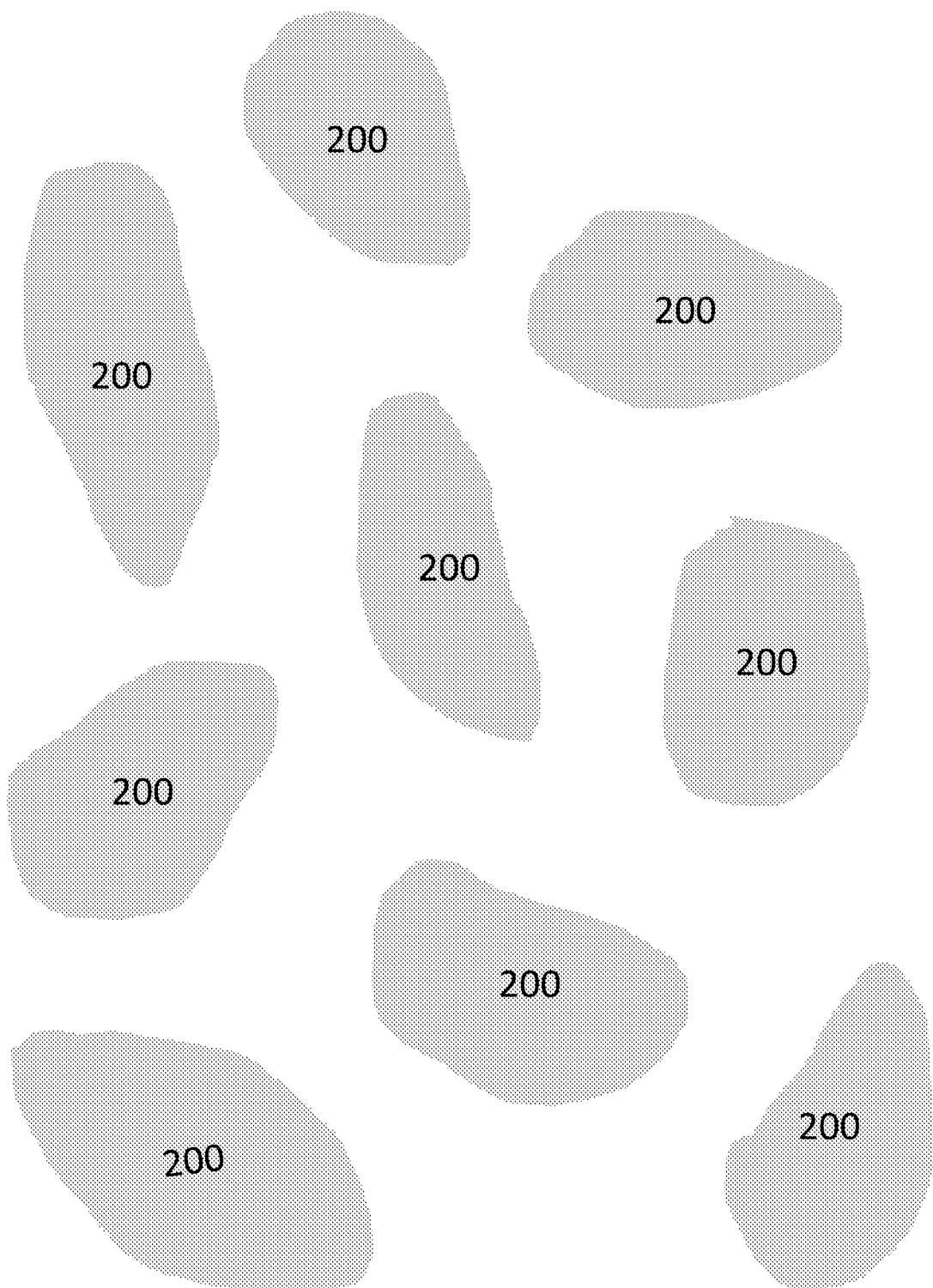
FIG. 2 shows a drawing of suspended cement particles.
Figure 3:
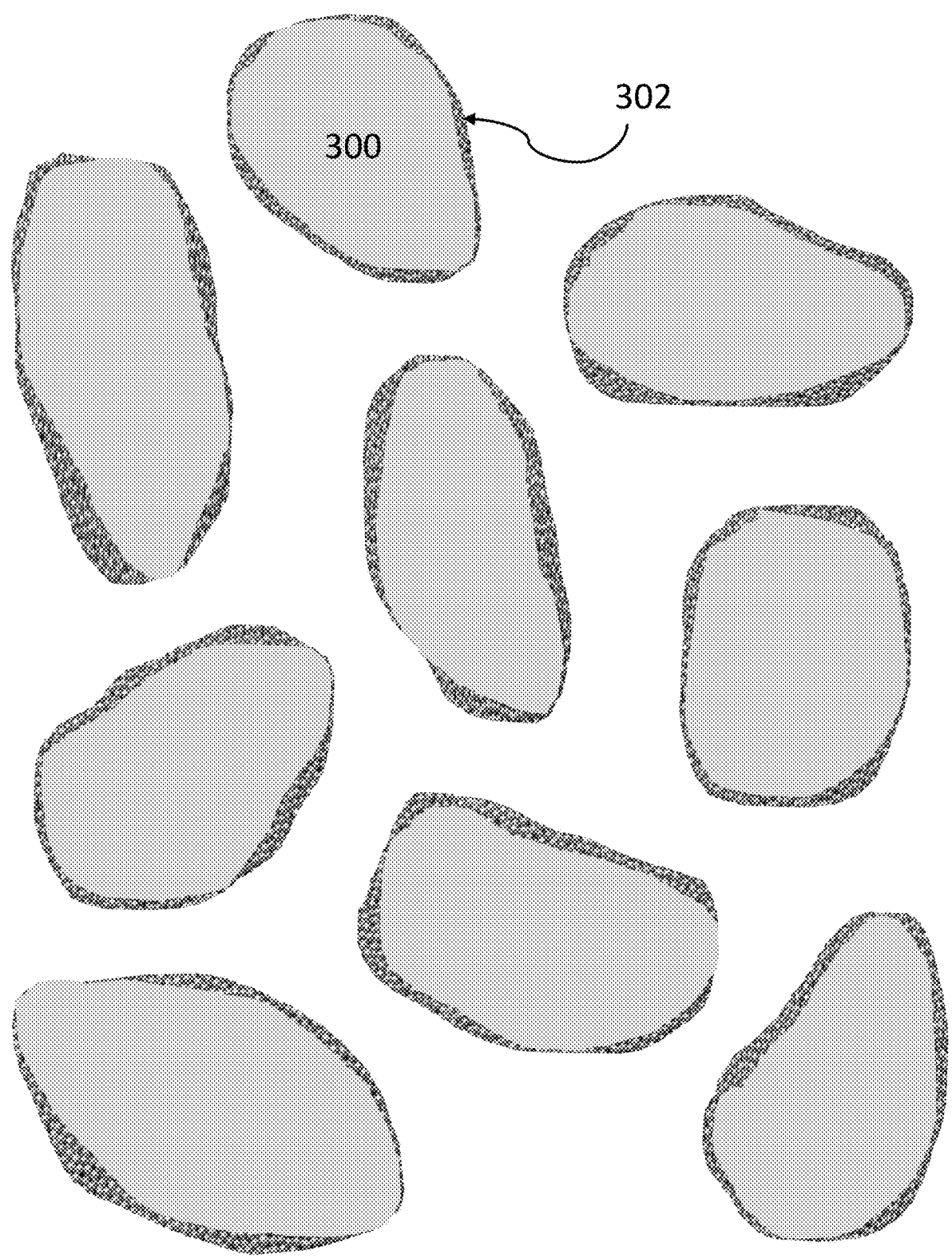
FIG. 3 shows a drawing of suspended cement particles dry coated with submicron $SiO_2$ particles and nano-sized particles.
Figure 4:
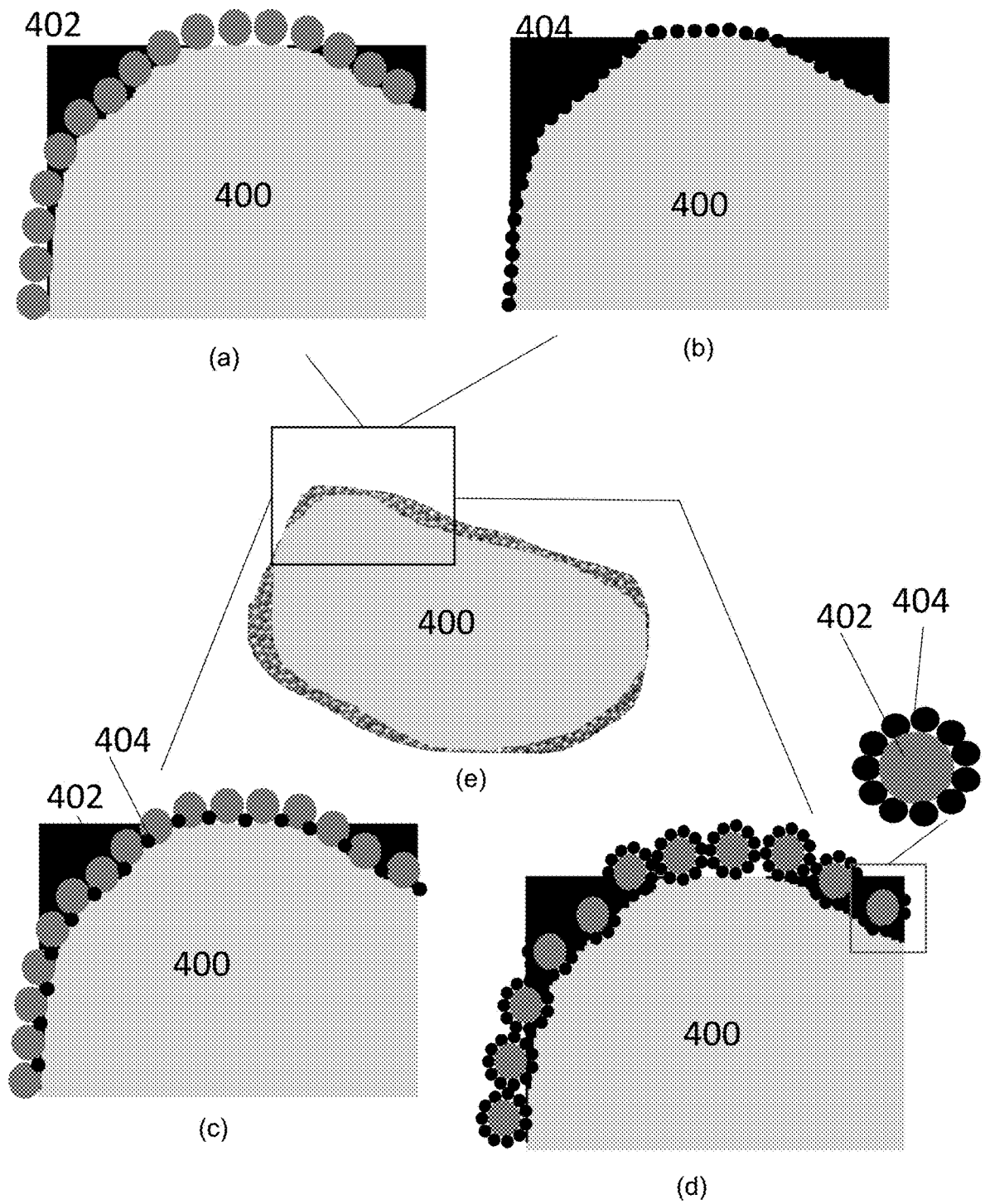
FIG. 4 shows a drawing of a micron-sized carrier cementitious or pozzolanic particle coated by submicron $S_iO_2$ containing and/or nano-sized particles according to different embodiments.
Figure 5:
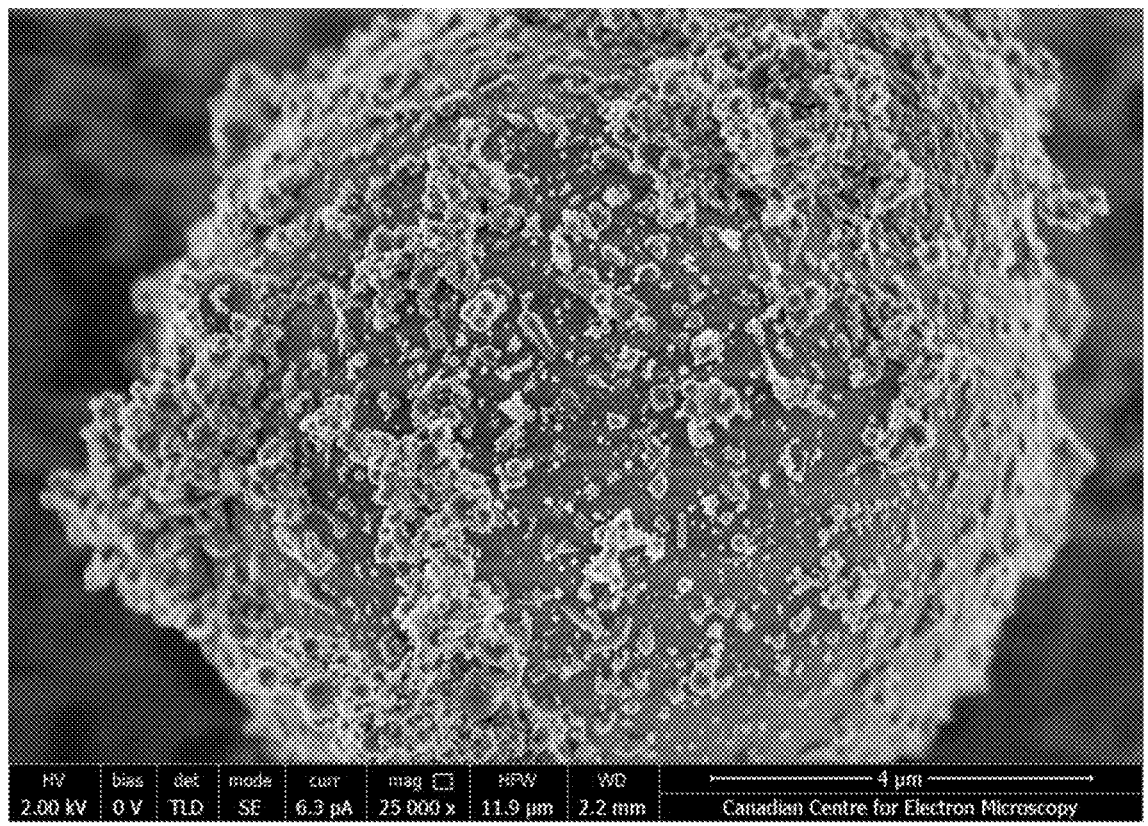
FIG. 5 shows a Scanning Electron Microscope (SEM) image with ×25,000 magnification of a pozzolanic fly ash particle dry coated by silica fume having no binder.

The herein-described method of producing macro-cement and engineered forms of macro-cement comprises a multi-stage process (FIG. 1). The first stage of the process involves mechanical processing of cement (shown as 200 in FIG. 2) with or without pozzolanic particles, termed "carrier particles", with supplemental cementitious materials (SCMs), which may include micron-sized siliceous, submicron-sized particles and/or nano-sized particles, to coat the cement particles with a monolayer of $SiO_2$-containing micron, sub-micron particles and/or nanoparticles, termed "load particles". FIG. 3 illustrates an example of several carrier particles (300) coated with load particles (302). FIG. 4(a)

illustrates micron-sized cementitious or pozzolanic carrier particles (400) coated by submicron $SiO_2$ containing particles (402). FIG. 4(*b*) illustrates micron-sized cementitious or pozzolanic carrier particles (400) coated by nano-sized particles (404). FIG. 4(*c*) illustrates micron-sized cementitious or pozzolanic carrier particles (400) coated by a mixture of submicron $SiO_2$ containing (402) and nano-sized particles (404). FIG. 4(*d*) illustrates submicron $SiO_2$ containing particles (402) coated by nano-sized particles (404), and then altogether coated onto micron-sized cementitious or pozzolanic carrier particles (400). FIG. 4(*e*) illustrates micron-sized cementitious or pozzolanic carrier particles (400) coated by submicron $SiO_2$ containing (402) and nano-sized particles (404) in a zoomed out view relative to the other views in FIG. 4. FIG. 5 shows a Scanning Electron Microscope (SEM) image with ×25,000 magnification of a pozzolanic fly ash particle dry coated by silica fume having no binder.

Figure 6:
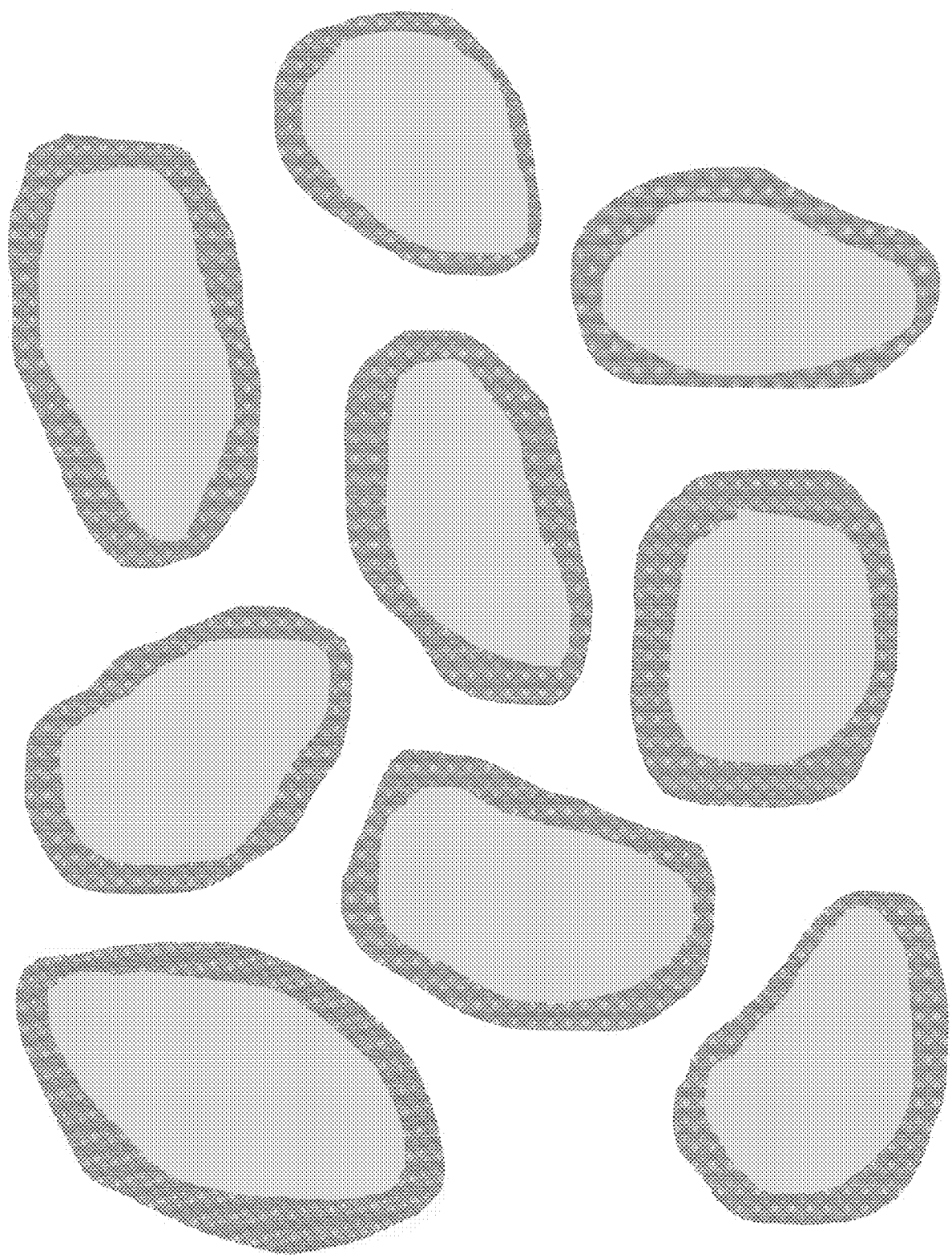
FIG. 6 shows a drawing of suspended cement particles loaded with submicron $S_iO_2^-$ containing and nano-sized particles and bound by a chemical additive.
Figure 7:
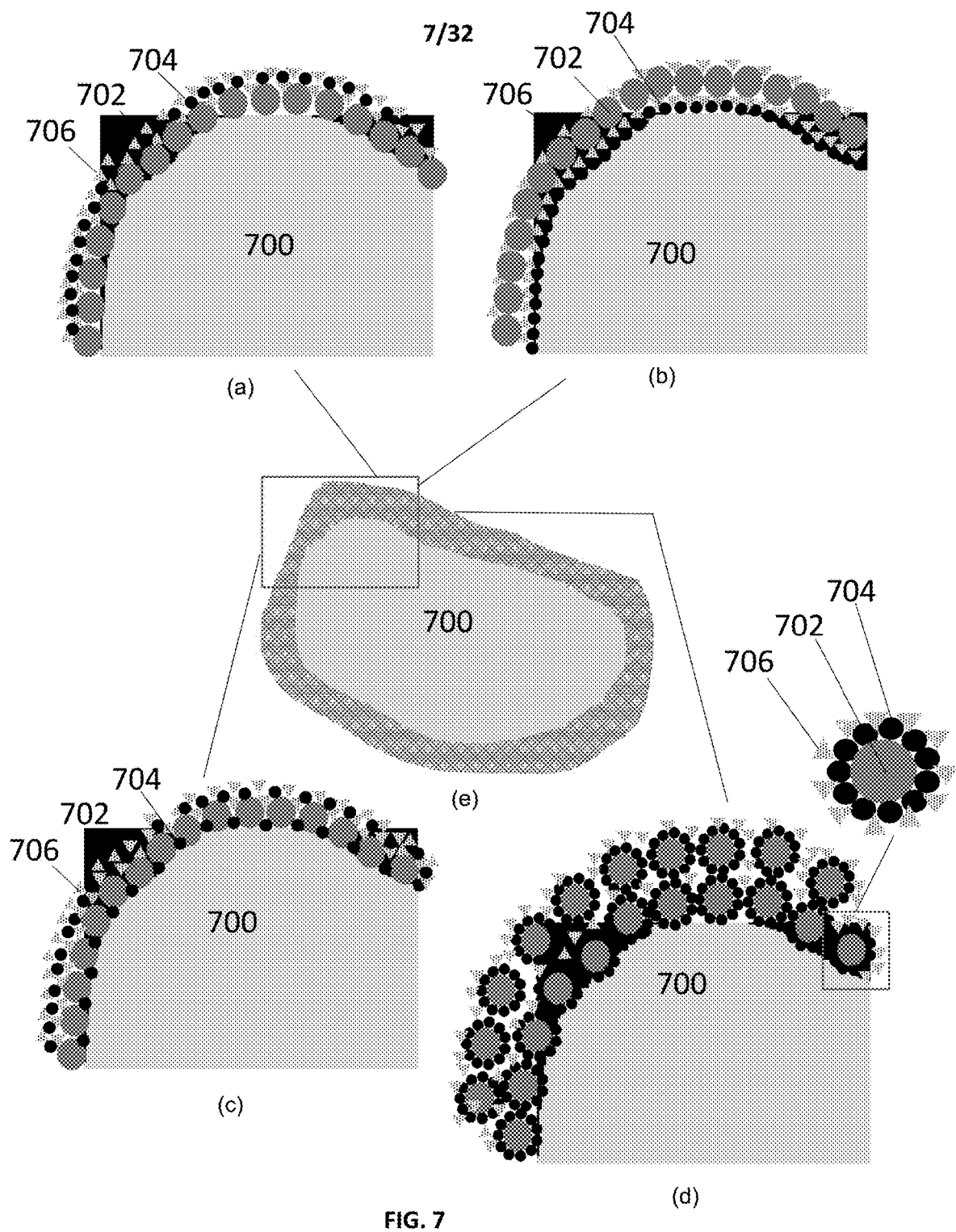
FIG. 7 shows a drawing of a micron-sized cementitious or pozzolanic carrier particle loaded by submicron $S_iO_2$ containing and nano-sized load particles which are bound by chemical additive.

The second stage involves depositing liquid chemical admixtures or dry coating onto the surface of $SiO_2$-containing load particles, creating a hygroscopic micro-layer encapsulating cement and pozzolans particles. FIG. 6, for example, shows a drawing of suspended cement particles loaded with submicron $S_iO_2$ containing and nano-sized particles and bound by a chemical additive. FIG. 7 shows a drawing of a micron-sized cementitious or pozzolanic carrier particle (700) loaded by submicron $S_iO_2$ containing (702) and nano-sized load particles (704) which are bound by chemical additive (706); FIG. 7(*a*) shows a detail view of a micron-sized cementitious or pozzolanic carrier particle (700) loaded first by submicron $S_iO_2$ containing particles (702), and then by nano-sized particles (704), and bound by chemical additive (706); FIG. 7(*b*) shows a detail view of a micron-sized cementitious or pozzolanic carrier particle (700) loaded first by nano-sized particles (704), and then by submicron $S_iO_2$ containing particles (702) and bound by chemical additive (706); FIG. 7(*c*) shows a detail view of a micron-sized cementitious or pozzolanic carrier particle (700) loaded by mixture of submicron $S_iO_2$ containing (702) and nano-sized load particles (704), and all bound by chemical additive (706); FIG. 7(*d*) shows a detail view of a submicron $S_iO_2$ containing particle (700) loaded by nano-sized guest particles (704) and bound by chemical additive (706), and then altogether loaded onto a micron-sized cementitious or pozzolanic host particle (702), and bound by chemical additive (706).

Figure 8:
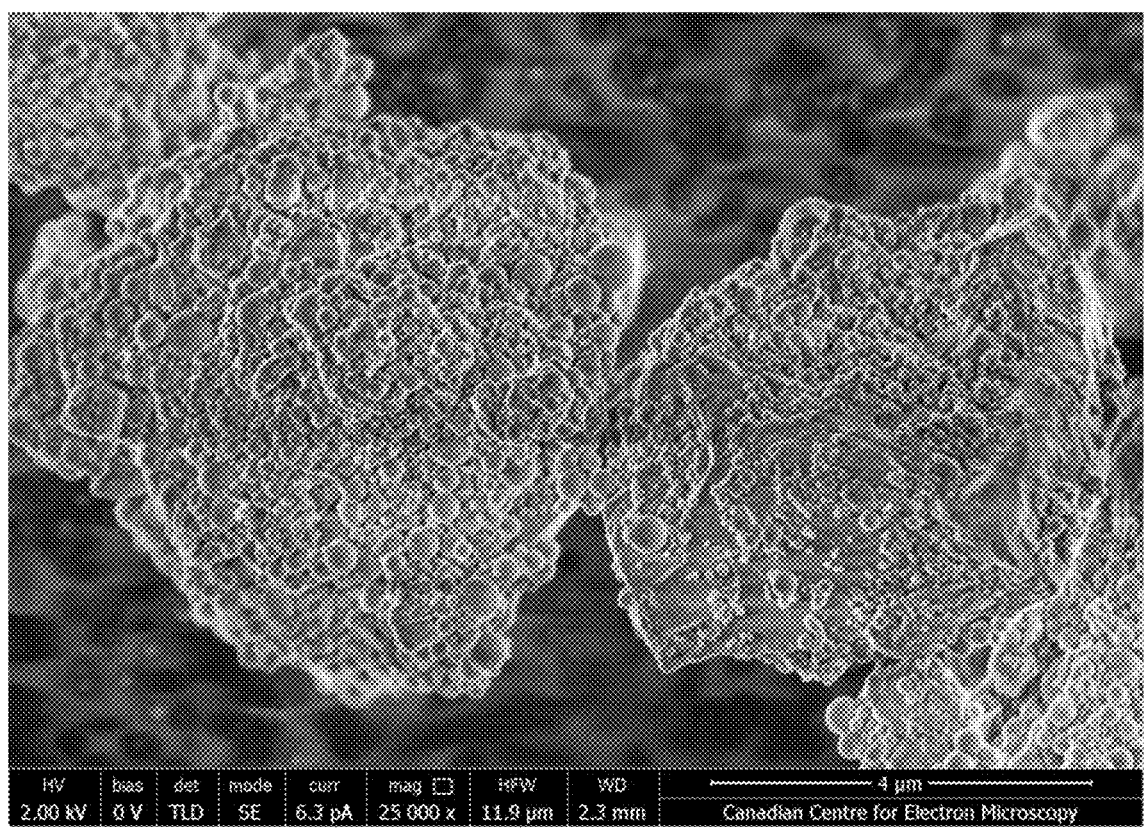
FIG. 8 shows a Scanning Electron Microscope (SEM) image with ×25,000 magnification of cement particles loaded with silica fume and bound by chemical additive—superplasticizer binder.

Specifically, the loaded cement particles are mixed with a binding agent. The binding agent may be polymers in the form of liquid or powdered chemical additives (i.e. superplasticizer/high range water reducers, plasticizer/mid and normal range water reducers) and/or retarding, accelerating or other chemical admixtures for concrete and polymers in the form of liquid chemical admixtures for concrete. The liquid chemical admixture is deposited onto a hygroscopic layer, created by including micron-sized siliceous, submicron-sized particles and/or nano-sized particles around the cement particles (as shown in FIG. 7). Binding agents are used to affix the SCM load particles onto the carrier cementitious with or without pozzolanic particles, such that the cementitious and pozzolanic particles if present become carriers loaded with a layer of SCM particles and polymers. Examples are shown in FIG. 8, which shows a Scanning Electron Microscope (SEM) image with ×25,000 magnification of cement particles loaded with silica fume and bound by chemical additive—superplasticizer binder, and FIG. 9, which shows a Scanning Electron Microscope (SEM) image with ×500,000 magnification of a cement particle loaded with silica fume with added chemical additive—superplasticizer as a binder, and explicit view of the superplasticizer string (light oblong rope in the center of the picture) binding silica fume particles to each other and to the cement particles.

Figure 12:
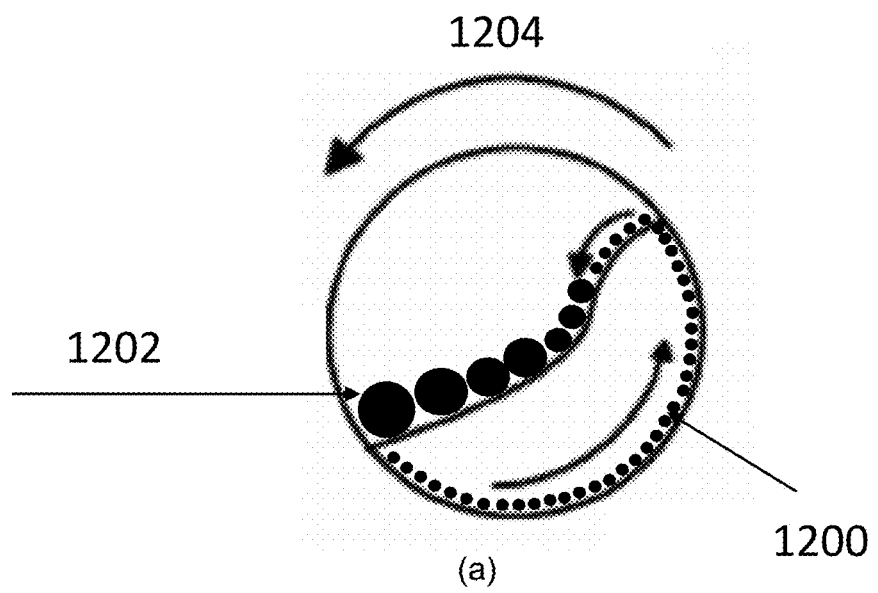
FIG. 12 shows a method of granulation by tumbling and the engineered macro-cement granulated (agglomerated) by tumbling.
Figure 12:
Figure 13:
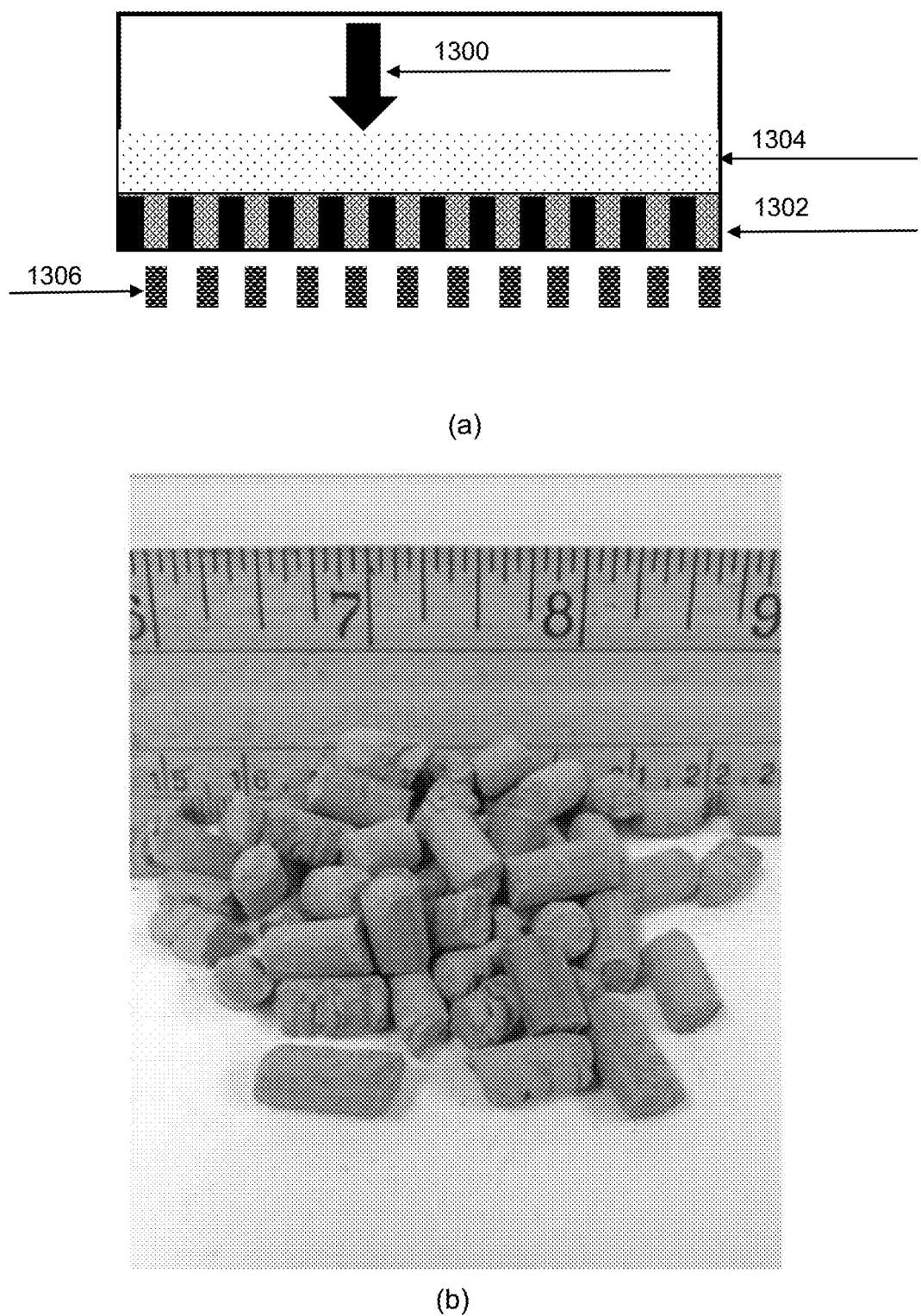
FIG. 13 shows a method of macro-cement pelletizing by compaction through extrusion and engineered macro-cement pellets.
Figure 14:
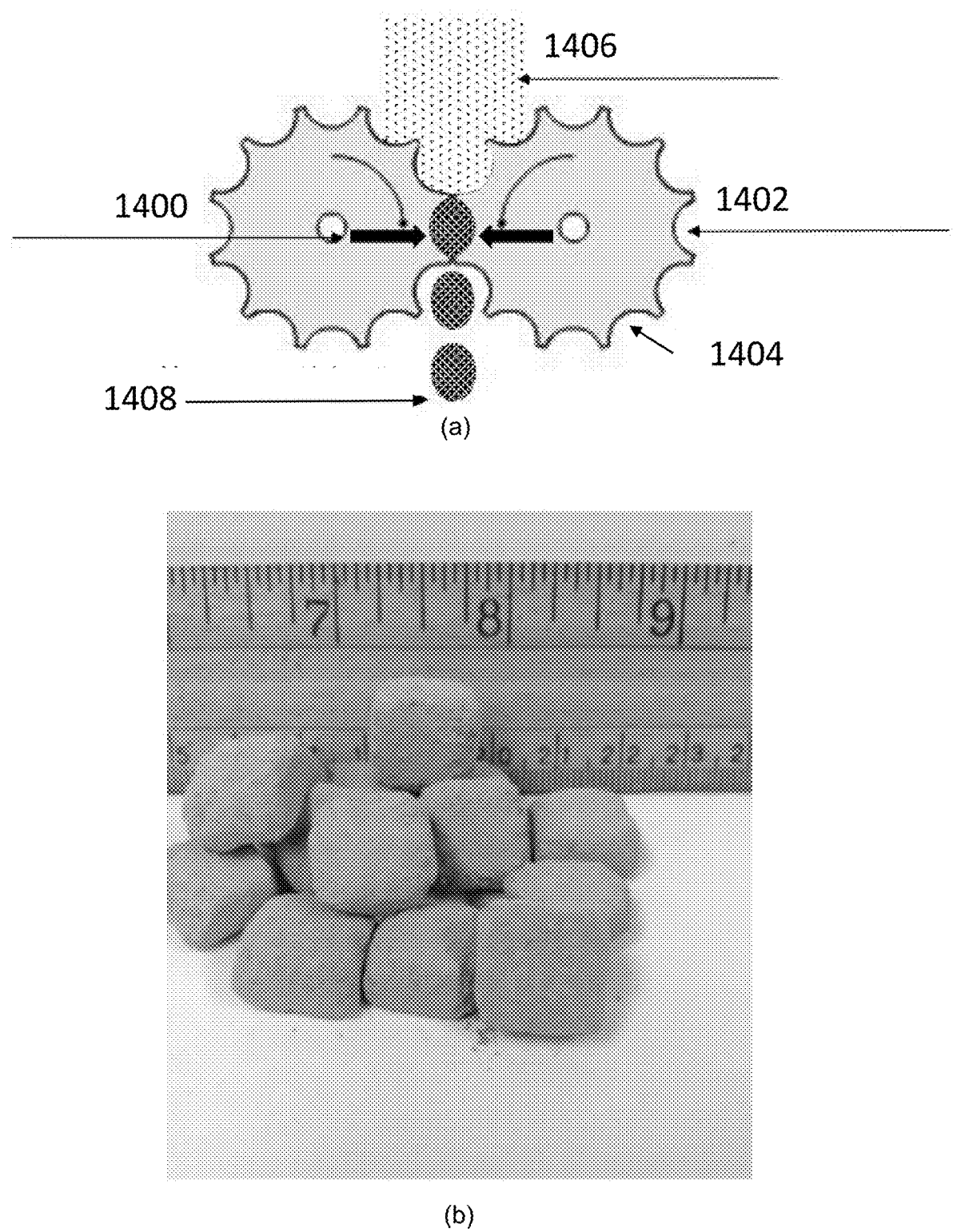
FIG. 14 shows a method of macro-cement briquetting by compaction through compression by rollers having surface briquette shaped voids and the engineered macro-cement briquettes.
Figure 15:
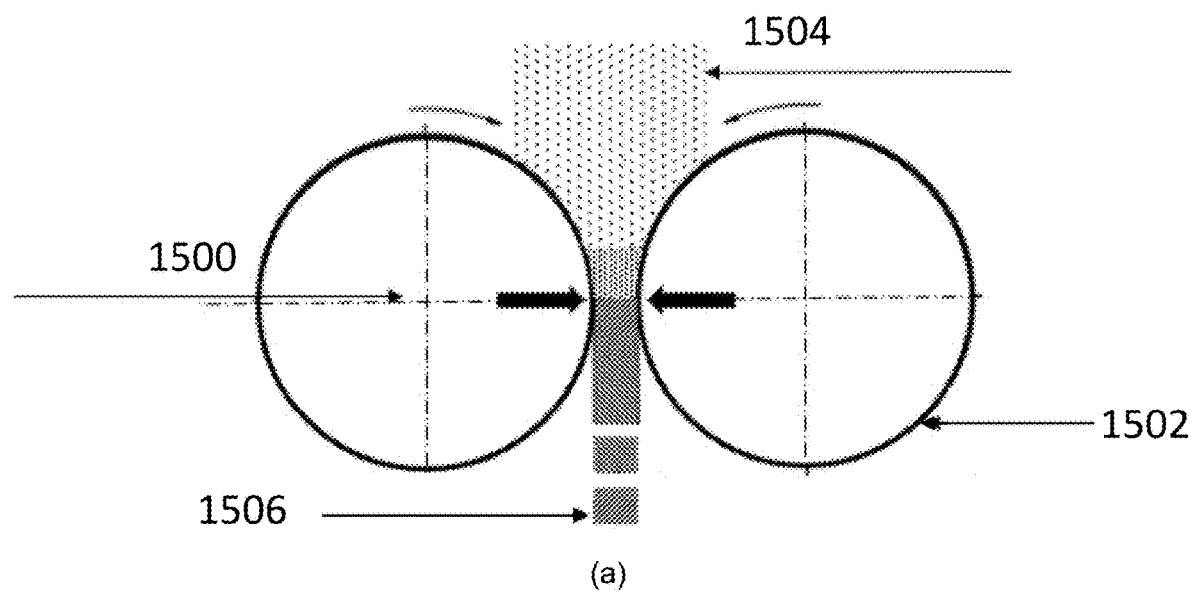
FIG. 15 shows a method of macro-cement briquetting by compaction through compression by smooth rollers and the engineered macro-cement briquettes (broken-up ribbon containing reinforcing steel microfibers).
Figure 15:
Figure 16:
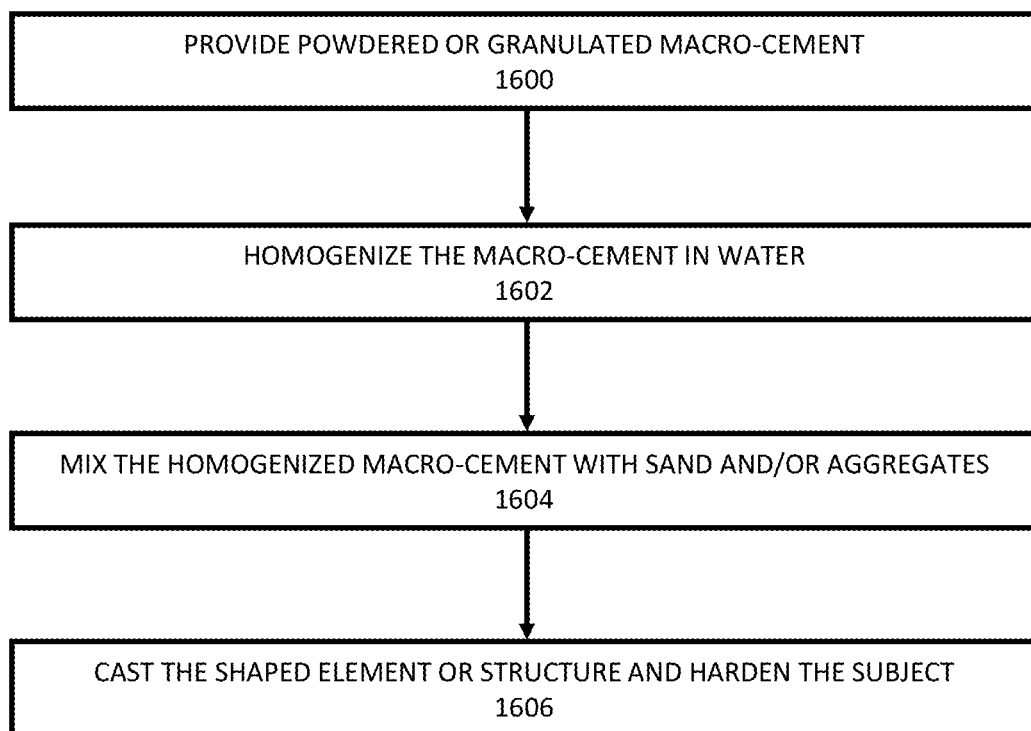
FIG. 16 shows a flow chart of a method making shaped elements or structures out of macro-cement having a series of wet processing steps.

A method of producing engineered forms of macro-cement comprises the subsequent step of granulation (shown in FIG. 12(*a*)), pelletization (shown in FIG. 13(*a*)), briquetting (shown in FIG. 14(*a*)) or tabletting (shown in FIG. 15(*a*)) of the macro-cement. The method may further comprise homogenization of macro-cement or engineered forms of macro-cement in water with other construction aggregates such as sand and set accelerating admixtures which may be loaded onto said construction aggregates for subsequent casting and hardening (FIG. 16).

Figure 17:
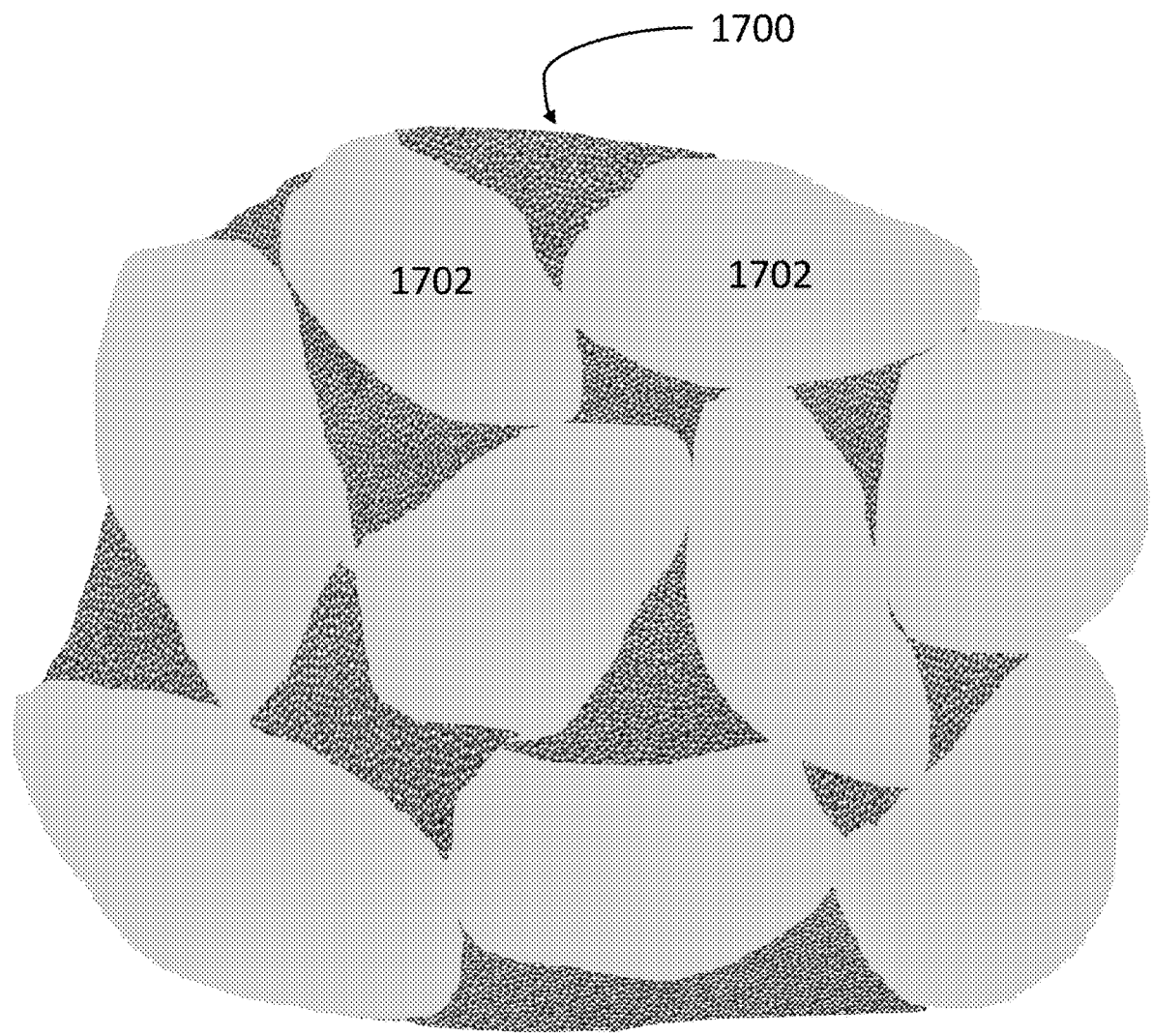
FIG. 17 shows a sectional view of a densely packed hardened macro-cement subject.

In the process of mixing macro-cement powder with water, multiple water molecules wedge between the load particles and the carrier particles. The water weakens the bond between the load particles. As a result, the layer or layers of load particles become deformable. Specifically, as can be seen in FIG. 17, the layer(s) of load particles (1700) are plastically deformed during processing of the mortar/concrete in fresh state and the particles displace to take a form fitting maximum packing density in the voids between the cement and/or pozzolanic particles (1702) of the overall mortar/concrete matrix. The matrix consists essentially of cement particles surrounded by fine microsilica particles and/or ultra-fine nanoparticles which fill the voids between larger cement or pozzolanic carrier particles. The deformation of load particles is most pronounced in the presence of surfactant being a water reducer.

The cementitious or pozzolanic micron-sized carriers used herein may include, as examples, cementitious materials like Portland cement, fly ash (class C as received), slag (ground granulated blast furnace), and pozzolans such as fly ash (class F as received), coarse metakaolin, calcinated clay, etc. as well as other any other cementitious or pozzolanic micron-sized carriers. The terms "Portland cement" or "cement" are used herein to include generally the kind of product obtained by heating lime clay mixtures, or natural cement-rock, to such a temperature that practically the entire product is sintered, followed by grinding. Various additives can be included in accordance with conventional Portland cement manufacturing practices. It will be understood that various modifications such as the hydraulic cements of the kind commonly known as calcium-aluminate cements can be used in place of Portland cement as substantial equivalents therefor in the compositions and methods provided herein. As an example of a cementitious carrier, cement particles with Blaine fineness in the range from about 250 $m^2$/kg to about 750 $m^2$/kg, corresponding to particles sizes in the range from about 10% diameter $d_{10}$=0.7 μm to about 90% diameter $d_{90}$=70 μm may be utilized. More preferably, cement particles with Blaine fineness in the range from about 350 $m^2$/kg to about 550 $m^2$/kg, corresponding to particles sizes in the range from about $d_{10}$=1 μm to about $d_{90}$=50 μm may be utilized. As an example of quartz (fine ground) material, siliceous particles in the range from about $d_{10}$=1 μm to about $d_{90}$=20 μm may be utilized. More preferably, siliceous particles in the range from about $d_{10}$=2 μm to about $d_{90}$=10 μm may be utilized. As an example of fly ash F material, pozzolan siliceous particles with an approximate fineness retained on 45 μm sieve residue from about 5% to 45%, corresponding to particles sizes from about $d_{10}$=1 μm to about d90=50 μm may be utilized. As an example of fly ash C material, cementitious particles with an approximate fineness retained on 45 μm sieve residue from about 5% to 45%, corresponding to particles sizes from about $d_{10}=1$ µm to about $d_{90}=50$ µm may be utilized.

The submicron-sized siliceous particles used herein may include siliceous materials, such as silica fume, fly ash (fine ground), quartz (fine ground), precipitated silica, fine metakaolin, rice husk ash, etc. as well as any other submicron-sized siliceous particles known in the art. As an example of submicron-sized siliceous particles, silica fume (micro-silica) with specific surface in the range from 5,000 $m^2$/kg to 200,000 $m^2$/kg, and more specifically in the range from 15,000 $m^2$/kg to 30,000 $m^2$/kg, or typically from about 10 nm (nanometers) to 1 µm, may be utilized. The amount of the submicron-sized siliceous material is calculated with the purpose of creating maximum packing density of the pastes, mortars, concretes and other cement-based materials. Specifically, the amount of the submicron-sized siliceous particles is in the range of 5-50% of the weight of cementitious or pozzolanic micron-sized carriers (e.g., cement or fly ash), and more optimally for density of cementitious matrix is in the range of 20-40% of the weight of cementitious or pozzolanic micron-sized carriers, is used.

The nano-sized SCM particles may be in the size range 1-100 nm and may include nanosilica, carbon nano-tubes and fibers, nano-clay, nano-$TiO_2$, nano-$Fe_2O_3$ as well as any other nano-sized SCM particles known in the art. The amount of nano-sized SCM particles is calculated with the purpose of maximizing performance of the hardened cementitious product, and may vary significantly depending on the type of the nano-material. Specifically, the amount of the nano-silica, depending on the composition of the cementitious mixture may be in the range of 0.25-10% of the weight of cement, and more optimally is in the range of 1-5% of the weight of cement, and even more optimally is in the range of 2-3% of the weight of cement. The amount of carbon nano-tubes and fibers depending on the composition of the cementitious mixture may be in the range of 0.003-1% of the weight of cement, and more optimally is in the range of 0.01-0.5% of the weight of cement, and even more optimally is in the range of 0.05-0.1% of the weight of cement. The amount of nano-$TiO_2$ depending on the composition of the cementitious mixture may be in the range of 0.01-10% of the weight of cement, and more optimally is in the range of 1-5% of the weight of cement. The amount of nano-$Fe_2O_3$ depending on the composition of the cementitious mixture may be in the range of 0.1-10% of the weight of cement, and more optimally is in the range of 3-5% of the weight of cement.

The polymers in the form of the liquid chemical admixtures for concrete used herein may include water-reducing, set-retarding, bonding and other admixtures used for concrete. Specifically, water reducers of any type, including the following superplasticizers: melamine-based (sulphonated melamine formaldehyde), naphthalene-based (sulphonated naphthalene formaldehyde), and polycarboxylate-based admixtures; as well as the following normal and mid-range plasticizers: lignosulfonates, hydroxylated carboxylic acid salts, carbohydrates. The liquid chemical admixtures, in addition to its primary function as a modifier of fresh and hardened concrete properties, serves as a binder between the carrier and load particles, and between the load particles, fastening the load particles on the carrier particles. The bonding admixtures used herein may include any type, including: polyvinyl chloride, polyvinyl acetate, acrylics, and butadiene-styrene copolymers.

The retarding admixtures used herein may include any type, including: lignin, borax, sugars, organophosphates, tartaric acid and salts, sodium gluconate and glucoheptonate, sodium phosphates and zinc salts.

The amount of the liquid chemical admixtures is calculated with the purpose of loading the SCM particles onto the cementitious or pozzolanic micron-sized carriers, providing high workability of these cement-based materials at low water content. In embodiments, where the larger cement or pozzolanic carrier particles are first mixed with the smaller submicron-sized load particles and then the chemical admixture(s) are applied to the mixture to bind all of the particles together, the amount of superplasticizer, depending on the type of the superplasticizer, the composition of the cementitious mixture and designed water/binder ratio is in the range of 0.1-10% by weight of the superplasticizer dry matter based on the weight of the cement, optimally is in the range of 0.5-5% of the weight of cement, and even more optimally is in the range of 1-2.5% of the weight of cement. In these embodiments, the amount of retarding admixture, depending on the type of the admixture and composition of the cementitious mixture, is in the range of 0.05-0.5% by weight of the retarder dry matter based on the weight of the cement, and more optimally is in the range of 0.1-0.3% of the weight of cement.

The method comprises loading cement with or without pozzolanic particles with small sized silica fume particles by dry coating using mixing at high energy levels (FIG. 4), and optionally or alternatively mixing with the particles with liquid chemical admixture(s). For example, one option once the cement and pozzolanic particles are dry coated at high energy levels with the smaller sized silica fume particles is to then to apply a liquid chemical admixture onto the silica fume layer (FIG. 7a). Another option is to first mix the silica fume particles with a liquid chemical admixture, and then to apply their mix onto cement and pozzolanic particles if present. Another option is to mix the silica fume particles with a part of the liquid admixture, apply their mixture onto cement and pozzolanic particles, and then to apply the remaining part of the admixture. Where both submicron and nano-sized siliceous particles are utilized, either particle size may be first mixed with the cement and pozzolanic particles then a liquid chemical admixture can be applied, followed by other particle sizes and optionally more chemical admixture added (FIG. 7c-e). Another option is to first mix the submicron and nano-sized siliceous particles such that the submicron particles are loaded with nano-sized particles and then chemical admixture may be added either in the presence of the cement and pozzolanic particles or prior to mixing the submicron and nano-sized siliceous particle mixture with the cement and pozzolanic particles (FIG. 7d).

Depending on the relative amounts of carrier versus load particles and their associated properties, the choice of equipment and operating conditions results in discrete particles, a continuous monolayer of particles, or a multilayered (heap) of particles loaded onto the carrier particles. Specifically, the first process step of covering or dry coating the larger carrier particles with smaller SCM particles, is carried out under conditions of strong mechanical forces such as impact, compression and shear force exerted on the particles, resulting in mutual collisions of the particles with repeated compression/shear deformation of the particles continuum. Machines that can be used for this purpose are any high shear mixers and grinding machines. The second step of particle loading can be carried out in sequence wherein different types of sub-micron and nanoparticles are deposited on the surface of the same carrier particle one after another, or it is possible to add two or more types of submicron and/or nanoparticles on the surface of the same carrier particle simultaneously (FIG. 7d). Alternatively, the cementitious or pozzolanic micron-sized carrier particles enveloped by the hygroscopic layer of $SiO_2$-containing microparticles can be coated by suspension of nano-sized particles in water (FIG. 7a).

The dry particle coating may be carried out on any dry particle coating devices, for example the commercially available surface modification equipment such as Hybridizer™ from Nara™, Mechanofusion™ and Cyclomix™ systems from Hosokawa Micron™, magnetically assisted impaction coater (MAIC™) from Aveka™, and others, as well as various types of high shear mixing machines. Specifically, in the dry particle coating process step, relatively large cement or pozzolanic "carrier particles" (normally in the range 10-100 microns) are mechanically coated with guest "load" microparticles, and/or guest nanoparticles (ground quartz—normally in the range 1-20 micron, silica fume—in the range 0.1-3 micron, and nanoparticles in the range 1-100 nm). Furthermore, multilayer loading of cement particles is possible when using for the first (internal) layer ground quartz as the larger load particles, and smaller silica fume or microparticles loaded for the second layer, and optionally the smallest nano-sized particles loaded to create an external third layer. In another embodiment, submicron-sized SCM particles already coated with nano-sized particles can be used for loading the cement particles (FIG. 7d).

The purpose and a characteristic feature of the dry powder coating process is covering larger host particles, also termed carrier particles, by a discrete monolayer of smaller guest particles, also termed load particles, and providing strong (physical or chemical) bonding between the host and the guest particles due to their dose mutual contact. The adhesion between particles is primarily attributable to van der Waals forces, electrostatic forces and more strong intermolecular attraction. Specifically, the dry particle coating process, in general, can be divided into the following three stages: (1) de-agglomeration/dispersion stage, wherein guest sub-micron or nano-sized guest particles agglomerates are broken up by strong mechanical forces such as impact force, shear force, and compression force, as well as by the particles collisions; (2) ordered mixing stage, wherein dispersed submicron- and nano-sized particles attach to larger micron-sized host cementitious and pozzolanic particles surfaces by inter-particle forces so that the surface of larger particles is loosely coated with smaller particles; (3) particle embedded coating, wherein the surface covering is more permanent because of a stronger physical (or chemical) bonding between the host and the guest particles. The process involves the use of forces capable of overcoming strong intermolecular attraction between the aggregated particles and bonding together larger host and smaller guest particles, providing thereby the maximum packing density. This method may thus be termed "forced packing of multi-component cementitious composition". The "forced packing" method may comprise calculating the optimal ratio of the powdered components considering them as "ideal" non-agglomerated powders, and then applying impact, shear and compression forces sufficient to destroy the "real" agglomerates without comminution of the individual particles, and provide coating of larger particles by smaller particles.

Figure 9:
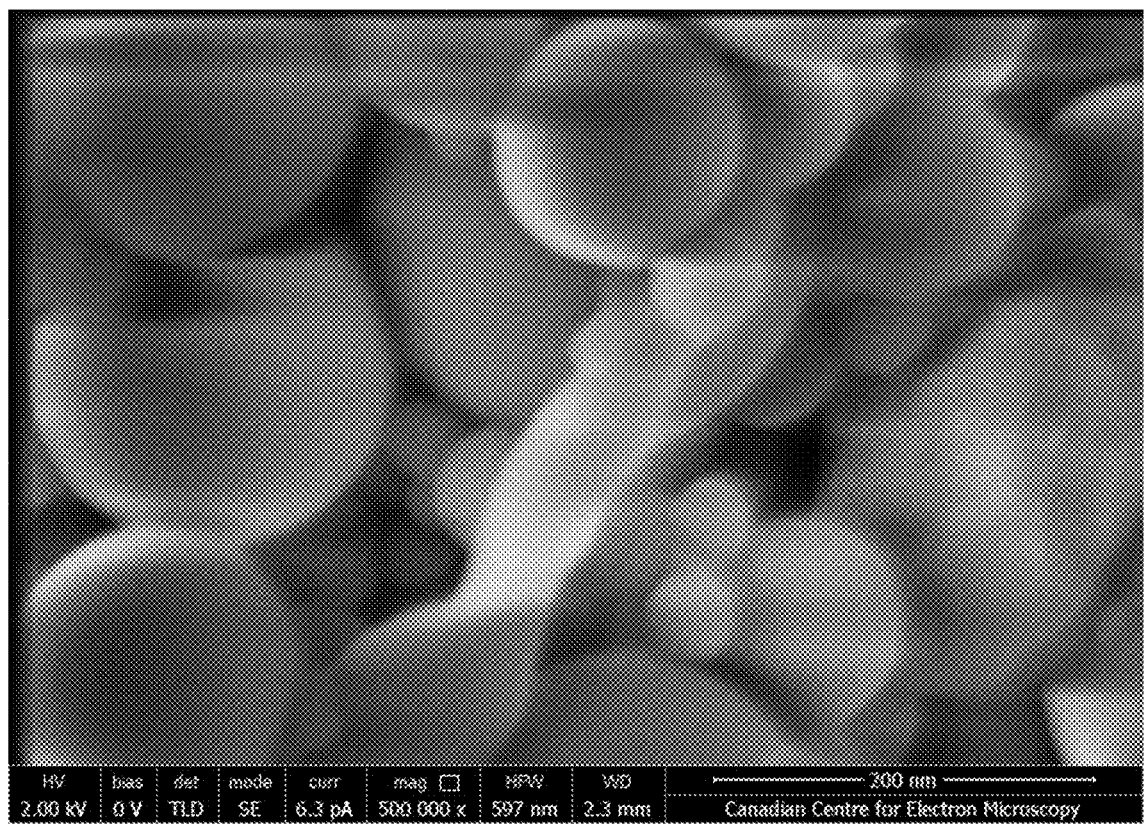
FIG. 9 shows a Scanning Electron Microscope (SEM) image with ×500,000 magnification of a cement particle loaded with silica fume with added chemical additive—superplasticizer as a binder, and explicit view of the superplasticizer string (light oblong rope in the center of the picture) binding silica fume particles to each other and to the cement particles.

The method of coating submicron-sized and nano-sized SCM particles onto larger micron-sized carrier particles can be taken one step further as an alternative to dry powder coating, by using a functional polymer for concrete (water reducer, retardant, etc.) as a binder for fixing monolayered, multilayered, or stacked small load particles onto larger carrier particles. The polymer being a liquid when introduced, subsequently solidifies forming bridge forces, which, in addition to the above mentioned intermolecular attraction, binds the carrier and the load particles together (FIG. 9). A further advantage of the loading utilizing a polymer as opposed to utilizing dry powder coating, is the ability to load larger amounts of SCM particles and to attach chemical admixture polymers to the cementitious or pozzolanic host carriers. Where dry coating is utilized, the amount of smaller SCM load particles covering the larger carrier particles is limited. Specifically, the SCM particles cover the carrier cement and if present pozzolanic particles (FIG. 2) by approximately no more than a monolayer (FIG. 3-FIG. 5). Whereas use of liquid chemical additives allows for multi-layering of the SCM load particles (FIG. 6-FIG. 9). The chemical additives act as a binder fixing multilayered "load" particles on the "carrier" particles.

Loading submicron-sized and nano-sized SCM particles onto larger micron-sized cementitious and pozzolanic particles leads to a more uniform particle distribution with preferable particle packing density and accordingly creates a denser and stronger mortar/concrete matrix. In this approach, the submicron-sized finer particles (e.g., silica fume) and the nano-sized materials (e.g., nanosilica, carbon nano-tubes, nano-$TiO_2$, etc.) de-agglomerate, and bind to the cementitious and pozzolanic particles (e.g., cement and fly ash), deprived of the possibility to re-agglomerate. The load particles adhere to the cementitious/pozzolanic carriers such that they cannot be brushed off by internal friction forces between particles in their mutual movement during handling of the macro-cement powder in dry state.

One exemplary advantage of this treatment method of loading cementitious and if present pozzolanic particles with smaller siliceous particles also is that the cement grains of the macro-cement are covered by submicron-sized particles and nano-sized SCM particles forming around the cement grains layer, which creates a sub-micron or nano-mesh on the surface of cement (FIG. 6, FIG. 7). The mesh absorbs moisture of the liquid admixture and thereby protects the cement grains, preventing direct massive penetration of moisture to the cement particles and initiation of untimely cement hydration. The mesh provides gradual controlled infiltration of moisture to the surface of the cement particles, creating a nano-mesh of the product of cement hydration—calcium silicate hydrate (C-S-H) on the surface of cements grains. The nano-C-S-H mesh is preserved on the surface of the cement in the process of its granulation and further inside the granules, playing an important role in accelerating hardening of the fresh macro-cement.

Figure 10:
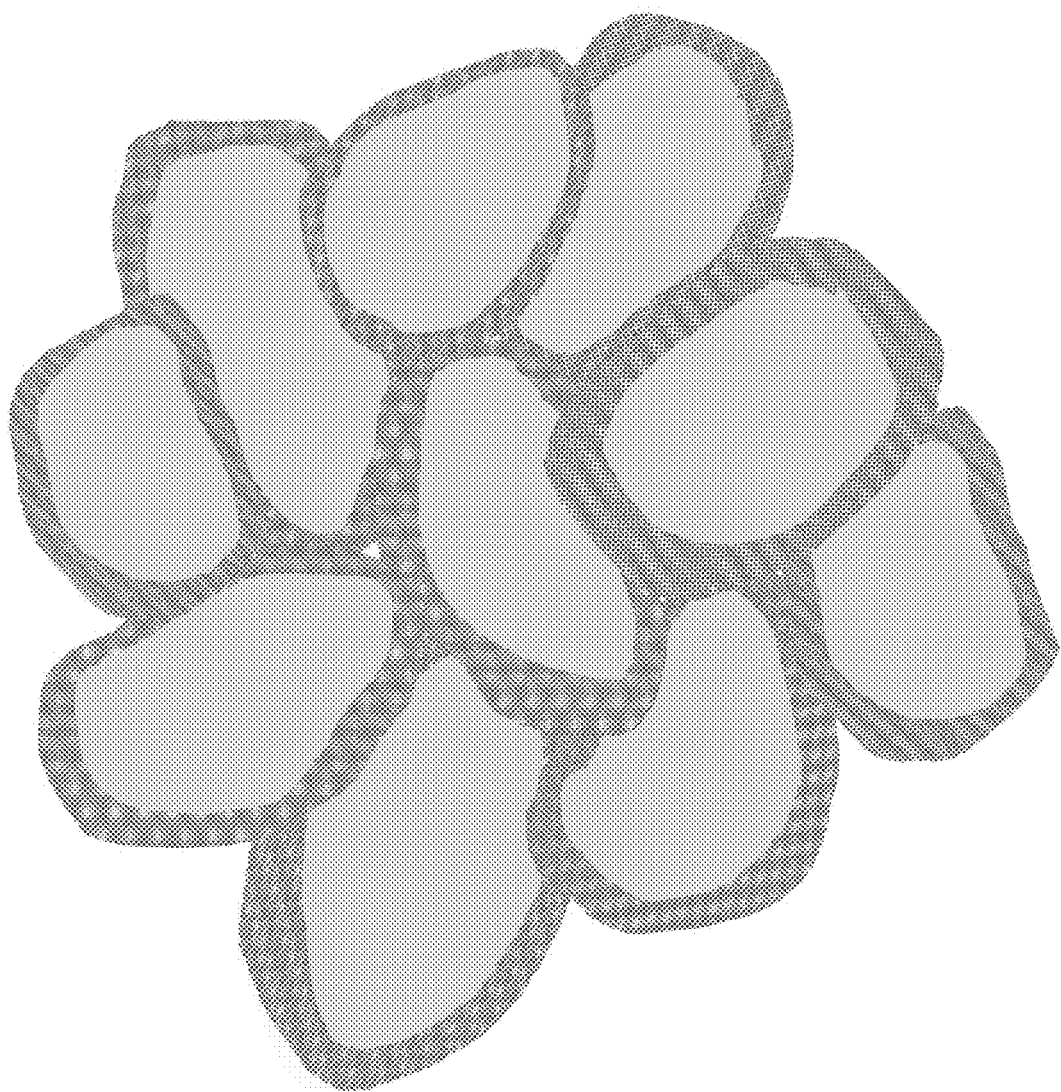
FIG. 10 shows a sectional view of a macro-cement granule agglomerated (granulated) by tumbling.
Figure 11:
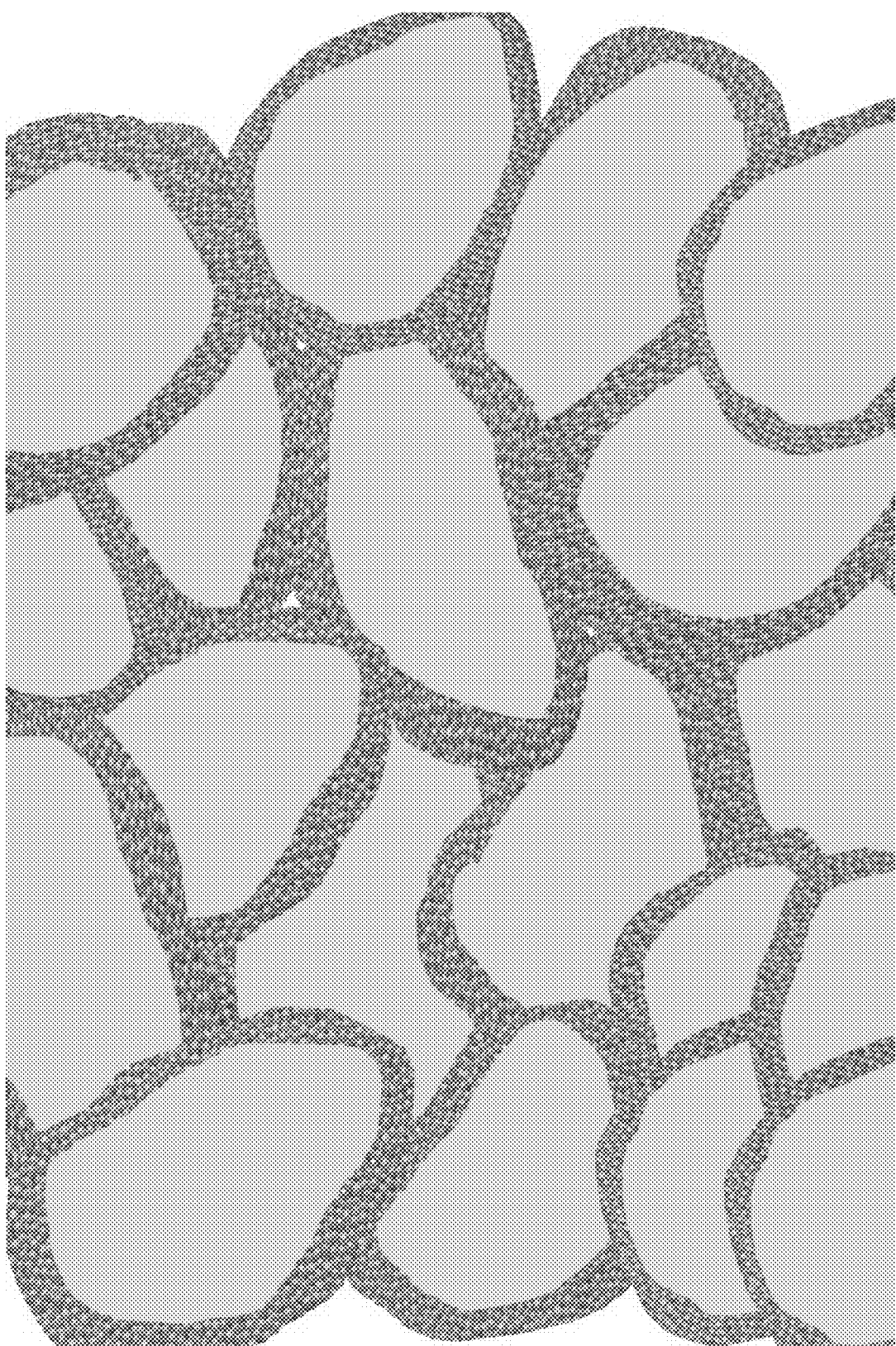
FIG. 11 shows a sectional view of a macro-cement pellet agglomerated (pelletized) by compaction through extrusion.

The production of engineered forms of for example granulated, pelletized, briquetted or tabletted macro-cement further comprises the subsequent step of granulation, pelletization, briquetting or tabletting of the macro-cement, which optionally may be followed by homogenization in water with other construction aggregates for subsequent casting and hardening. Such macro-cement formation processes may use a liquid polymer binder mixed with the cement particles coated with microparticles, and/or nanoparticles, to form inter-particle bonds between the particles, and to agitate the wetted powder to promote granule growth. Specifically, the engineering processes of granulation, pelletization, briquetting or tabletting of macro-cement with use of a liquid polymer binder, results in the agglomeration of wet particles, and the subsequent sticking and agglomeration of additional individual particles to the agitated moving agglomerates (FIG. 10, FIG. 12). FIG. 10, for example, shows a sectional view of a macro-cement granule agglomerated (granulated) by tumbling. FIG. 11 shows a sectional view of a macro-cement pellet agglomerated (pelletized) by compaction through extrusion. FIG. 12 shows a method of granulation by tumbling and the engineered macro-cement granulated (agglomerated) by tumbling. FIG. 12(a) shows a method of macro-cement granulation by tumbling where there is agglomeration through intermolecular forces. In FIG. 12(a), the macro-cement powder (1200) comprises cementitious and pozzolanic particles loaded by submicron and nano-particles with chemical admixture as a binder. FIG. 12(b) shows an example of macro-cement engineered granules (agglomerates) (1202) produced by tumbling (1204).

The production of engineered granulated or pelletized or briquetted or tabletted macro-cement may also be performed without the use of a binder (FIG. 14, FIG. 15). By utilizing macro-cement which was produced in the process of forced packing of multi-component cementitious composition by dry particle coating and/or loading of cementitious or pozzolanic micron-sized carrier particles with smaller SCM particles, the use of a binder in the production of engineered forms of macro-cement is not required, but may be necessary for tumbling (FIG. 12) and preferable for compaction by extrusion (FIG. 13) and not necessary for compaction by compression (FIG. 14, FIG. 15).

Referring now to FIG. 13, FIG. 13(a) shows a method of macro-cement pelletizing by compaction through extrusion. Agglomeration occurs by compaction forces (1300) within the extrusion die (1302). Macro-cement powder (1304) is cementitious and pozzolanic particles which are all coated or loaded by submicron and/or nano-particles without the chemical admixture or with chemical admixture and optionally containing sand and aggregates. The method produces macro-cement pellets (1306). FIG. 13(b) shows the engineered macro-cement pellets produced by compaction/extrusion.

Referring now to FIG. 14, FIG. 14(a) shows a method of macro-cement briquetting by compaction through compression. Agglomeration occurs by compression forces (1400) between the compaction rollers (1402) having surface briquette shaped voids (1404) or pockets. Macro-cement powder (1406) is cementitious and pozzolanic particles which are all coated or loaded by submicron and/or nano-particles without chemical admixture or with chemical admixture and optionally containing sand, aggregates and fibers. The method produces macro-cement briquettes (1408). FIG. 14(b) shows the macro-cement briquettes produced by compaction/compression.

Referring now to FIG. 15, FIG. 15(a) shows a method of macro-cement briquetting by compaction/compression. Agglomeration occurs by compression forces (1500) between smooth designed compaction rollers (1502). Macro-cement powder (1504) is cementitious and pozzolanic particles which are all coated or loaded by submicron and nano-particles without the chemical admixture or with chemical admixture, possibly containing sand, aggregates and fibers. The method produces macro-cement briquettes (broken-up ribbon) (1506). FIG. 15(b) shows the macro-cement briquettes produced by compaction/compression wherein the briquettes (broken-up ribbon) contain reinforcing steel microfibers.

The combination of pressure and shear forces applied to a mixture of cement and pozzolanic particles and smaller submicron SCM particles, with or without binder, alters the physicochemical properties of the loaded cement and pozzolanic particles and increases the strength of the intermolecular attraction forces between all particles in the macro-cement. The mechanical action creates shear-inducing pressure which serves to both coat and/or load the cement particles and creates their physicochemical activation. As such, the mechanical process of forced packing dry particle coating and loading using high energy agitation induces physicochemical activation of macro-cement, which can be further referred to as mechanical/physicochemical activation. Furthermore mechanical/physicochemical activation promotes interparticle bonding in the subsequent production of engineered solid macro-cement forms. Where dry particle coating is used in the production of macro-cement the mechanical/physicochemical activation acts as a binder substitute in the compaction pelletizing, extruding, briquetting, and tabletting processes. Where a binder is utilized, mechanical/physicochemical activation still occurs but the strength of the interparticle bonding in the subsequent production of engineered solid formations of macro-cement is stronger, the binder creating liquid bridges (FIG. 9). However, the use of binder may not be optimal for all applications. For example, binder is not required in the formation of engineered granules produced in the compaction by compressions (FIG. 14, FIG. 15). Where binder is used, the SCM particles protect the cement particles from hydration.

Whether the production of engineered solid forms of the macro-cement is performed in the presence of binder or with dry particle coated macro-cement, the class of process equipment includes tumbling drums and pans, fluidized beds, and mixer granulators. Compaction pelletizing processes use a liquid polymer binder mixed with the cement particles coated with microparticles and/or nanoparticles, and/or pressure to promote interparticle bonds. This class of processes include roll pressing, extrusion and tabletting (FIG. 12-FIG. 15). The binder provides additional interparticle bonds within the macro-cement pellets, granules, briquettes, tablets or other possible solid forms of engineered macro-cement.

In various embodiments, the above methods for producing engineered macro-cement may yield the following characteristics. The macro-cement may be produced in the form of granules, pellets, briquettes or tablets by mechanical action, for example by pressure and shear forces causing physicochemical activation of the cementitious materials during the process of coating and/or loading of the cementitious materials. The granules may be produced directly in the process of coating and/or loading of the cementitious materials in the equipment that performs the coating and/or loading process, and may have somewhat round or somewhat round and flattened shape and equivalent spherical diameter from about 1 to about 20 mm. The granules, following the coating and/or loading process of the cementitious materials, may be produced in tumbling drums and pans, fluidized beds, and mixer granulators, and may have a somewhat round or somewhat round and flattened shape and equivalent spherical diameter from about 1 to about 5 mm. The granules may alternatively have a somewhat round or somewhat round and oblong shape and equivalent spherical diameter from about 2 to about 10 mm. Pellets, following the coating and/or loading process of the cementitious materials, may be produced by extrusion in extruders or pelletizers, and may have a cylindrical shape and equivalent spherical diameter from about 5 to about 40 mm. Briquettes or tablets, following the coating and/or loading process of the cementitious materials, may be produced by compression from rollers with shaped voids, and the briquettes or tablets may have a somewhat round or somewhat rectangular shape and equivalent spherical diameter from about 10 to about 50 mm. The briquettes, following the coating and/or loading process of the cementitious materials, may alternatively be produced by compression from smooth rollers, and the briquettes may have a broken-up ribbon irregularly shape and equivalent spherical diameter from about 3 to about 30 mm.

One advantage of the granulated or pelletized macro-cement is that water contained in the liquid binder causes a partial hydration of the cement (in the range of 3 to 7% of its masse) with creation a nano-mesh of calcium silicate hydrate (C-S-H) on the surface of cements grains. On one hand, this phenomenon may be considered as a corresponding loss of the cement activity but on the other hand, the nano-C-S-H mesh, develops into nano-C-S-H seeds in the process mixing cement with water, which causes increased acceleration of the cement reaction rate and increases in early and final strengths of the concrete made from the granulated macro-cement. The C-S-H mesh, formed on the surface of the granules as the result of reaction with water contained in liquid polymer binder, is destroyed during mixing of the macro-cement with water. The substantially complete destruction of the intermediate C-S-H mesh creates nano-C-S-H seeds, being the final target, which in turn accelerates cement hardening and increases early and final strength of the hardened cement paste. More specifically, finely ground C-S-H acts as crystallization seeds initiating consolidation of the cementitious binder.

Another exemplary advantage of the various forms of engineered macro-cement is its extended shelf time, which is achieved by coating the cement particles with polymer, and grouping and binding several such particles together in agglomerates of different forms (for example, granules or pellets or briquettes or tablets), thereby substantially reducing the surface area exposed to moisture and carbon dioxide present in the atmosphere, preventing cement hydration and a loss of the cement activity. Another exemplary advantage of the engineered macro-cement is elimination of dust handling hazards and losses. Another exemplary advantage of the engineered macro-cement is elimination of segregation of the various macro-cement components. Another exemplary advantage of the engineered macro-cement is improved flow properties for further processing, reducing caking and lump formation. Another exemplary advantage of the engineered macro-cement is increasing bulk density for storage. Another advantage of the engineered macro-cement is the ability to produce stable non-segregating blends of multiple powder ingredients. Another exemplary advantage of the engineered macro-cement is the acceleration of the reaction rate in cementitious mixtures.

In embodiments, macro-cement blends having optionally sand and/or larger aggregates can also be mixed together with reinforcing fibers such as metal fibers (steel, stainless steel, titanium, copper or brass coated steel, etc.), glass fibers, synthetic fibers (polypropylene, polyethylene), carbon fibers, aramid fibers, or natural fibers, including but not limited to cellulose and hemp fibers, into one mixture prior to granulation, pelletizing, briquetting, or tableting of the mixture. The resulting engineered formations, for example granules, pellets, briquettes, or tablets, contain fibers which are dispersed throughout the engineered solid forms of macro-cement (FIG. 15*b*). Subsequently when the engineered forms of macro-cement having fibers are introduced to wet mixing processes (FIG. 16), fibers are dispersed throughout the macro-cement during mixing with water and then within solid concrete. The fibers become integral to hardened concrete matrix and serve as reinforcing elements of the concrete matrix. Such fibers, have significantly different specific gravity, shape, and size in comparison with other mineral components of dry multicomponent mixture. An advantage is solid fixing of the reinforcing micro-fibers along with other ingredients inside the granules, pellets, briquettes, or tablets and providing their uniform distribution in the dry multicomponent mixture all the way from producing the granules to their homogenization with water.

Figure 31:
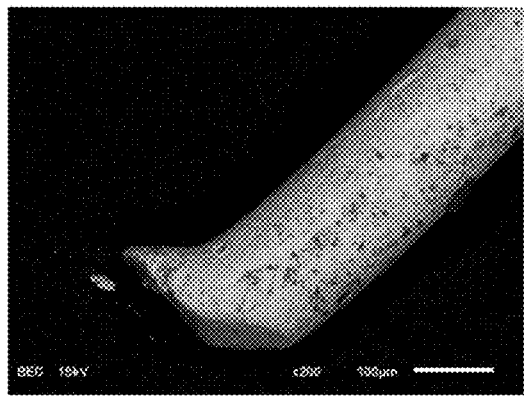
FIG. 31 shows scanning electron microscope (SEM) images at various magnifications of a steel reinforced fiber which is scraped and dented in the process of macro-cement dry coating.
Figure 31:
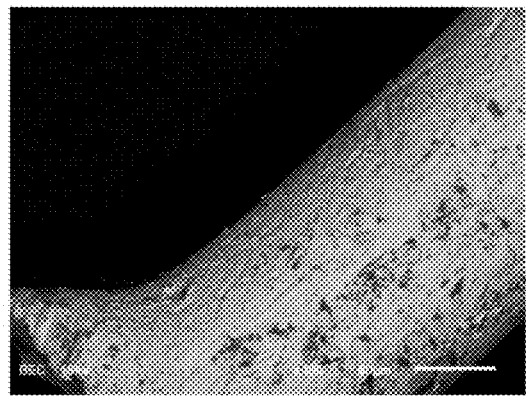
Figure 31:
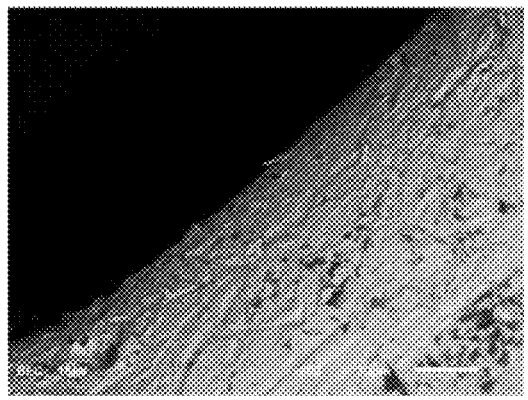
Figure 31:
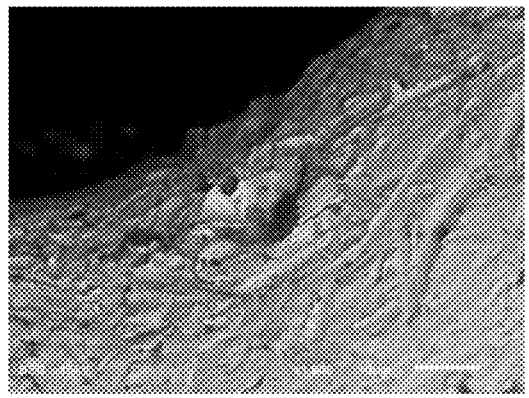
Figure 32:
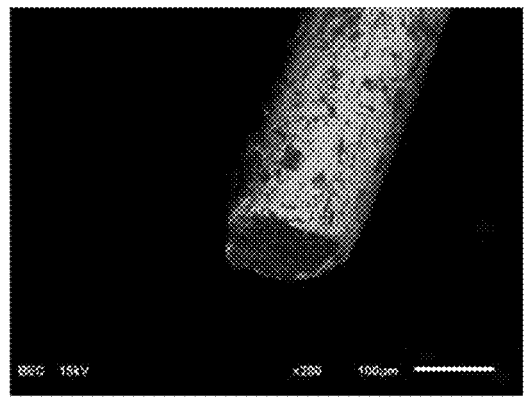
FIG. 32 shows scanning electron microscope (SEM) images at various magnifications of a steel reinforced fiber which is scrapped and dented in the process of macro-cement loading.
Figure 32:
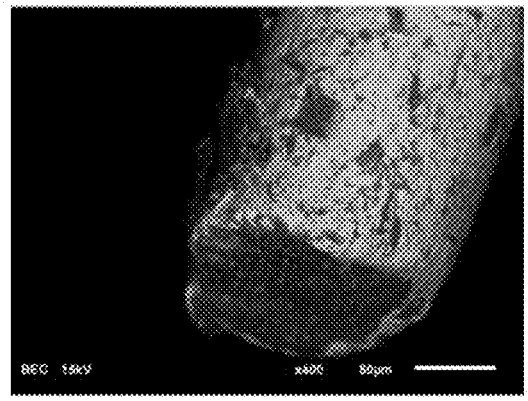
Figure 32:
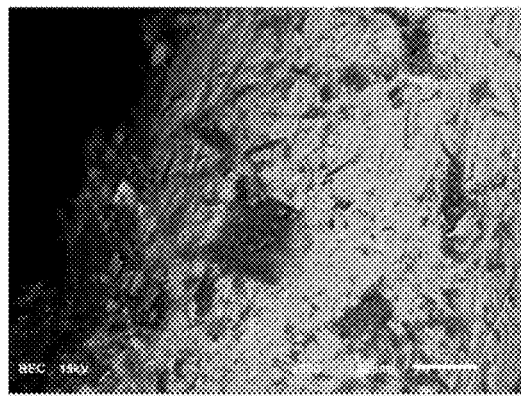
Figure 32:
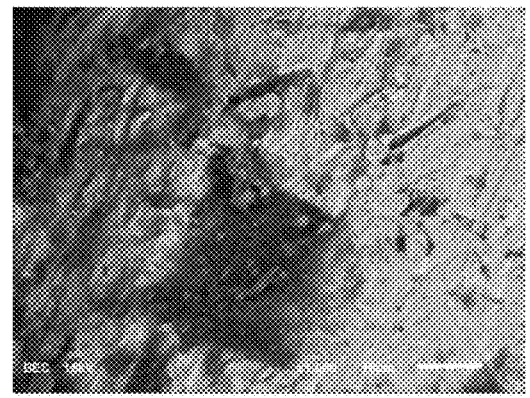

During the process of dry coating and/or loading of macro-cement, the surface of the fibers are scratched and scraped by sand grains and/or aggregates which are sharp and hard, and which results in the fibers being dented by forces on the surfaces (FIG. 31, FIG. 32). The scratched and scraped fibers, have improved bond slip performance in comparison to original smooth metal fibers or other fibers which cannot be scraped or scratched from being mixed with aggregates and sand grains in known mixers. The impressions on the fibers in the macro-cement improves concrete strength and durability characteristics. The steel fiber dents and scratches provide improved mechanical cohesion between the fibers and cementitious matrix. Examples of the scraped and dented fibres are shown in FIG. 31. FIG. 31 illustrates scanning electron microscope (SEM) images at various magnifications of a steel reinforced fiber which is scrapped and dented in the process of macro-cement dry coating; FIG. 31(*a*) shows a SEM image at ×200 magnification of a steel reinforced fiber with length 6 mm and diameter 0.16 mm, scrapped and dented in the process of macro-cement dry coating; FIG. 31(*b*) shows a SEM image at ×400 magnification of a steel reinforced fiber with length 6 mm and diameter 0.16 mm, scrapped and dented in the process of macro-cement dry coating; FIG. 31(*c*) shows a SEM image at ×800 magnification of a steel reinforced fiber with length 6 mm and diameter 0.16 mm, scrapped and dented in the process of macro-cement dry coating; FIG. 31(*d*) shows SEM image at ×1600 magnification of a steel reinforced fiber with length 6 mm and diameter 0.16 mm, scrapped and dented in the process of macro-cement dry coating.

The impressions, scratches, scrapes and dents on the fibers, are filled and coated with cement and silica fume particles and optionally with binder, providing in addition to mechanical cohesion, chemical adhesion between the fibers and the cementitious matrix. FIG. 32 shows scanning electron microscope (SEM) images at various magnifications of a steel reinforced fiber which is scrapped and dented in the process of macro-cement loading; FIG. 32(*a*) shows a SEM image at ×200 magnification of a steel reinforced fiber with length 6 mm and diameter 0.16 mm, scrapped and dented, and cement and silica fume attached to the fiber surface in the process of macro-cement loading; FIG. 32(*b*) shows a SEM image at ×400 magnification of a steel reinforced fiber with length 6 mm and diameter 0.16 mm, scrapped and dented, and cement and silica fume attached to the fiber surface in the process of macro-cement loading; FIG. 32(*c*) shows a SEM image at ×800 magnification of a steel reinforced fiber with length 6 mm and diameter 0.16 mm, scrapped and dented, and cement and silica fume attached to the fiber surface in the process of macro-cement loading; FIG. 32(*d*) shows a SEM image at ×1600 magnification of a steel reinforced fiber with length 6 mm and diameter 0.16 mm, scrapped and dented, and cement and silica fume attached to the fiber surface in the process of macro-cement loading.

Figure 28:
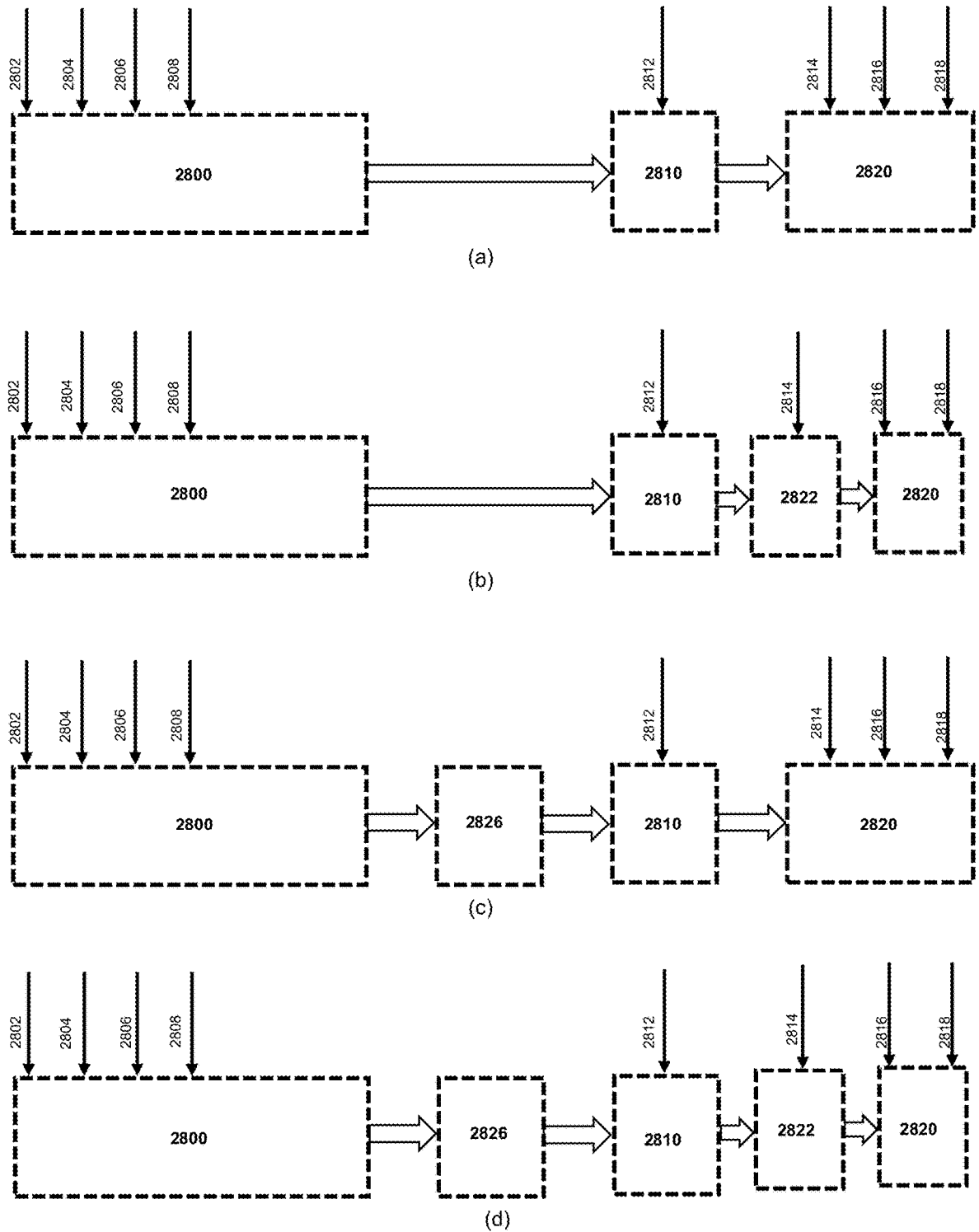
FIG. 28 shows various process flow options of producing macro-cement by dry coating and making concrete from the macro-cement utilizing multi-stage homogenization processes.
Figure 29:
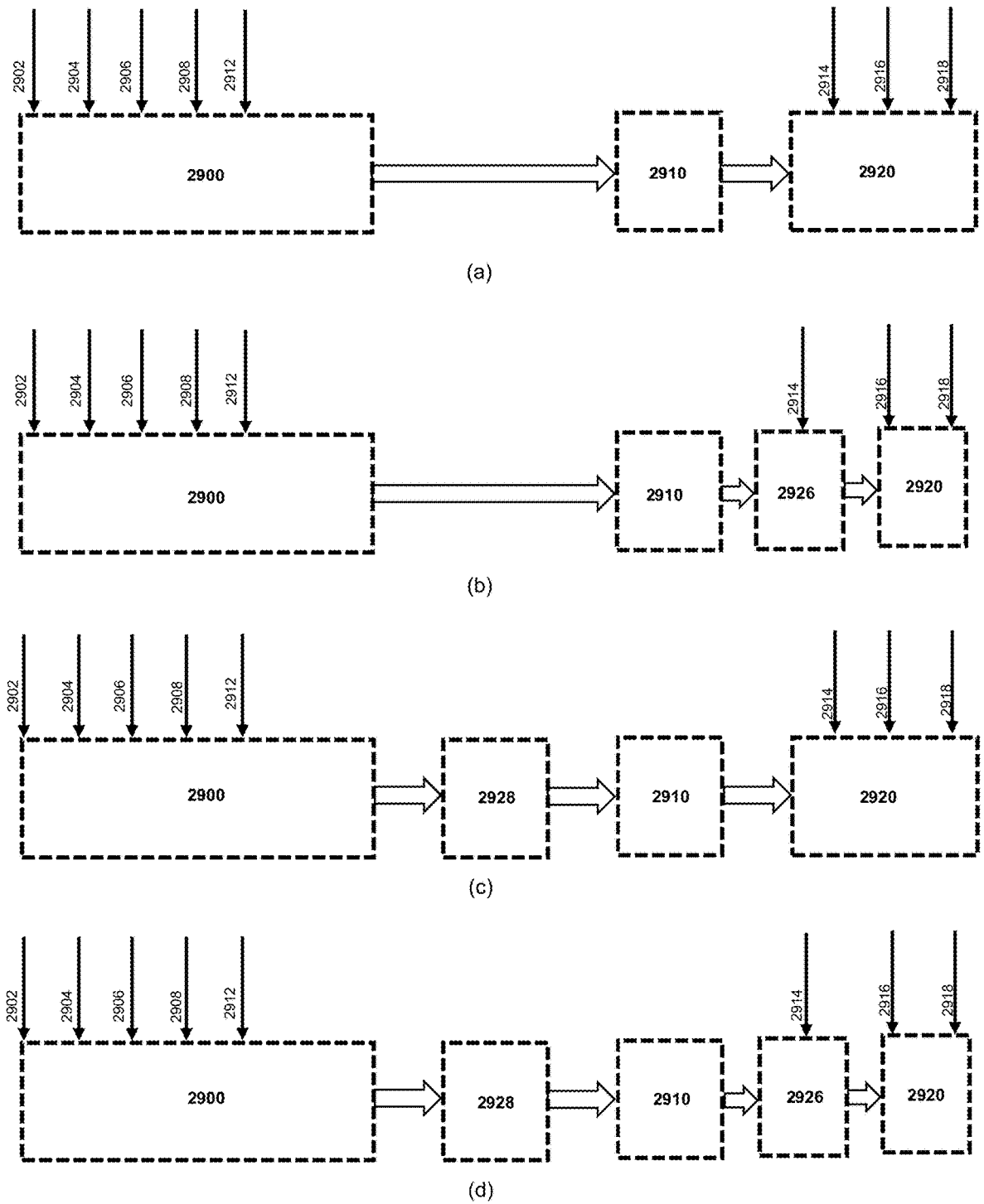
FIG. 29 shows various process flow options of producing the macro-cement by loading micron-sized cement without or without pozzolanic particles with submicron and nano-particles in the presence of chemical admixtures and making concrete from the macro-cement utilizing multi-stage homogenization processes.
Figure 30:
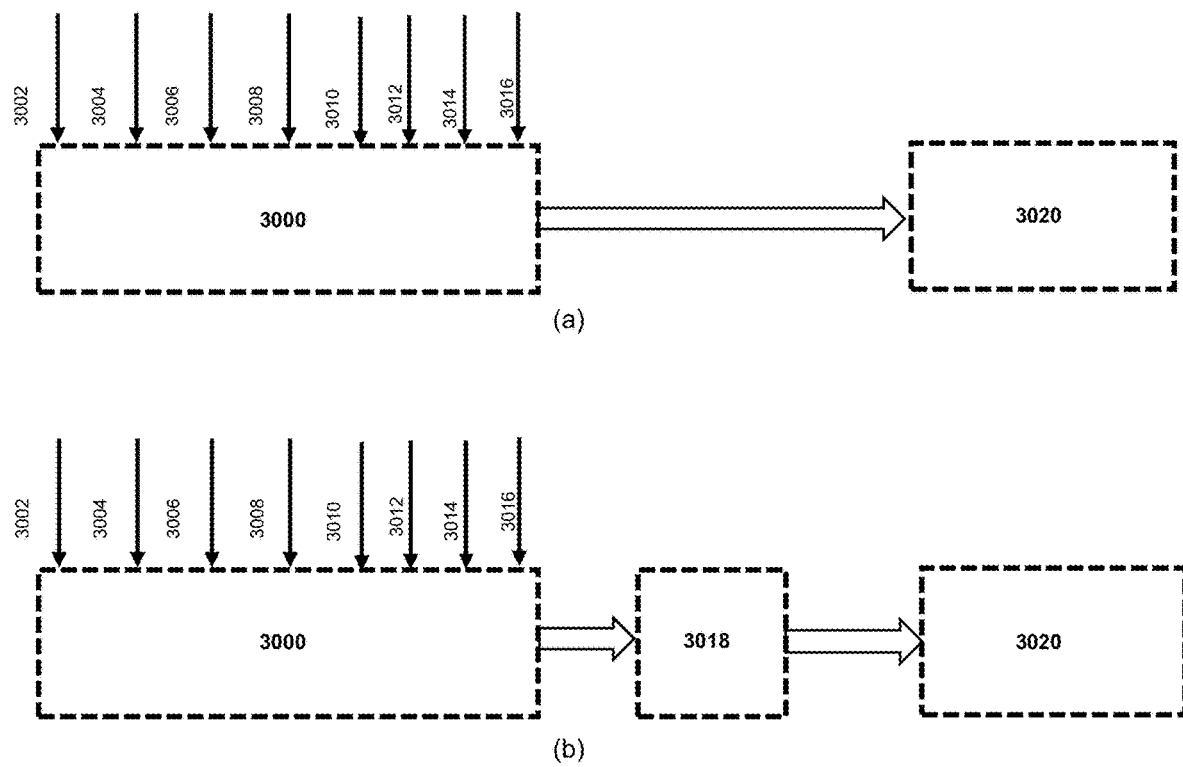
FIG. 30 shows two process flow options of producing the macro-cement by loading micron-sized cement with or without pozzolanic particles with submicron and nano-particles in the presence of chemical admixtures, with chemical admixtures and the addition of sand/aggregates/fibers as well as optionally engineered forms of macro-cement, and making concrete from the macro-cement cement utilizing multi-stage homogenization processes.

Multi-stage homogenization processes for preparing cement-based materials from dry macro-cement or from granulated macro-cement is also provided (FIG. 28-30). In particular, the methods comprise homogenizing dry macro-cement or engineered forms of macro-cement in water at a high energy level to form a cement paste, and in subsequent steps homogenizing the macro-cement water paste with sand and/or aggregates of greater dimension.

FIG. 28 shows various process flow options of producing macro-cement by dry coating and making concrete from the macro-cement utilizing multi-stage homogenization processes. FIG. 28(a), for example, shows a process flow diagram illustrating the production of macro-cement by dry coating (2800) of micron-sized cement (2802) and pozzolanic particles (2804) with submicron (2806) and nano-particles (2808), utilizing a highly intensive homogenizer (2810) that may apply a chemical admixture (2812), and mixing the macro-cement paste with sand (2814), aggregates (2816), and/or fibers (2818) in a lower energy mixer (2820) to make concrete.

FIG. 28(b) shows a process flow diagram illustrating the production of macro-cement by dry coating (2800) of micron-sized cement (2802) and pozzolanic particles (2804) with submicron (2806) and nano-particles (2808), performing a highly intensive homogenization of the macro-cement powder in water with chemical admixtures (2812) added into the homogenizer (2810), mixing the macro-cement paste with sand (2814) in lower energy intensive mixer (2822), and mixing the macro-cement mortar with aggregates/fibers in an even lower energy standard mixer (2820) to make concrete.

FIG. 28(c) shows a process flow diagram illustrating the production of macro-cement by dry coating (2800) of micron-sized cement (2802) and pozzolanic particles (2804) with submicron (2806) and nano-particles (2808), engineered formation (2826) of the macro-cement powder into granules/pellets/briquettes, performing a highly intensive homogenization of the granules in water with chemical admixtures (2812) added into the homogenizer (2810), and mixing the macro-cement paste with sand (2814), aggregates (2816), and/or fibers (2818) in a lower energy mixer (2820) to make concrete.

FIG. 28(d) shows a process flow diagram illustrating the production of macro-cement by dry coating (2800) of micron-sized cement (2802) and pozzolanic particles (2804) with submicron (2806) and nano-particles (2808), engineered formation (2826) of the macro-cement powder into granules/pellets/briquettes, performing highly intensive homogenization of the granules in water with chemical admixtures (2812) added into the homogenizer (2810), mixing the macro-cement paste with sand (2814) in a lower energy intensive mixer (2822), and mixing the macro-cement mortar with aggregates (2816) and/or fibers (2818) in an even lower energy standard mixer (2820) to make concrete.

FIG. 29 shows various process flow options of producing the macro-cement by loading micron-sized cement with or without pozzolanic particles with submicron and nano-particles in the presence of chemical admixtures and making concrete from the macro-cement utilizing multi-stage homogenization processes. FIG. 29(a), for example, shows a process flow diagram illustrating the production of macro-cement by loading (2900) of micron-sized cement (2902) and pozzolanic particles (2904) with submicron (2906) and nano-particles (2908) with chemical admixtures (2912), utilizing a highly intensive homogenizer (2910) for homogenization of the macro-cement powder in water, and mixing the macro-cement paste with sand (2914), aggregates (2916), and/or fibers (2918) in a lower energy mixer (2920) to make concrete.

FIG. 29(b) shows a process flow diagram illustrating the production of macro-cement by loading (2900) of micron-sized cement (2902) and pozzolanic particles (2904) with submicron (2906) and nano-particles (2908) with chemical admixtures (2912), utilizing a highly intensive homogenizer (2910) for homogenization of the macro-cement powder in water, mixing the macro-cement paste with sand (2914) in a lower energy intensive mixer (2926), and mixing the macro-cement mortar with aggregates (2916) and/or fibers (2918) in an even lower energy standard mixer (2920) to make concrete.

FIG. 29(c) shows a process flow diagram illustrating the production of macro-cement by loading (2900) of micron-sized cement (2902) and pozzolanic particles (2904) with submicron (2906) and nano-particles (2908) with chemical admixtures (2912), engineered formation (2928) of the macro-cement powder into granules/pellets/briquettes, utilizing a highly intensive homogenizer (2910 for homogenization of the granules in water, and mixing the macro-cement paste with sand (2914), aggregates (2916), and/or fibers (2918) in a lower energy mixer (2920) to make concrete.

FIG. 29(d) shows a process flow diagram illustrating the production of macro-cement by loading (2900) of micron-sized cement (2902) and pozzolanic particles (2904) with submicron (2906) and nano-particles (2908) with chemical admixtures (2912), engineered formation (2928) of the macro-cement powder into granules/pellets/briquettes, utilizing a highly intensive homogenizer (2910) for homogenization of the granules in water, mixing the macro-cement paste with sand (2914) in a lower energy intensive mixer (2926), and mixing the macro-cement mortar with aggregates (2916) and/or fibers (2918) in an even lower energy standard mixer (2020) to make concrete.

FIG. 30 shows two process flow options of producing the macro-cement by loading micron-sized cement (3002) with or without pozzolanic particles (3004) with submicron (3006) and nano-particles (3008) in the presence of chemical admixtures (3010), and the addition of sand (3012), aggregates (3014) and/or fibers (3016) as well as optionally performing (as shown in FIG. 30(b) and omitted in FIG. 30(a)) engineered formation (3018) of macro-cement powder into granules/pellets/briquettes, and making concrete from the macro-cement cement utilizing multi-stage homogenization processes (3020) including mixing the macro-cement granules with water to make concrete).

Optionally, the sand and/or aggregates may also be coated with set accelerating admixtures such as calcium chloride, triethanolamine, sodium thiocyanate, sodium/calcium formate, sodium/calcium nitrite, calcium nitrate, aluminates, and silicates. The dosage range of the set accelerating admixtures can vary from about 0.1% to about 20% by weight of cementitious material, and in most applications the preferable range is from about 0.5% to about 10% by weight of cementitious material.

Figure 18:
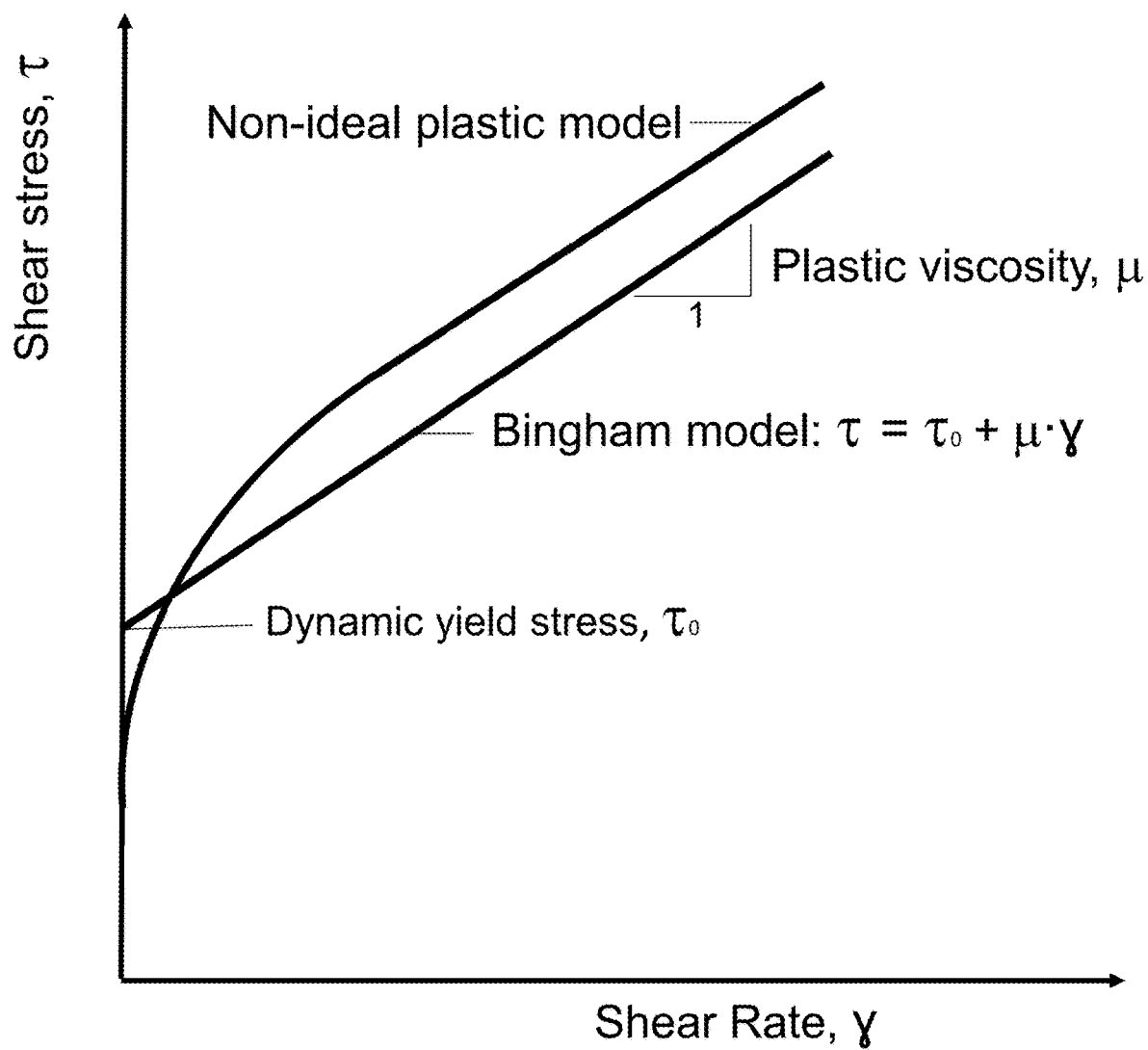
FIG. 18 shows a graph of the Bingham model, characterizing rheology of the cementitious materials in terms of yield stress $\tau_0$, shear rates γ, and plastic viscosity μ.

Mixing the homogenized suspension of macro-cement in water with aggregates of greater dimensions allows for subsequently casting a shaped element or structure and hardening of the subject. The aggregates utilized herein may be any conventional mineral aggregate, such as sand or a mixture of sand with gravel, crushed stone or equivalent materials. The crushed stone may be limestone, basalt, granite, bauxite, etc. Furthermore, a mathematical model is provided which considers the rheology of macro-cement, mortar and concrete mixture, defines the ranges of the rheological parameters of each of these mixtures, and determines the optimum range of mixing parameters for the mixtures on the basis of their respective model. The model is described with reference to FIGS. 18 to 22. FIG. 18 illustrates the Bingham model, characterizing rheology of the cementitious materials in terms of yield stress $\tau_0$, shear rates $\gamma$, and plastic viscosity $\mu$.

Figure 22:
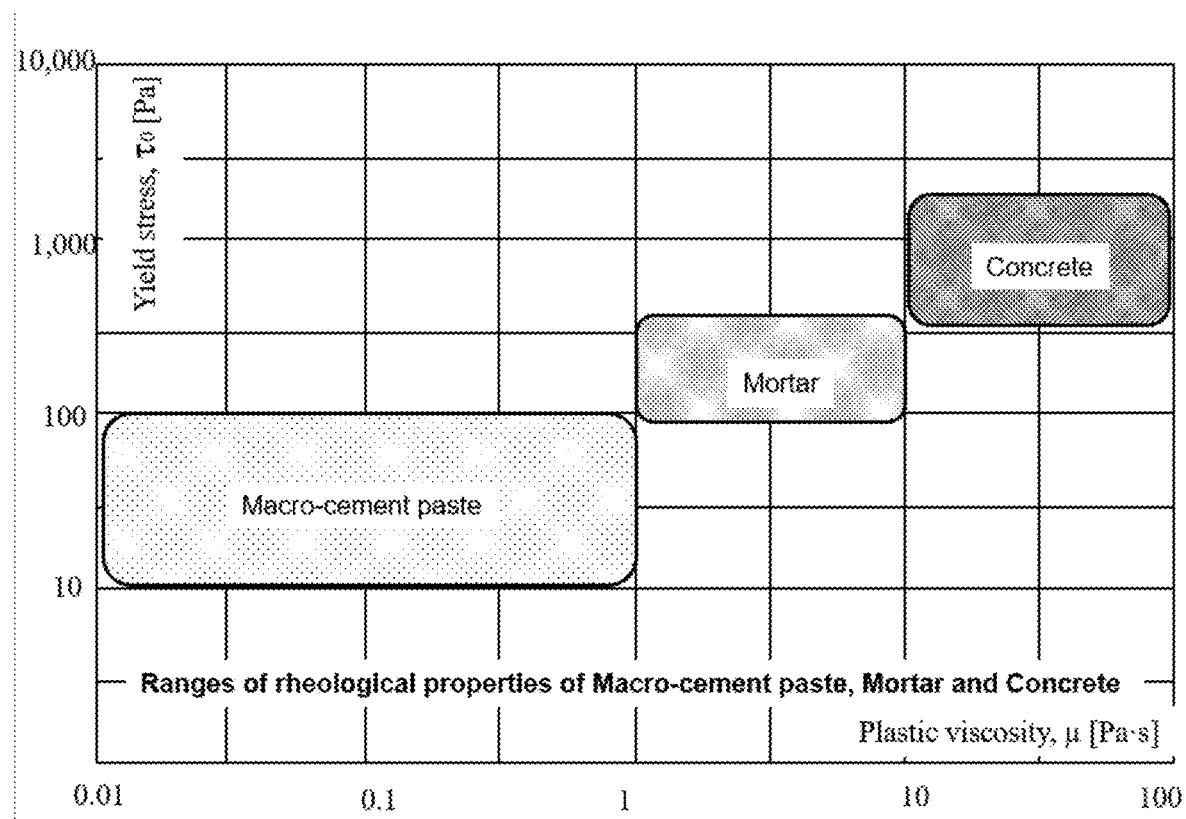
FIG. 22 shows a rheological model illustrating the ranges of plastic viscosity/shear stress of macro-cement paste, mortar, and concrete.

With the appearance of aggregates from macro-cement paste to mortar and increased aggregate sizes from mortar to concrete and decreased water content, the cementitious systems not only increases the viscous friction, but also the inner dry friction occurs between grains of filler, which raises with an increase of aggregates number and size. The difference between the values of dynamic yield stress $\tau_0$ for macro-cement paste, mortar, and concrete, demonstrates not only that the macro-cement paste, mortar, and concrete should be mixed with different speeds in order to provide their optimum homogenization but moreover they should be mixed in different mixers, and more optimally with different mixing principles, since speed control and variation of design parameters in one mixing process fails to account for essential differences in the rheological behavior of the macro-cement paste, mortar and concrete, and a there is need of engineering their mixing process in accordance with their individual rheological properties (FIG. 21, FIG. 22). One efficient mixing process of the cementitious product (arranged for maximum uniformity of the mixture with no ingredients segregation and separation) takes place in the range of shear stress in the product from dynamic yield stress $\tau_0$ to ultimate dynamic stress corresponding to fully destroyed structure of the cementitious product $\tau_d : \tau_0 < \tau < \tau_d$ where in some cases the ultimate dynamic stress $\tau_d$ may be almost by an order higher that the dynamic yield stress $\tau_0$, which can be mathematically expressed by the following equation $\tau_0 < \tau < 10\, \tau_o$ though in most cases the ultimate dynamic stress $\tau_d$ is about four times of dynamic yield stress $\tau_0$ in the corresponding range of shear rates $\gamma$. It is taught that a shear rate $\gamma$ directly proportional to yield stress $\tau$ mixing speed (rpm) and depend on the design parameters of the mixer.

Furthermore, unlike common practice of mixing cement with water, the addition of dry cementitious macro-cement mixture into highly energized moving water is a superior way of preparing hardened concrete elements or structures from macro-cement blends or the engineered forms of macro-cement. Specifically, injecting macro-cement into an energized moving water body such that the ratio of macro-cement to water, and amount of water is sufficient for generating a suspension of fluid of macro-cement paste with evenly distributed water and cement fractions, as opposed to a dense traditional cement paste. The mixing energy density should be sufficient for the cement particles to be uniformly and fully dispersed and simultaneous homogenizing said cement with water by high shear (with shear rate $\gamma_{Macro-Cement}$ providing shear stress equation $\tau_{0\ Macro-cement} < \tau < 10\, \tau_{o\ macro-cement}$, and in most cases in the range $\tau_{0\ Macro-cement} < \tau < 4\, \tau_{o\ Macro-cement}$) with energy density sufficient for the cement particles to be uniformly and fully dispersed with no ingredients segregation and separation. Accordingly, the mixing should be done with shear rate $\gamma_{Macro-Cement}$ providing shear stress $\tau_{0\ Macro-cement} < \tau < 10\, \tau_{o\ Macro-cement}$ and in most cases in the range $\tau_{0\ Macro-cement} < \tau < 4\, \tau_{o\ Macro-cement}$. The water body and subsequently water-cement suspension can be energized by high-pressure nozzles, rotor-stator mixers, Venturi system or ultrasonic processors as an example. In all those systems the input energy is transformed into friction, turbulences, microturbulences, waves, microwaves and cavitation promoting uniform and substantially complete cement homogenization. The subsequent step involves mixing the homogenized suspension of the macro-cement in water with sand and/or aggregates of greater dimensions in a mixer with (lower) mixing energy density required for homogenization of the macro-cement and said sand and/or aggregates mixture (in the case of mortar, with shear rate $\gamma$ mortar providing shear stress $\tau_{0\ mortar} < \tau < 10\, \tau_{o\ mortar}$, and in most cases in the range $\tau_{0\ mortar} < \tau < 4\, \tau_{o\ mortar}$, or, in the case of concrete, with shear rate $\gamma_{concrete}$ providing shear stress $\tau_{0\ concrete} < \tau < 10\, \tau_{o\ concrete}$, and in most cases in the range $\tau_{0\ concrete} < \tau < 4\, \tau_{o\ concrete}$), and fourthly casting a shaped element or structure and hardening of the subject.

The mixing method with differentiated energy densities may comprise carrying out the mixing of heterogeneous dry powdered/bulk concrete materials in several stages by splitting up the whole heterogeneous continuum into several groups with similar materials cohesiveness in each group, and different cohesiveness between the groups. (FIG. 28-30) The method may further comprise first mixing with water the group of the materials of the highest cohesiveness by a system with the highest energy density corresponding to substantially complete homogenization of the materials in this particular group, then adding into the homogenized mass the larger materials of lower cohesiveness, and mixing the total bulk of the materials by a system with lower energy density corresponding to substantially complete homogenization of this entire group. Then, if necessary, adding into the new homogenized mass even larger materials of accordingly lower cohesiveness, and mixing the total bulk of the materials by a system with even lower energy density corresponding to substantially complete homogenization of this new entire group.

Engineering of the known in art mixers is founded on rheology of the cementitious materials most commonly characterized in terms of the Bingham model, which is defined in terms of yield $\tau_0$ and plastic viscosity $\mu$ (FIG. 18).

There is general agreement that concrete and mortar mixtures conform closely to the Bingham model and their behavior in many practical situations can be explained by reference to that model over the range shear rates $\gamma$. While for "ideal" Bingham materials, plastic viscosity is independent of shear rate $\gamma$, the reality is that the cementitious materials are thixotropic, and their viscosity is decreased with increase of shear rates. As concrete becomes more fluid due to increased shear rate and decrease of plastic viscosity (as demonstrated by non-ideal plastic model in FIG. 18), there is a greater risk of loss of internal stability and segregation of concrete ingredients, which explains the above-mentioned fact of de-mixing and the concrete components separation in high intensive mixers.

Figure 19:
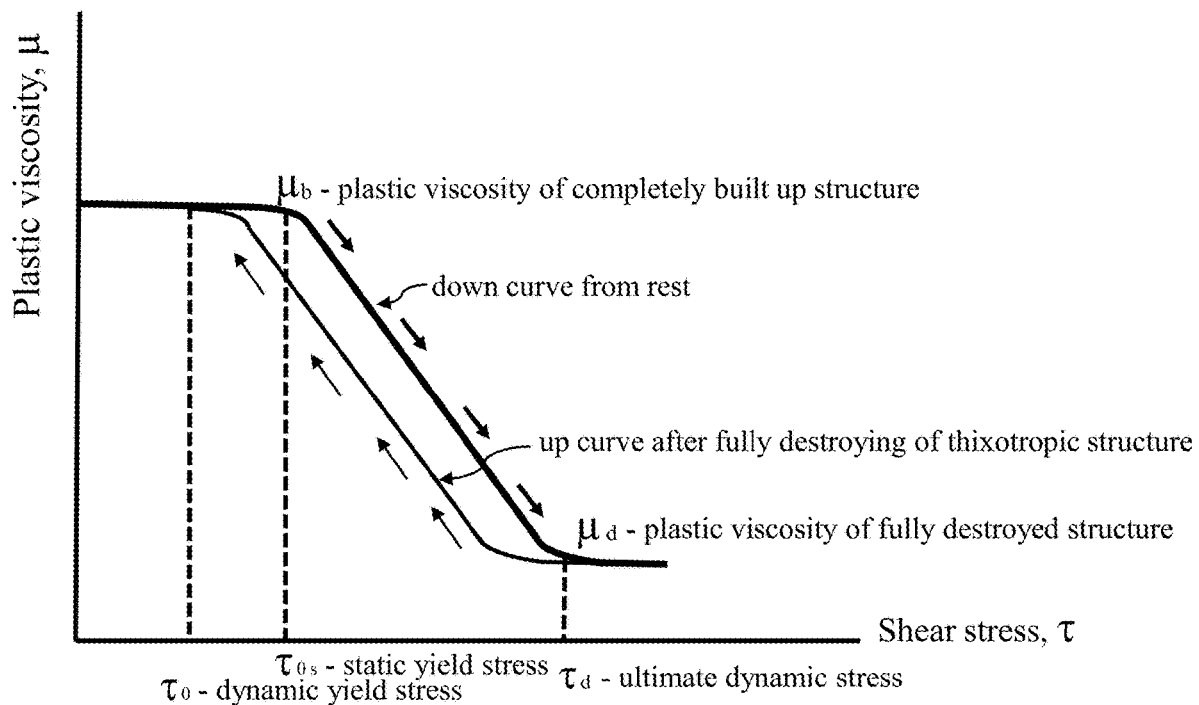
FIG. 19 shows a rheology curve describing effect of shear stress τ on plastic viscosity μ of fresh cementitious materials.

Referring now to FIG. 19, it can be seen that the viscosity of cement paste (mortar, concrete) with increasing shear stress from the resting state (down curve from rest) to a certain value $\mu_b$-plastic viscosity of completely built up cementitious structure, corresponding to $\tau_0 s$-static yield stress of the built up cementitious structure (minimum shear stress to initiate flow from rest), begins to decrease, and at the value $\mu_d$, a substantially complete breakdown of the cement paste (mortar, concrete) occurs and the cementitious structure is characterized by a constant value $\mu_d$-plastic viscosity of fully destroyed cementitious structure, corresponding to the ultimate dynamic stress $\tau_d$. The viscosity of cement paste (mortar, concrete) with decreasing shear stress from the state of fully destroyed structure (up curve after fully destroying of the cementitious structure), begins to increase back to the viscosity value $\mu_b$-plastic viscosity of completely built up cementitious structure, corresponding to $\tau_0$-dynamic yield stress of the cementitious structure (minimum shear stress to maintain flow after breakdown of thixotropic cementitious structure). Area between down and up curves is due to thixotropy of the cementitious structure.

Figure 20:
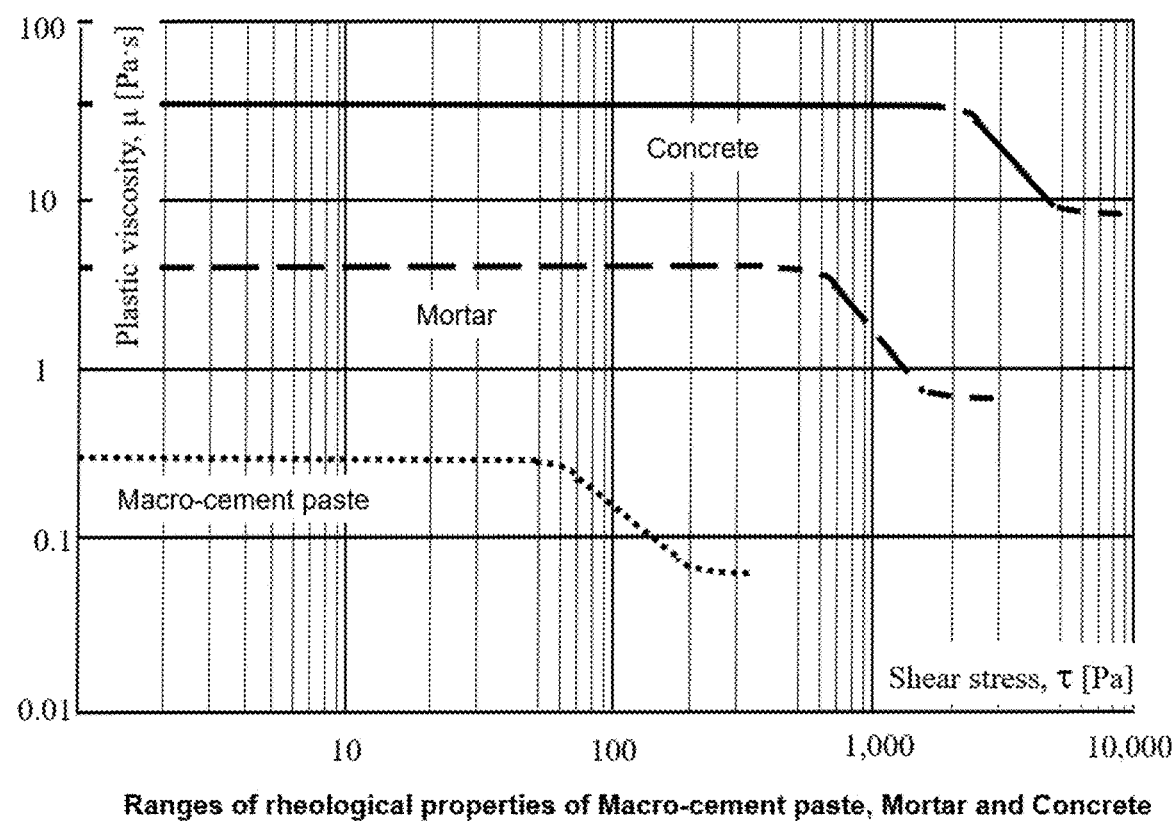
FIG. 20 shows rheological curves demonstrating the effect of shear stress z on plastic viscosity μ of some macro-cement paste, mortar, and concrete.

FIG. 20 illustrates an approximate rheological model of the macro-cement paste, mortar, and concrete based on the rheological model described herein and also illustrated in FIG. 19, and taking into account some average rheological parameters in the range of the above described rheological parameters in FIG. 21 of the cementitious products. The table in FIG. 21 describes possible ranges of yield stress $\tau_0$ and plastic viscosity $\mu$ for macro-cement paste, mortar, and concrete.

FIG. 22 reverses the axis of "Shear stress" and "Plastic viscosity" shown in FIG. 19, FIG. 20, and using data in FIG. 21 illustrates graphically that the ranges of plastic viscosity/shear stress of the macro-cement paste, mortar and concrete are not only substantially different but do not intersect, which means substantially different non-intersecting optimum mixing modes for these materials.

The described multi-stage wet homogenization process is applicable for preparation any cement paste, mortar and concrete by providing the best possible homogenization of these cementitious materials with minimum energy consumption. The method is particularly useful for preparation macro-cement paste, mortar, and concrete from granulated macro-cement, providing quick and substantially complete destruction of the granules by mixing them with water with the highest energy density corresponding to rheological properties of the macro-cement paste.

The following examples, wherein all parts and percentages are to be taken by weight, illustrate some of the embodiments of the foregoing macro-cement and methods for producing macro-cement, but are not to be construed as limiting their scope.

According to one embodiment, at the first stage of the method of producing macro-cement or engineered solid forms of macro-cement individual cement particles are coated by particles of $SiO_2$-containing micro-particles by known methods of dry powder coating, at the second stage, the $SiO_2$-containing micro-particles particles are coated with a binder being a liquid chemical admixture, and at the third stage the mixture is granulated or pelletized by compaction.

According to another embodiment, at the first stage of the method of making macro-cement single cement particles are coated by nano-sized particles, tubes, and/or fibers by known methods of dry powder coating, at the second stage mixed with a binder being a liquid chemical admixture, and at the third stage the mixture is granulated or pelletized by compaction.

According to yet another embodiment, at the first stage of the method of making macro-cement the single cement particles are coated by particles of $SiO_2$-containing micro-particles by known methods of dry powder coating, at the second stage the particles are loaded with nano-sized particles, tubes, and/or fibers, at the third stage mixed with a binder being a liquid chemical admixture, and at a fourth stage the mixture is granulated or pelletized by compaction.

According to yet another embodiment, micron-sized SCM particles (e.g., fly ash, granulated ground slag, etc.) are coated by submicron-sized SiO2-containing particles by known methods of dry powder coating and/or coated by nano-sized particles, tubes, and/or fibers by known methods of dry powder coating parallel with coating cement, and at the third stage the mixture is granulated or pelletized by compaction.

According to yet another embodiment, shown in FIG. 1, at the first stage of the multi-stage treatment the "carrier" material is provided (100), which is cement powder or fly ash. The cement may be selected from any type of Portland cement, Portland based blended hydraulic cement, calcium aluminate cement, and other cements. The cement may be a mixture of the above mentioned or other cements in any proportion. Fly ash may be selected from any class including class F, class C, etc., or mixture of different classes in any proportion. In the second stage, the $SiO_2$-containing submicron-sized particles are provided (102). The micro-particles may be selected from finely ground quartz, sand, bauxite, finely ground fly ash and silica fume of any type including grey from silicon and ferrosilicon industry, white from zirconium industry, densified, and undensified. The micro-particles may be a mixture of the above mentioned $SiO_2$-containing materials in any proportion. In the third stage, the nanoparticles are provided (104). The nanoparticles may be selected from nanosilica, carbon nano-tubes and fibers, nano-clay, nano-$TiO_2$, nano-$Fe_2O_3$. The nano-particles may be a mixture of the above-mentioned materials in any proportion. In the fourth stage, the liquid admixture is provided (106). The liquid admixture can be a superplasticizer of any type including melamine, naphthalene, lignosulfonates, and polycarboxylate, and/or plasticizers of any type including lignosulfonates, hydroxylated carboxylic add salts, carbohydrates. Another liquid admixture can be retarder of any type including lignin, borax, sugars, and tartaric acid and salts. The above-mentioned admixtures are mentioned as an example only and can include any known admixtures for concrete in any sequence of adsorption. In a fifth stage, the cement particles, and other carrier particles if present, are loaded with $SiO_2$-containing submicron- and nanoparticles (108). The cement particles can be covered by any of the dry submicron and dry nanoparticles in any sequence one after another, or by a mixture of the particles in any their combination. For example, the cement particles coated by $SiO_2$-containing submicron-sized particles can be coated by suspension of nanoparticles in a liquid. In a sixth stage, the cement coated by submicron- and nanoparticles mixed with polymer liquid admixture-binder (110). In describing polymers in the form of the liquid chemical admixtures for concrete, it is understood, as an example, water reducers of any type may include: lignosulfonates, melamine-based (i.e. sulphonated melamine formaldehyde), naphthalene-based (i.e. sulphonated naphthalene formaldehyde), polycarboxylate-based admixtures, lignosulfonates, hydroxylated carboxylic add salts, carbohydrates; and/or retarding admixtures of any type, including: sugars, organophosphates, tartaric acid and salts; and/or the bonding admixtures of any type, including: polyvinyl chloride, polyvinyl acetate, acrylics, and butadiene-styrene copolymers. In a seventh stage, the described above macro-cement mixture is made into an engineered formation (112), as an example in tumbling drums and pans, fluidized beds, and mixer granulators, or pelletized or briquetted or tabletted by compaction by roll pressing, extrusion and tabletting machines.

According to yet another embodiment a method of making shaped elements or structures out of the macro-cement is provided (FIG. 16). In step 1 (1600), the macro-cement is produced according to other disclosed embodiments i.e. as shown in FIG. 1. In step 2 (1602), the macro-cement powder or engineered formations are injected into an energized moving water body characterized by the presence of waves, micro-waves, turbulences, micro-turbulences, and cavitation such that ratio of cement and water flow rates injecting an amount of water is sufficient for generating a suspension with evenly distributed water and cement fractions. By simultaneous mixing said cement granules with water having high shear, impact and other forces creates energy density sufficient for substantially complete destruction of the granules and the cement particles to be homogeneously dispersed and fully hydrated with water (all cement grains are combined chemically with water molecules). The water body and subsequently water-macro-cement suspension can be energized by high-pressure nozzles, rotor-stator mixers, Venturi system or ultrasonic processors, as an example. In all these systems, the input energy is transformed into micro-turbulences, micro-waves and cavitation, promoting uniform and substantially complete cement homogenization. Effective micro mixing with high energy mixing density without air induction cause cavitation in liquids and promote air detraining, which in turn translates into higher concrete density and strength. In step 3 (1604), the homogenized suspension of the macro-cement in water is mixed with sand and/or aggregates of greater dimensions in a mixer with (lower) mixing energy density required for homogenization of the macro-cement and the sand and/or aggregates mixture without causing separation of the concrete ingredients. In step 4 (1606), the homogenized fresh mortar/concrete is cast into a shaped element or structure and the subject is hardened (FIG. 28-FIG. 30).

According to yet another embodiment, the rheological parameters of the cementitious products are macro-cement paste: yield stress $\tau_{0\ Macro\text{-}cement}$=10-100 Pa, plastic viscosity $\mu_{Macro\text{-}Cement}$=0.01-1 Pas; Mortar: yield stress $\tau_{0\ mortar}$=100-500 Pa, plastic viscosity $\mu$ mortar=1-10 Pas; Concrete: yield stress $\tau_{0\ concrete}$=500-2000 Pa, plastic viscosity $\mu$=10-100 Pas.

Furthermore, to facilitate a better understanding of the present invention, the following examples applying certain aspects of some embodiments are given. In no way should the following examples be read to limit, or define, the scope of the invention.

Example 1

To evaluate the microstructure of silica fume agglomeration statistics of regular UHPC mixtures produced in different mixers versus that of UHPC produced with macro-cement the following mixing equipment, materials, mixtures, procedure, mixture properties, casting, curing, and sample preparation were utilized and the described results obtained.

Mixing Equipment:
1. IM—The intensive mixer with a counter-current rotating pan and high-speed rotor tool with fixed pan scraper blade; Eirich R09T 200 L intensive mixer.
2. FP—The flat pan mixer with a counter-current rotating pan and rotating paddle with fixed pan scraper blade; 100 L flat pan mixer.
3. PM—The plaster/mortar mixer with a fixed drum with rotating paddles; MULTIQUIP WM70PH5 193 L plaster/mortar mixer.
4. DM—The drum mixer with fixed paddles attached to the rotating drum; TUFX 120 L drum mixer.

Materials:

TABLE 1

| Materials | | |
|---|---|---|
| Item | Source | Specific gravity |
| Portland cement | Holcim Mississauga GU | 3.11 |
| Silica fume | Norchem densified SF | 2.20 |
| Fine aggregate | Sand Fairmount Santrol LS-80 | 2.64 |

TABLE 1-continued

| Materials | | |
|---|---|---|
| Item | Source | Specific gravity |
| Superplasticizer | BASF MasterGlenium 3400 | 1.10 |
| Water | City of Toronto | 1.00 |

Mix Design:

TABLE 2

| Mix design | |
|---|---|
| Material | Weight, kg/m$^3$ |
| Portland cement | 1030 |
| Silica fume | 258 |
| Fine aggregate | 640 |
| Superplasticizer | 46.5 |
| Water | 238 |

Procedure:
Mixing:
1. Regular Mixtures:
For all of the regular mixtures, a dry blend of the cementitious components (Portland cement and silica fume) and the oven-dried fine aggregate was produced in the intensive mixer by blending for one minute at a rotor speed of 165 rpm. The dry-blended ingredients were discharged and stored in sealed pails for subsequent use in the flat pan, plaster/mortar, and drum mixers. For UHPC mixtures produced in the intensive mixer, the dry-blended ingredients were not discharged, but remained in the pan for immediate combination with the liquid ingredients at a rotor speed of 380 rpm. For all of the regular mixtures, the liquid admixture was added to a clean pail, along with the mix water, and stirred together prior to addition to the dry blend. The liquid ingredients were added to the dry blend with the mixer activated and mixed for a period of three minutes, followed by a two-minute resting period, followed by another two minutes of mixing.

2. Macro-Cement:
The UHPC with macro-cement of the invention was produced by firstly, coating/loading the cement with the silica fume, sand, and superplasticizer in a proprietary high shear mixer, secondly pelletized in a proprietary compactor, and thirdly mixing the macro-cement with water in the flat pan mixer (FP) in the same mixing mode as the regular mixtures.

Mixture Properties:

TABLE 3

| Fresh concrete mixtures properties | | | | | |
|---|---|---|---|---|---|
| | Mix ID: Mixer/UHPC Mixture: Regular Mixture (RM); Macro-Cement (MC) | | | | |
| Parameter | IM/RM Intensive mixer Regular mixture | FP/RM Flat pan mixer Regular mixture | PM/RM Plaster mixer Regular mixture | DM/RM Drum mixer Regular mixture | FP/MC Flat pan mixer Macro-cement |
| Temperature, ° C. | 25.4 | 28.7 | 22.7 | 23.6 | 26.2 |
| Flow (concrete cone), mm | 640 | 535 | 580 | 645 | 740 |
| Flow (mortar cone), mm | 180 | 150 | 155 | 180 | 210 |

Casting:

Both concrete mixture types (regular-RM and macro-cement-MC) were cast in 50 mm dia.×100 mm cylinders and also cast in 100 mm dia.×200 mm cylinders. The cylinders were vibrated for 20-30 seconds on a vibrating table during casting.

Curing:

Immediately subsequent to casting, the dosed cylinders were placed into a moist chamber at a temperature of 20° C., and then stored there for 90 days prior to preparing the samples for microstructure analysis.

Sample Preparation:

Thin section preparation was performed for silica fume agglomeration analysis. Pieces of 20 mm were removed from the top of each cylinder using a kerosene cooled diamond saw, and further trimmed to achieve two approximately 25×25×50 mm blocks, as shown in FIG. 23 illustrating orientation of blocks for thin sectioning from 50 mm diameter cylinders.

Figure 23:
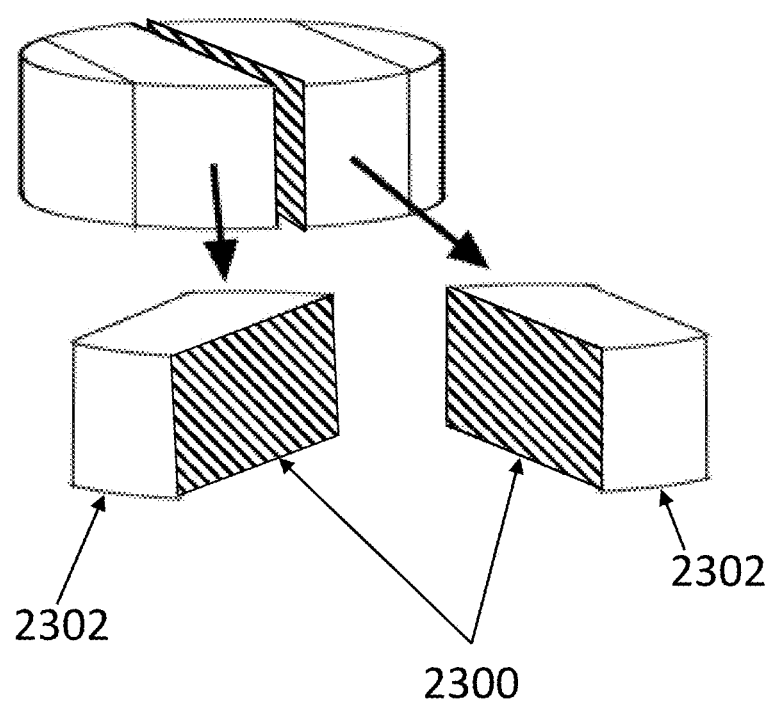
FIG. 23 shows an exemplary orientation of blocks for thin sectioning.

The shaded face (2300) of each block (2302) in FIG. 23 was fixed to a glass slide with a rapid set epoxy, and then trimmed again with a kerosene cooled diamond saw in an orientation parallel to the glass slide to achieve a block+glass slide thickness of 10.2 mm. The cut face was further ground using a kerosene cooled precision diamond grinding wheel to remove an additional 0.1 mm of material. The diamond ground faces were dried overnight in a 35° C. oven to remove residual kerosene. Next, the prepared faces were vacuum impregnated with fluorescent epoxy. After hardening, the remaining epoxy veneer was removed from the faces by hand using a combination of kerosene and 600 grit (12 μm) SiC paper, leaving only the epoxy that had penetrated into the voids and capillary pores of the sample. The faces were dried, and fixed to a final glass slide using clear epoxy. After hardening, the samples were trimmed with a kerosene cooled diamond saw and ground to a final sample thickness of 20 μm using loose 600 grit (12 μm) SIC on an oil cooled rotating platen. A glass coverslip was fixed to one thin section from each pair for examination with a petrographic microscope.

Figure 24:
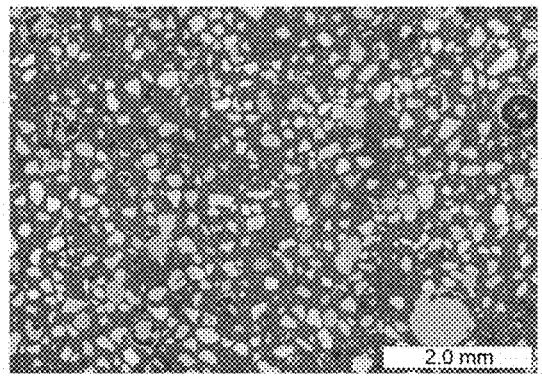
FIG. 24 shows thin section transmitted light images of hardened regular mixtures in comparison to a macro-cement mixture.
Figure 24:
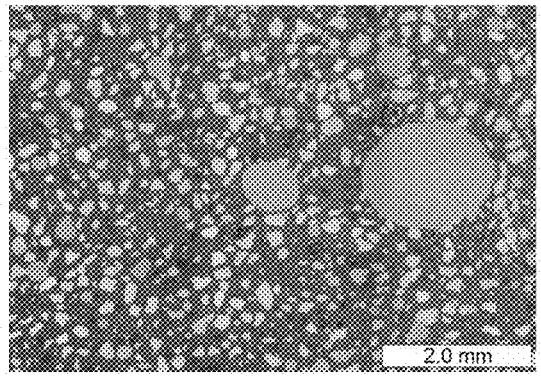
Figure 24:
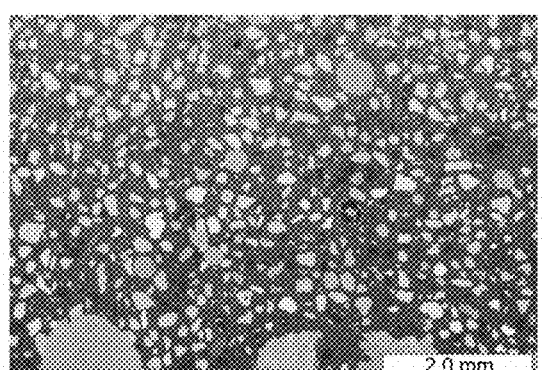
Figure 24:
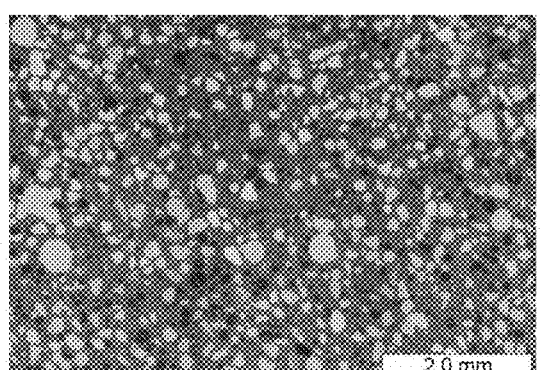
Figure 24:
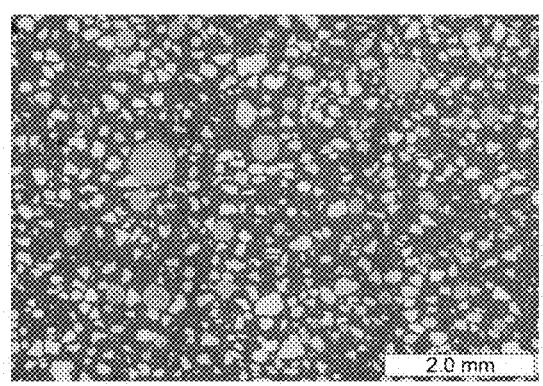

Results:

Petrographic microscope assessment was performed on dispersal of densified silica fume. Under transmitted light silica fume agglomerations appear as dark brown desiccated "mud-cracked" masses. Image analyses were performed on the images in FIG. 24 to reveal and isolate the agglomerations, and to determine the minor axis length of the best fit ellipse to each particle. FIG. 24 shows thin section transmitted light images of hardened regular mixtures FIGS. 24(a), 24(b), 24(c) and 24(d), in comparison to macro-cement mixture FIG. 24(e) wherein the smaller dark and larger dark desiccated mud-cracked masses are aggregates of silica fume; FIG. 24(a) shows a thin section transmitted light image of the regular hardened mixture blended in an intensive mixer—IM/RM (Intensive mixer/Regular mixture); FIG. 24(b) shows a thin section transmitted light image of the regular hardened mixture blended in a flat pan mixer—FP/RM (Flat pan mixer/Regular mixture); FIG. 24(c) shows a thin section transmitted light image of the regular hardened mixture blended in a plaster/mortar mixer—PM/RM (Plaster/Mortar mixer/Regular mixture); FIG. 24(d) shows a thin section transmitted light image of the regular hardened mixture blended in drum mixer—DM/RM (Drum mixer/Regular mixture), and FIG. 24(e) shows a thin section transmitted light image of a macro-cement hardened mixture blended in a flat pan mixer—FP/MC (Flat pan mixer/Macro-cement).

The overall volume percentage of silica fume agglomerations for each mixture and a value for the agglomeration specific surface was calculated and is reported in Table 4. Based on the volume percentage, and the established stereological relationship between specific surface and the average particle intercept length by a linear probe, an expression for agglomeration frequency was derived and is reported in Table 4.

TABLE 4

| Silica fume agglomeration statistics | | | | | | |
|---|---|---|---|---|---|---|
| Mix ID | Vol. % | Min. size (μm) | Avg. size (μm) | Max. size (μm) | Specific surface (mm$^{-1}$) | Frequency (agglomerations/cm) |
| IM/RM | 3.2 | 67 | 167 | 437 | 19.6 | 1.6 |
| FP/RM | 3.2 | 53 | 101 | 217 | 49.8 | 4.0 |
| PM/RM | 5.3 | 51 | 99 | 306 | 41.3 | 5.5 |
| DM/RM | 7.8 | 49 | 115 | 241 | 42.7 | 8.3 |
| FP/MC | | | No agglomerations observed | | | |

Example 1 thus indicates that macro-cement provides the most uniform concrete matrix with complete dispersion the macro-cement ingredients. Silica fume agglomerations were present in all of the mixtures (FIG. 24a-d), except for the mixture based on the macro-cement of the invention (FIG. 24e) as shown on images of FIG. 24 and reported in Table 4. Uniformity of the concrete matrix, in turn, contributes to higher strength and durability of the macro-cement based concrete.

Example 2

The following is an example comparing the microstructure air voids parameters of regular UHPC mixtures produced in and that of UHPC produced with macro-cement of the invention were compared. The mixing equipment, materials, mix design, procedure, mixture properties, casting, and curing employed in Example 1 were also employed in Example 2. The following sample preparation was performed and the described results obtained.

Figure 25:
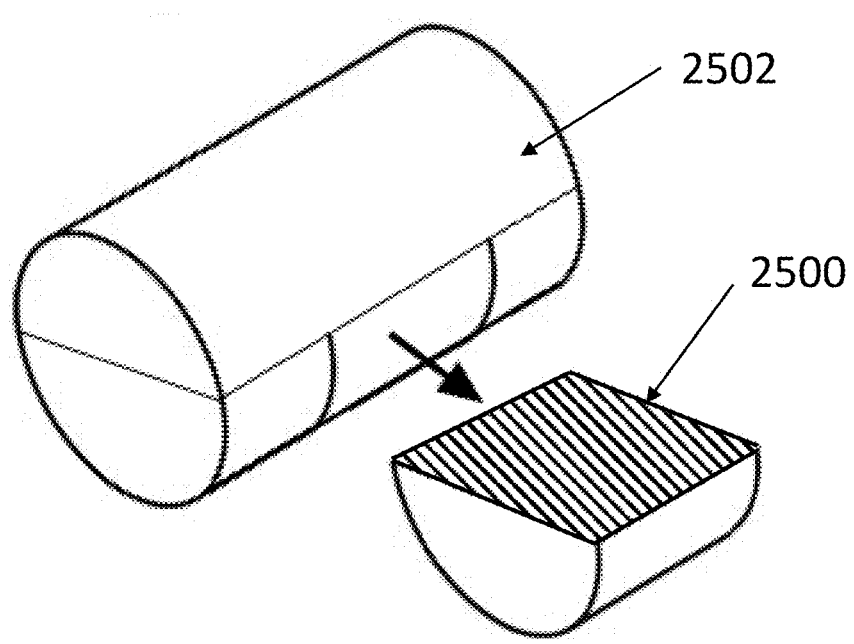
FIG. 25 shows an orientation of samples for air void analyses.

Sample Preparation:

Polished slabs were prepared for air-void analysis. The 100 mm diameter cylinders were cut in half lengthwise with a water-cooled diamond saw, and sub-sectioned to obtain one 100×75 mm study area (2500) per cylinder (2502), as depicted in cross-hatching in FIG. 25 illustrating orientation of samples for air void analyses from 100 mm diameter cylinders. The faces were ground with a water cooled 80 grit (180 μm) diamond embedded abrasive rotating platen, and then lapped with lose 600 grit (12 μm) SiC on a water cooled rotating platen. Final polish was achieved with 600 grit (12 μm) SiC adhesive backed sand paper on a water cooled platen. The polished surfaces were blackened with a permanent marker, and white powder pressed into the air voids. The prepared surfaces were scanned with a desktop flatbed scanner at a pixel resolution of 8×8 μm.

Tests Results:

Air void analysis was performed with a flatbed scanner. Image analyses were performed on the scanned images of the polished slabs to determine the hardened air-void parameters, and are reported in Table 5. The areas analyzed are shown in FIG. 26, and the air-void intercept length distributions are plotted in FIG. 27.

Figure 26:
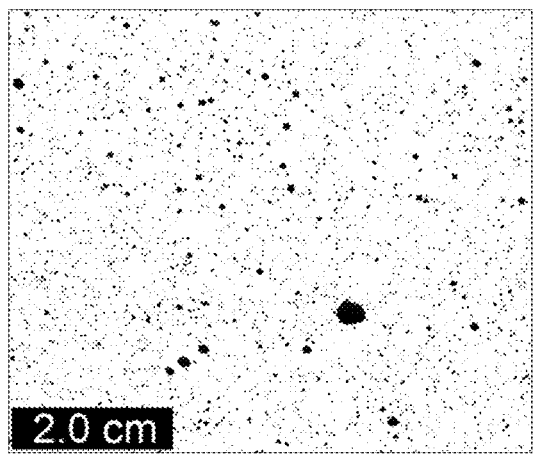
FIG. 26 shows scanned images of polished slabs of hardened regular mixtures, in comparison to macro-cement mixture to determine the hardened air-void parameters.
Figure 26:
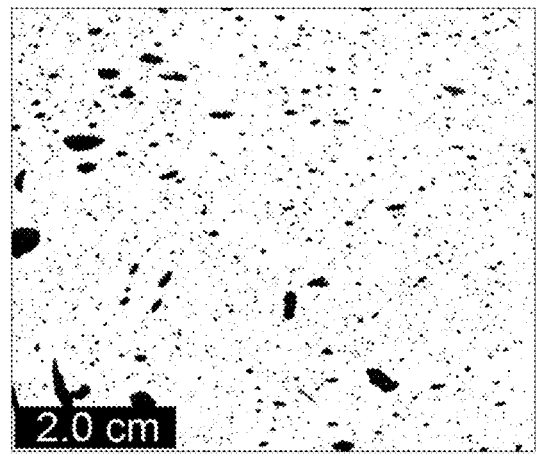
Figure 26:
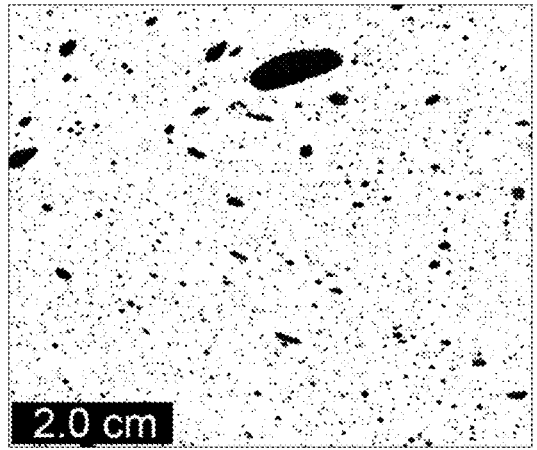
Figure 26:
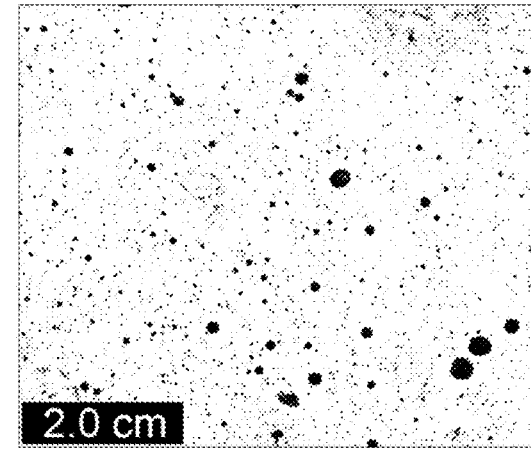
Figure 26:
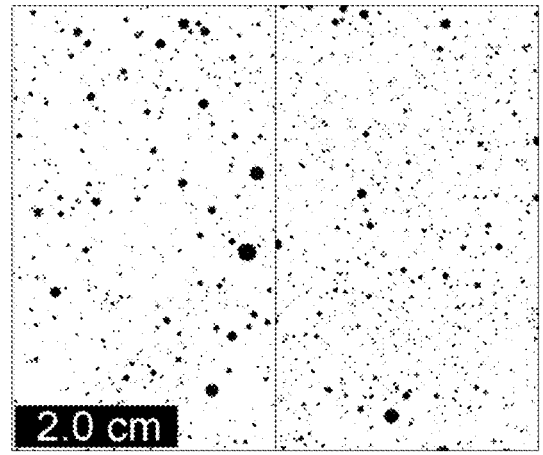

FIG. 26 shows scanned images of polished slabs of hardened regular mixtures, in comparison to macro-cement mixture to determine the hardened air-void parameters. The black masses or dots within the images are air voids; FIG. 26(a) shows a scanned image of polish hardened regular mixture blended in intensive mixer—IM/RM (Intensive mixer/Regular mixture); FIG. 26(b) shows a scanned image of polish hardened regular mixture blended in flat pan mixer—FP/RM (Flat pan mixer/Regular mixture); FIG. 26(c) shows a scanned image of polish hardened regular mixture blended in plaster/mortar mixer—PM/RM (Plaster/Mortar mixer/Regular mixture); FIG. 26(d) shows a scanned image of polish hardened regular mixture blended in drum mixer—DM/RM (Drum mixer/Regular mixture); FIG. 26(e) shows a scanned image of polish hardened macro-cement blended in flat pan mixer—FP/MC (Flat pan mixer/Macro-cement) wherein the picture consists of two scanned images at different sample locations.

Figure 27:
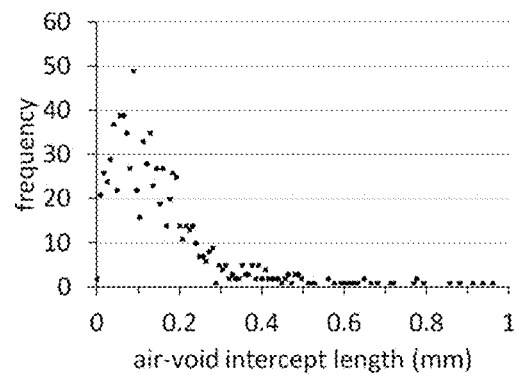
FIG. 27 shows plots of the air-void intercept length distributions of hardened regular mixtures in comparison to a hardened macro-cement mixture.
Figure 27:
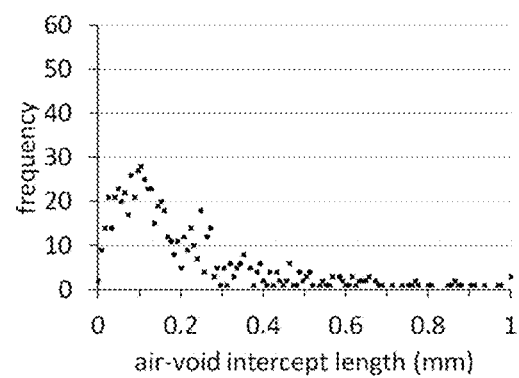
Figure 27:
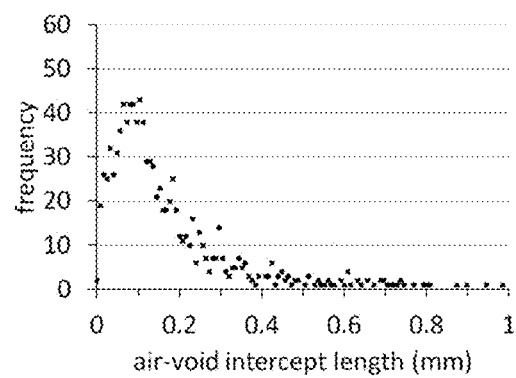
Figure 27:
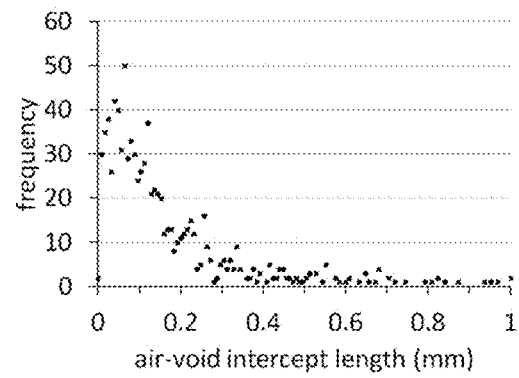
Figure 27:
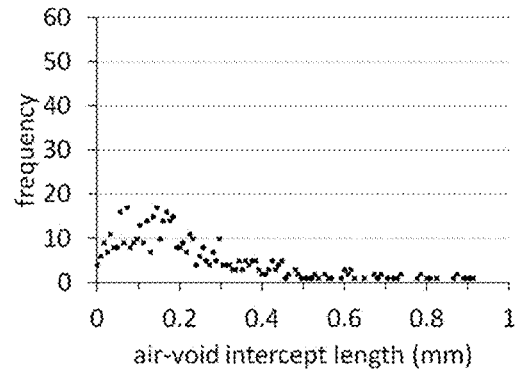

FIG. 27 shows plots of the air-void intercept length distributions of hardened regular mixtures in comparison to a hardened macro-cement mixture; FIG. 27(a) shows a plot of the air-void intercept length distributions of the regular hardened mixture blended in Intensive mixer—IM/RM (Intensive mixer/Regular mixture); FIG. 27(b) shows a plot of the air-void intercept length distributions of the regular hardened mixture blended in flat pan mixer—FP/RM (Flat pan mixer/Regular mixture); FIG. 27(c) shows plots of the air-void intercept length distributions of the regular hardened mixture blended in plaster/mortar mixer—PM/RM (Plaster/Mortar mixer/Regular mixture); FIG. 27(d) shows a plot of the air-void intercept length distributions of the regular hardened mixture blended in drum mixer—DM/RM (Drum mixer/Regular mixture); FIG. 27(e) shows plots of the air-void intercept length distributions of the hardened macro-cement blended in flat pan mixer—FP/MC (Flat pan mixer/Macro-cement).

TABLE 5

Air-void parameters

Mix ID: Mixer/UHPC Mixture: Regular Mixture (RM); Macro-Cement (MC)

| Parameter | IM/RM Intensive mixer Regular mixture | FP/RM Flat pan mixer Regular mixture | PM/RM Plaster mixer Regular mixture | DM/RM Drum mixer Regular mixture | FP/MC Flat pan mixer Macro-cement |
|---|---|---|---|---|---|
| Length of traverse (mm) | 3894.24 | 3894.24 | 3894.24 | 3894.24 | 3900.48 |
| Length through air (mm) | 152.80 | 228.97 | 246.63 | 171.04 | 129.95 |
| # of air-voids intercepted | 883 | 748 | 995 | 877 | 504 |
| Air content (vol. %) | 3.92 | 5.88 | 6.33 | 4.39 | 3.33 |
| Air-void frequency (voids/cm) | 2.27 | 1.92 | 2.56 | 2.25 | 1.29 |
| Specific surface (mm$^{-1}$) | 23.1 | 13.1 | 16.1 | 20.5 | 15.5 |

Example 2 thus indicates that UHPC based on the macro-cement of the invention, as shown in the images of FIG. 26a-d, and FIG. 27a-d and reported in Table 5, had the lowest air content and air-void frequency of all of the mixtures, which contributes to higher strength and durability of the macro-cement based concrete (FIG. 26e and FIG. 27e), and its lower permeability.

Example 3

The following example compares mechanical properties of regular UHPC mixtures produced in different mixers with that of UHPC produced with macro-cement. The properties include compressive strength of the concrete at age of 3, 7, and 28 days. Mixing equipment, Materials, Mix design, Procedure, Mixture properties, and Casting were the same as in the Examples 1 and 2.

Curing:

Immediately subsequent to casting, the closed cylinders were placed into a moist chamber at a temperature of 2000, and then stored there until testing.

Tests Results:

The compressive strength of was evaluated at 3 days, 7 days and 28 days on 50 mm dia.×100 mm cylinders and reported in the Table 6.

TABLE 6

Compressive strength of UHPC

Compressive strength (MPa)

| Age (days) | IM/RM Intensive mixer Regular mixture | FP/RM Flat pan mixer Regular mixture | PM/RM Plaster mixer Regular mixture | DM/RM Drum mixer Regular mixture | FP/MC Flat pan mixer Macro-cement |
|---|---|---|---|---|---|
| 3 | — | — | — | — | 99.8 |
| 7 | 79.9 | 65.4 | 66.9 | 59.1 | 129.5 |
| 28 | 112.0 | 98.0 | 93.1 | 92.7 | 152.5 |

Example 3 thus indicates that UHPC based on the macro-cement of the invention, as reported in Table 6, demonstrated well higher compressive strength at 3, 7, and 28 days than concrete made of all the other mixtures at the same days.

Although the foregoing has been described with reference to certain specific embodiments, various modifications thereto will be apparent to those skilled in the art without departing from the spirit and scope of the invention as outlined in the appended claims. The entire disclosure.

Example 4

The following example compares the shelf life of powdered macro-cement with formed (granulated) macro-cement in various storage conditions. The dry powdered and granulated macro-cement is prepared from the same materials and by the same mix design (Table 7 and Table 8).

Materials:

TABLE 7

Materials

| Item | Source | Specific gravity | Note |
|---|---|---|---|
| Portland cement | Holcim CRH Type HE | 3.15 | Included in the dry mixture |
| Silica fume | Elkem 955U | 2.20 | Included in the dry mixture |
| Superplasticizer | Mighty 21PSN | 1.18 | Included in the dry mixture |
| Fine aggregate | Sand Fairmount Santrol LS-80 | 2.64 | Added to the above dry mixture into concrete mixer |
| Water | City of Toronto | 1.00 | Added to the above dry mixture into concrete mixer |

Mix Design:

TABLE 8

Mix design

| Material | Weight, kg/m$^3$ |
|---|---|
| Portland cement | 955 |
| Silica fume | 220 |
| Superplasticizer | 15 |
| Fine aggregate | 955 |
| Water | 224 |

Procedure 1:

Mixing: Dry powdered macro-cement of the invention was produced in the process of "forced packing" by coating/loading the cement with the silica fume, and superplasticizer (Table 7) in a proprietary high shear mixer.

About a half quantity of the produced powdered macro-cement is preserved for further shelf life testing in various storage conditions, and another half formed (granulated) for shelf life testing in the same storage conditions.

Granulation: The dry powdered macro-cement of the above composition formed (granulated) in a proprietary compactor.

Storage conditions of the Powdered and Formed macro-cement:

1. NR—Normal Room conditions in open plastic containers (Temperature—T ~22° C., Relative Humidity—RH <60%);
2. NH—Normal High Humidity conditions—in open boxes inside closed containers with water (Temperature—T ~22° C., Relative Humidity—RH ~90%);
3. AA—Accelerated Aging conditions—in open boxes inside container with hot water (Temperature—T ~80° C., Relative Humidity—RH >90%)

Tests Results:

Measuring of pick up moisture by Powdered and Formed macro-cement in the above mentioned storage conditions. Test results in Table 9.

TABLE 9

Test Results

| Storage conditions | No | Product | Weight increase, % |
|---|---|---|---|
| NR - Normal Room: T ~22° C., RH < 60%, 10 days | 1 | Powdered | +1.5% |
|  | 2 | Formed | +1% |
| NH - Normal High Humidity: T ~22° C., RH ~90%, 10 days | 3 | Powdered | +3% |
|  | 4 | Formed | +2% |
| NH - Normal High Humidity: T ~22° C., RH ~90%, 10 days + AA - Accelerated Aging: T ~80° C., RH >90%, 2 days | 5 | Powdered | +11% |
|  | 6 | Formed | +5% |
| NH - Normal High Humidity: T ~22° C., RH ~90%, 15 days + AA - Accelerated Aging: T ~80° C., RH >90%, 7 days | 7 | Powdered | +21% |
|  | 8 | Formed | +9% |

Conclusion: The Formed macro-cement picked—up from surrounding air on the average (in all the above storage conditions) about a half amount of moisture in compare with the Powdered macro-cement.

Procedure 2:

Mixing:

1. Original fresh macro-cement powder is mixed with sand and water according to the mix design (Table 8) in the Hobart mixer Q20.
2. Powdered and Formed macro-cement samples after storage in the above conditions (Table 9, No 0-8) mixed with sand and water according to the mix design (Table 8) in the Hobart Q20.

Casting:

The above nine concrete mixture types were cast into 2" cubes. The cubes were vibrated for 15-20 seconds on a vibrating table during casting.

Curing:

Immediately subsequent to casting, the cubes were placed into a moist chamber at a temperature of 20° C. and demolded after 24 hours. Subsequently the cubes were divided into three groups for measuring their compressive strength after 1 day, 4 days, and 28 days after casting. The cubes for measuring their compressive strength after 1 day were tested after demolding. The cubes for measuring their compressive strength after 4 days and 28 days were stored accordingly 3 days and 27 days in water at a temperature of 20° C. prior to their conditioning (1 day) and testing.

Test Results:

Compressive strength of the concrete (2" cubes) made from the original (fresh) powdered macro-cement as well as compressive strength of the concrete made from powdered and formed macro-cement after their storage in various conditions was evaluated and reported in the Table 10.

TABLE 10

Compressive strength of macro-cement

| Storage conditions | No | Product | Compressive Strength, MPa 1 d/4 d/28 d | Strength Loss, % Average | Due aging time in normal storage conditions, months |
|---|---|---|---|---|---|
| 0 days | 0 | Powdered | 80/115/145 | 0 | 0 |
| NR - Normal Room: T ~22° C., RH <60%, 10 days | 1 | Powdered | 56/78/93 | ~30% | 6 |
|  | 2 | Formed | 77/110/132 | ~5% | 1 |
| NH - Normal High Humidity: T ~22° C. RH ~90%, 10 days | 3 | Powdered | 42/56/77 | ~50% | 15 |
|  | 4 | Formed | 76/105/121 | ~10% | 1 |
| NH - Normal High Humidity: T ~22° C., RH ~90%, 10 days + AA - Accelerated Aging: T ~80° C., RH >90%, 2 days | 5 | Powdered | 19/41/46 | ~70% | 24 |
|  | 6 | Formed | 52/85/114 | ~30% | 6 |
| NH - Normal High Humidity: T ~22° C., RH ~90%, 15 days + AA - Accelerated Aging: T ~80° C., RH >90%, 7 days | 7 | Powdered | .../.../29 | ~80% | 30 |
|  | 8 | Formed | 20/41/66 | ~70% | 24 |

This example provides several possible conclusions:

No 1. Powdered macro-cement in Normal Room (T ~22° C., RH <60%) conditions, uncovered, after 10 days storage lost about 30% of its activity, which roughly corresponds to loss of macro-cement activity after 6 month in sealed bags.

No 2. Formed macro-cement in Normal Room (T ~22° C., RH <60%) conditions, uncovered, after 10 days storage lost about 5% of its activity, which roughly corresponds to loss of macro-cement activity after 1 month in sealed bags;

It may be concluded that in such storage conditions the formed macro-cement have shelf life about five months (6-1) longer than powdered macro-cement.

No 3. Powdered macro-cement in Normal High Humidity (T ~22° C., RH ~90%) conditions, uncovered, after 10 days storage lost about 50% of its activity, which roughly corresponds to loss of macro-cement activity after 15 month in sealed bags.

No 4. Formed macro-cement in Normal High Humidity (T ~22° C., RH ~90%) conditions, uncovered, after 10 days storage lost about 10% of its activity, which roughly corresponds to loss of macro-cement activity after 1 month in sealed bags;

It may be concluded that in such storage conditions the formed macro-cement have shelf life about 14 months (15-1) longer than powdered macro-cement.

No 5. Powdered macro-cement in Normal High Humidity (T ~22° C., RH ~90%) conditions after 10 days storage, uncovered+another 2 days in Accelerated Aging (T ~80° C., RH >90%) conditions lost about 70% of its activity, which roughly corresponds to loss of macro-cement activity after 24 month in sealed bags.

No 6. Formed macro-cement in Normal High Humidity (T ~22° C., RH ~90%) conditions after 10 days storage, uncovered+another 2 days in Accelerated Aging (T ~80° C., RH >90%) conditions lost about 30% of its activity, which roughly corresponds to loss of macro-cement activity after 6 month in sealed bags;

It may be concluded that in such storage conditions the formed macro-cement have shelf life about 18 months (24-6) longer than powdered macro-cement.

No 7. Powdered macro-cement in Normal High Humidity (T ~22° C., RH ~90%) conditions after 15 days storage, uncovered+another 7 days in Accelerated Aging (T ~80° C., RH >90%) conditions lost about 80% of its activity, which roughly corresponds to loss of macro-cement activity after 30 month in sealed bags.

No 8. Formed macro-cement in Normal High Humidity (T ~22° C., RH ~90%) conditions after 15 days storage, uncovered+another 7 days in Accelerated Aging (T ~80° C., RH >90%) conditions lost about 70% of its activity, which roughly corresponds to loss of macro-cement activity after 24 month in sealed bags;

It may be concluded that in such storage conditions the formed macro-cement have shelf life about 6 months (30-24) longer than powdered macro-cement.

Altogether shelf life of the formed macro-cement may be considered about 18 months in compare to the powdered macro-cement, which have shelf life about 6 months in sealed bags like typical cementitious composition for making UHPC.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of producing a cementitious composition comprising applying mechanical forces to cause compression and/or shear deformation of micron-sized particles of dry cementitious materials and supplemental cementitious materials, wherein the supplemental cementitious materials comprise submicron or nano-sized dry particles or a combination thereof, to activate the dry cementitious materials and the supplemental cementitious materials to induce the supplemental cementitious materials to dry coat the dry cementitious materials.

2. The method of claim 1, further comprising utilizing a functional chemical additive for concrete as a binder.

3. The method of claim 1, wherein the mechanical forces comprise repeated impact, compression and shear force.

4. The method of claim 1, wherein the cementitious composition is produced in the form of granules, pellets, briquettes or tablets.

5. The method of claim 1, wherein the method is performed without binder.

* * * * *